(12) United States Patent
Everson et al.

(10) Patent No.: US 11,388,595 B2
(45) Date of Patent: Jul. 12, 2022

(54) WIRELESS ACCESS CREDENTIAL SYSTEM

(71) Applicant: Schlage Lock Company LLC, Carmel, IN (US)

(72) Inventors: Jonathan R. Everson, Kokomo, IN (US); Gregory Ross, Carmel, IN (US); Seth Kaufman, Denver, CO (US); Dakoda Johnson, Carmel, IN (US); Christopher Bauer, Morrison, CO (US); John Luif, Lakewood, CO (US); John Evenson, Greentown, IN (US); Lakshmi Santhanakrishnan, Carmel, IN (US); Mark Duckworth, Littleton, CO (US); Keith R. Broerman, Loveland, OH (US); Joseph W. Baumgarte, Carmel, IN (US); Matthew Dexter, Indianapolis, IN (US); Benjamin J. Hopkins, Zionsville, IN (US); David Studt, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 234 days.

(21) Appl. No.: 16/578,747

(22) Filed: Sep. 23, 2019

(65) Prior Publication Data
US 2020/0100108 A1    Mar. 26, 2020

Related U.S. Application Data

(60) Provisional application No. 62/734,548, filed on Sep. 21, 2018.

(51) Int. Cl.
H04W 12/08 (2021.01)
H04L 9/32 (2006.01)
(Continued)

(52) U.S. Cl.
CPC .......... *H04W 12/08* (2013.01); *H04L 9/0825* (2013.01); *H04L 9/3242* (2013.01);
(Continued)

(58) Field of Classification Search
CPC . H04W 12/08; H04W 12/068; H04W 12/037; H04W 12/041; H04L 9/0825;
(Continued)

(56) References Cited

U.S. PATENT DOCUMENTS 6,374,356 B1    4/2002  Daigneault et al.
7,145,434 B2   12/2006  Mlynarczyk et al.
(Continued)

OTHER PUBLICATIONS

International Search Report; International Searching Authority; International Application No. PCT/US2019/052427; dated Feb. 7, 2020; 4 pages.
(Continued)

*Primary Examiner* — Nelson S. Giddins
*Assistant Examiner* — Lydia L Noel
(74) *Attorney, Agent, or Firm* — Taft Stettinius & Hollister LLP

(57) ABSTRACT

An access control system and methods according to at least one embodiment leverage wireless access credentials to allow a user to securely gain access to a secured area using his or her mobile device. As such, a credentialed mobile device may permit access to the secured area without requiring a real-time connection to a credential management system and/or an administrative system.

20 Claims, 38 Drawing Sheets

(51) Int. Cl.
*H04L 9/08* (2006.01)
*H04W 12/037* (2021.01)
*H04W 12/041* (2021.01)
*H04W 12/06* (2021.01)

(52) U.S. Cl.
CPC ......... *H04L 9/3271* (2013.01); *H04W 12/037* (2021.01); *H04W 12/041* (2021.01); *H04W 12/068* (2021.01)

(58) Field of Classification Search
CPC . H04L 9/3242; H04L 9/3271; G07C 9/00174; G07C 2009/00865; G07C 2009/00412; G07C 9/00857; G07C 2009/00388; G07C 9/00309
See application file for complete search history.

(56) References Cited

U.S. PATENT DOCUMENTS

| | | | |
|---|---|---|---|
| 7,356,539 B2 | 4/2008 | Brown et al. | |
| 7,392,943 B2 | 7/2008 | Rietveld | |
| 7,616,091 B2 | 11/2009 | Libin | |
| 7,716,489 B1 | 5/2010 | Brandt et al. | |
| 7,730,126 B2 | 6/2010 | Crawford | |
| 7,822,989 B2 | 10/2010 | Libin et al. | |
| 7,873,989 B2 | 1/2011 | Kärkäs et al. | |
| 8,015,597 B2 | 9/2011 | Libin et al. | |
| 8,063,734 B2 | 11/2011 | Conforti | |
| 8,150,374 B2 | 4/2012 | Lowe | |
| 8,171,524 B2 | 5/2012 | Micali et al. | |
| 8,261,338 B2 | 9/2012 | Brown et al. | |
| 8,635,462 B2 | 1/2014 | Ullmann | |
| 8,732,457 B2 | 5/2014 | Micali | |
| 8,892,771 B2 | 11/2014 | Audebert et al. | |
| 9,330,514 B2 | 5/2016 | Kuenz et al. | |
| 9,396,321 B2 | 7/2016 | Davis et al. | |
| 9,558,377 B2 | 1/2017 | Wendling et al. | |
| 9,794,371 B2 | 10/2017 | Audebert et al. | |
| 9,842,446 B2 | 12/2017 | Vecchiotti et al. | |
| 9,924,302 B2 | 3/2018 | Plüss | |
| 10,116,635 B1 | 10/2018 | Shila et al. | |
| 10,171,974 B2 | 1/2019 | Ahearn et al. | |
| 10,181,231 B2 | 1/2019 | Kristensen et al. | |
| 10,257,190 B2 | 4/2019 | Baty et al. | |
| 10,339,747 B2 | 7/2019 | Ishikawa et al. | |
| 2013/0061055 A1* | 3/2013 | Schibuk | G06Q 20/223 713/172 |
| 2017/0353450 A1* | 12/2017 | Koved | H04L 63/083 |
| 2018/0151013 A1* | 5/2018 | Carstens | H04L 9/3249 |
| 2018/0158021 A1 | 6/2018 | Dautz et al. | |

OTHER PUBLICATIONS

Written Opinion of the International Searching Authority; International Searching Authority; International Application No. PCT/US2019/052427; dated Feb. 7, 2020; 9 pages.

New Zealand Paten Examination Report; New Zealand Intellectual Property Office; New Zealand Application No. 774490; dated May 19, 2022; 3 pages.

European Extended Search Report; European Patent Office; European Application No. EP 19 86 2997; dated May 13, 2022; 9 pages.

* cited by examiner

| Key Name | Purpose | Read | Write | Roll |
|---|---|---|---|---|
| [R1, r1] | Factory / Rolling of Other Keys | No | No | No |
| [R2, r2] | Device Signing of Msgs | Public [encrypted] | No | Yes |
| [R3, r3] | ECDH One-Time Keys | Public [clear] | No | Yes (every connection) |
| S | ECDH symmetric key used for the session | Encrypted (608A) | No | Yes (every connection) |
| H1, H2 | Manufacturer Origin Keys | No | Encrypted | No |
| [D] | Credential Origin Keys | No | Encrypted | No |
| [D2] | Configuration Origin Keys | No | Encrypted | No |
| [Q, q] | Generated ECC key for factory provisioning session | No | No | Yes |
| W1, W2 | Authenticated Writes to ECC | No | No | No |
| [f] | ECC Per Product private key | No | Yes | No |

3300

FIG. 33

WIRELESS ACCESS CREDENTIAL SYSTEM

CROSS-REFERENCE TO RELATED APPLICATIONS

This application claims the benefit of U.S. Provisional Application No. 62/734,548 filed on Sep. 21, 2018, the contents of which are incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device. In other embodiments, the user intent is verified via the user's interaction with the reader device (e.g., turning a handle/knob, capacitive touch sense, etc.). As such, access control systems generally require an active physical action on behalf of the user in order to grant the user access via the access control device.

SUMMARY

According to an embodiment, a method of using a wireless access credential in an access control system may include at least a server system, a mobile device, and an access control edge device. The method may include encrypting, by the server system and using a symmetric cryptographic key stored by the server system and the access control edge device, a credential blob including a wireless access credential and a first public cryptographic key provided by the mobile device, wherein the first public cryptographic key and a first private cryptographic key are a first asymmetric cryptographic key pair stored by the mobile device, transmitting, by the server system, the encrypted credential blob to the mobile device for storage by the mobile device, establishing a secure wireless communication connection between the mobile device and an access control edge device including generating a shared cryptographic key, encrypting, by the mobile device and using the shared cryptographic key, a credential message including the encrypted credential blob, cryptographically signing, by the mobile device and using the first private cryptographic key, the encrypted credential message, transmitting, by the mobile device, the encrypted and signed credential message to the access control edge device, decrypting, by the access control edge device and using the shared cryptographic key, the encrypted and signed credential message to extract the encrypted credential blob, decrypting, by the access control edge device and using the symmetric cryptographic key, the encrypted credential blob to extract the wireless access credential, and unlocking a lock mechanism of an electronic lock associated with the access control edge device in response to successful authentication of the wireless access credential.

In some embodiments, the method may further include cryptographically signing, by the mobile device and using the first private cryptographic key, a credential request including the first public cryptographic key, transmitting, by the mobile device, the signed credential request to the server system, and verifying, by the server system, the credential request signature based on the first public cryptographic key retrieved from the signed credential request, wherein encrypting the credential blob comprises encrypting the credential blob in response to successful verification of the credential request signature.

In some embodiments, the method may further include generating, by the server system, a keyed hash of the encrypted credential blob using the symmetric cryptographic key, wherein transmitting the encrypted credential blob further comprises transmitting the keyed hash to the mobile device for storage by the mobile device, and wherein the credential message further includes the keyed hash.

In some embodiments, the keyed hash may be a keyed-hash message authentication code (HMAC).

In some embodiments, the method may further include verifying, by the access control edge device and using the symmetric cryptographic key, the keyed hash in the credential message in response to decrypting the encrypted and signed credential message and verifying, by the access control edge device, the credential message signature based on the first public cryptographic key extracted from the decrypted credential blob.

In some embodiments, the method may further include encrypting, by the access control edge device and using the shared cryptographic key, challenge data, transmitting, by the access control edge device, the encrypted challenge data to the mobile device, and decrypting, by the mobile device and using the shared cryptographic key, the encrypted challenge data, wherein the credential message further includes the challenge data.

In some embodiments, the method may further include verifying, by the access control edge device, the challenge data in response to decrypting the encrypted and signed credential message.

In some embodiments, the method may further include cryptographically signing, by the server system, the encrypted credential blob using a second private cryptographic key, wherein the second private cryptographic key and a second public cryptographic key are a second asymmetric cryptographic key pair stored by the server system, and wherein the second public cryptographic key is stored by the access control edge device, wherein transmitting the encrypted credential blob comprises transmitting the signed and encrypted credential blob to the mobile device for storage by the mobile device, and wherein the credential message includes the signed and encrypted credential blob.

In some embodiments, the method may further include verifying, by the access control edge device, the encrypted credential blob signature based on the second public cryptographic key retrieved from a memory of the access control edge device and verifying, by the access control edge device, the credential message signature based on the first public cryptographic key extracted from the decrypted credential blob.

In some embodiments, the method may further include encrypting, by the access control edge device and using the shared cryptographic key, pin request data, transmitting, by the access control edge device, the encrypted pin request data to the mobile device, decrypting, by the mobile device and using the shared cryptographic key, the pin request data, receiving, by the mobile device, a pin value entered by a user of the mobile device, encrypting, by the mobile device and using the shared cryptographic key, a pin response including the pin value and the pin request data, transmitting, by the mobile device, the encrypted pin response to the access control edge device, decrypting, by the access control edge device and using the shared cryptographic key, the pin response, verifying, by the access control edge device, the pin request data in response to decrypting the pin response, and authenticating the pin value in response to successful verification of the pin request data.

In some embodiments, unlocking the lock mechanism may include unlocking the lock mechanism in response to successful authentication of the wireless access credential and successful authentication of the pin value.

In some embodiments, the first asymmetric cryptographic key pair may be an elliptical curve cryptography key pair.

In some embodiments, generating the shared cryptographic key may include performing an Elliptical Curve Diffie-Hellman key exchange.

In some embodiments, the method may further include encrypting, by the mobile device and using a third public cryptographic key, the encrypted credential blob received from the server system prior to storage of the encrypted credential blob, wherein the third public cryptographic key and a second private cryptographic key are a third asymmetric cryptographic key pair stored by the mobile device and decrypting, by the mobile device and using the third private cryptographic key, the stored encrypted credential blob prior to building the credential message.

According to another embodiment, an access control system may include an access control edge system comprising a lock mechanism, a mobile device, and a server system to encrypt, using a symmetric cryptographic key stored by the server system and the access control edge system, a credential blob including a wireless access credential and a first public cryptographic key provided by the mobile device, wherein the first public cryptographic key and a first private cryptographic key are an asymmetric cryptographic key pair stored by the mobile device and transmit the encrypted credential blob to the mobile device for storage by the mobile device. The mobile device may be to establish a secure wireless communication connection between the mobile device and an access control edge system including generating a shared cryptographic key, encrypt, using the shared cryptographic key, a credential message including the encrypted credential blob, cryptographically sign the encrypted credential message using the first private cryptographic key, and transmit the encrypted and signed credential message to the access control edge system. The access control edge system may be to decrypt, using the shared cryptographic key, the encrypted and signed credential message to extract the encrypted credential blob, decrypt, using the symmetric cryptographic key, the encrypted credential blob to extract the wireless access credential, and unlock the lock mechanism in response to successful authentication of the wireless access credential.

In some embodiments, the server system may include at least one cloud-based server.

In some embodiments, the server system may include a credential management system, a key management system, and a mobile access hub.

In some embodiments, the access control edge system may include a Bluetooth chipset, a main chipset, and a cryptography chipset.

According to an embodiment, an access control edge device for simultaneous connectivity may include a Bluetooth Low Energy (BLE) communication circuitry, a processor, and a memory comprising a plurality of instructions stored thereon that, in response to execution by the processor, causes the access control edge device to establish a first persistent communication connection with a first device using the BLE communication circuitry and establish a second persistent communication connection with a second device using the BLE communication circuitry without dropping the first persistent communication connection with the first device.

In some embodiments, the first device may be a gateway device and the second device may be a mobile device.

In some embodiments, the memory may include a local access control database and the plurality of instructions may further cause the access control edge device to receive a BLE access credential from the mobile device while simultaneously receiving a real-time update from a host server via the gateway device and perform an access control decision based on the BLE access credential and the local access control database.

In some embodiments, the plurality of instructions may further cause the access control edge device to transmit, via the BLE communication circuitry, a BLE advertisement to remote devices in a vicinity of the access control edge device while the first persistent communication connection is established, and wherein establishing the second persistent communication connection with the second device may include establishing the second persistent communication connection with the mobile device in response to receipt of the BLE advertisement by the mobile device.

In some embodiments, the plurality of instructions may further cause the access control edge device to receive a BLE access credential from the mobile device via the second persistent communication connection and transmit the BLE access credential to an access control system via the first persistent communication connection with the gateway device to perform an access control decision.

In some embodiments, the access control edge device may include a credential reader.

In some embodiments, the access control edge device may include a physical lock mechanism.

In some embodiments, the first device may be a first mobile device and the second device may be a second mobile device.

In some embodiments, the first device may be an administrative device and the second device may be a user mobile device.

According to another embodiment, a method for simultaneous connectivity with an access control edge device may include establishing, by the access control edge device, a first persistent communication connection with a first device using a BLE communication circuitry of the access control edge device and establishing, by the access control edge device, a second persistent communication connection with a second device using the BLE communication circuitry without dropping the first persistent communication connection with the first device.

In some embodiments, establishing the first persistent communication connection may include establishing the first persistent communication connection with a gateway device and establishing the second persistent communication connection may include establishing the second persistent communication connection with a mobile device without dropping the first persistent communication connection with the first device.

In some embodiments, the method may further include receiving, by the access control edge device, a BLE access credential from the mobile device while simultaneously receiving a real-time update from a host server via the gateway device and performing, by the access control edge device, an access control decision based on the BLE access credential and a local access control database stored on the access control edge device.

In some embodiments, the method may further include transmitting, by the access control edge device using the BLE communication circuitry, a BLE advertisement to remote devices in a vicinity of the access control edge device while the first persistent communication connection with the gateway device is established and wherein establishing the second persistent communication connection with the second device may include establishing the second persistent communication connection with the mobile device in response to receipt of the BLE advertisement by the mobile device.

In some embodiments, the method may further include receiving, by the access control edge device, a BLE access credential from the mobile device via the second persistent communication connection and transmitting, by the access control edge device, the BLE access credential to an access control system via the first persistent communication connection with the gateway device to perform an access control decision.

In some embodiments, establishing the first persistent communication connection may include establishing the first persistent communication connection with a first mobile device and establishing the second persistent communication connection may include establishing the second persistent communication connection with a second mobile device without dropping the first persistent communication connection with the first device.

In some embodiments, establishing the first persistent communication connection may include establishing the first persistent communication connection with an administrative device and establishing the second persistent communication connection may include establishing the second persistent communication connection with a user mobile device without dropping the first persistent communication connection with the first device.

According to yet another embodiment, one or more non-transitory machine-readable storage media may include a plurality of instructions stored thereon that, in response to execution by an access control edge device, causes the access control edge device to establish a first persistent communication connection with a first device using a BLE communication circuitry and establish a second persistent communication connection with a second device using the BLE communication circuitry without dropping the first persistent communication connection with the first device.

In some embodiments, the first device may be a gateway device and the second device may be a mobile device.

In some embodiments, the plurality of instructions may further cause the access control edge device to receive a BLE access credential from the mobile device while simultaneously receiving a real-time update from a host server via the gateway device and perform an access control decision based on the BLE access credential and a local access control database stored on the access control edge device.

In some embodiments, the plurality of instructions may further cause the access control edge device to transmit, using the BLE communication circuitry, a BLE advertisement to remote devices in a vicinity of the access control edge device while the first persistent communication connection with the gateway device is established, wherein the second persistent communication connection with the mobile device is established in response to receipt of the BLE advertisement by the mobile device, receive a BLE access credential from the mobile device via the second persistent communication connection, and transmit the BLE access credential to an access control system via the first persistent communication connection with the gateway device to perform an access control decision.

According to an embodiment, an access control system may include an administrative system, a mobile access hub, an access control edge system comprising a lock mechanism and a Bluetooth Low Energy (BLE) communication circuitry, and a credential management system to issue a BLE access credential to a user in response to a request for issuance of the BLE access credential by the administrative system and transmit the BLE access credential to the mobile access hub. The mobile access hub may be to transmit the BLE access credential to a mobile device associated with the user. The administrative system may be to update an access control database to associate the BLE access credential with the mobile device. The access control edge system may be to receive the BLE access credential from the mobile device via the BLE communication circuitry and unlock the lock mechanism in response to successful authentication of the BLE access credential.

In some embodiments, transmitting the BLE access credential to the mobile access hub may include calling the mobile access hub via a credential management application programming interface to transmit a message to the mobile device and transmitting the BLE access credential to the mobile device associated with the user may include transmitting the message to the mobile device including a deep link that retrieves the BLE access credential from the mobile access hub via a mobile application.

In some embodiments, transmitting the message may include transmitting a Short Message Service (SMS) message to the mobile device.

In some embodiments, the credential management system may further receive the request for issuance of the BLE access credential via a web portal.

In some embodiments, the credential management system may further receive the request for issuance of the BLE access credential via an automated integrated application programming interface between the administrative system and the credential management system.

In some embodiments, issuing the BLE access credential may include ensuring that a credential value of the BLE access credential is unique to a site at which the access control edge system is located.

In some embodiments, issuing the BLE access credential may include issuing the BLE access credential in response to a determination that an entity associated with the administrative system has sufficient credential credits for issuance of a new BLE access credential.

In some embodiments, the access control edge system may further perform authentication of the BLE access credential.

In some embodiments, the access control edge system may include a peripheral controller to authenticate the BLE access credential.

In some embodiments, at least one of the credential management system or the mobile access hub may include a cloud-based system.

According to another embodiment, a method may include issuing, by a credential management system, a Bluetooth Low Energy (BLE) access credential to a user in response to a request for issuance of the BLE access credential by an administrative system, transmitting, by the credential management system, the BLE access credential to a mobile device associated with the user, updating, by the administrative system, an access control database to associate the BLE access credential with the mobile device, receiving, by an access control edge device, the BLE access credential from the mobile device via a BLE communication connection between the access control edge device and the mobile device, and unlocking a lock mechanism of an electronic lock in response to successful authentication of the BLE access credential.

In some embodiments, transmitting the BLE access credential to the mobile device associated with the user may include transmitting, by the credential management system, the BLE access credential to a mobile access hub and transmitting, by the mobile access hub, the BLE access credential to the mobile device.

In some embodiments, transmitting the BLE access credential to the mobile device associated with the user may include calling, by the credential management system, the mobile access hub via a credential management application programming interface to transmit a message to the mobile device and transmitting, by the mobile access hub, the message to the mobile device including a deep link that retrieves the BLE access credential from the mobile access hub via a mobile application.

In some embodiments, transmitting the message may include transmitting a Short Message Service (SMS) message to the mobile device.

In some embodiments, the method may further include receiving, by the credential management system, the request for issuance of the BLE access credential via a web portal.

In some embodiments, the method may further include receiving, by the credential management system, the request for issuance of the BLE access credential via an automated integrated application programming interface between the administrative system and the credential management system.

In some embodiments, issuing the BLE access credential may include ensuring that a credential value of the BLE access credential is unique to a site at which the electronic lock is located.

In some embodiments, issuing the BLE access credential may include issuing the BLE access credential in response to a determination that an entity associated with the administrative system has sufficient credential credits for issuance of a new BLE access credential.

In some embodiments, the method may further include performing, by the access control edge device, authentication of the BLE access credential, and the access control edge device may include the electronic lock.

In some embodiments, the method may further include transmitting, by the access control edge device, the BLE access credential to a peripheral controller for authentication.

In some embodiments, the method may further include transmitting, by the mobile device, the BLE access credential to the mobile device via the BLE communication connection in response to a determination of a user intent to access a passageway secured by the electronic lock.

In some embodiments, unlocking the lock mechanism of the electronic lock may include unlocking the lock mechanism in response to a determination of a user intent to access a passageway secured by the electronic lock.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 33 is a chart depicting cryptographic keys associated with at least one embodiment of a cryptography chipset;

DETAILED DESCRIPTION

Figure 1:
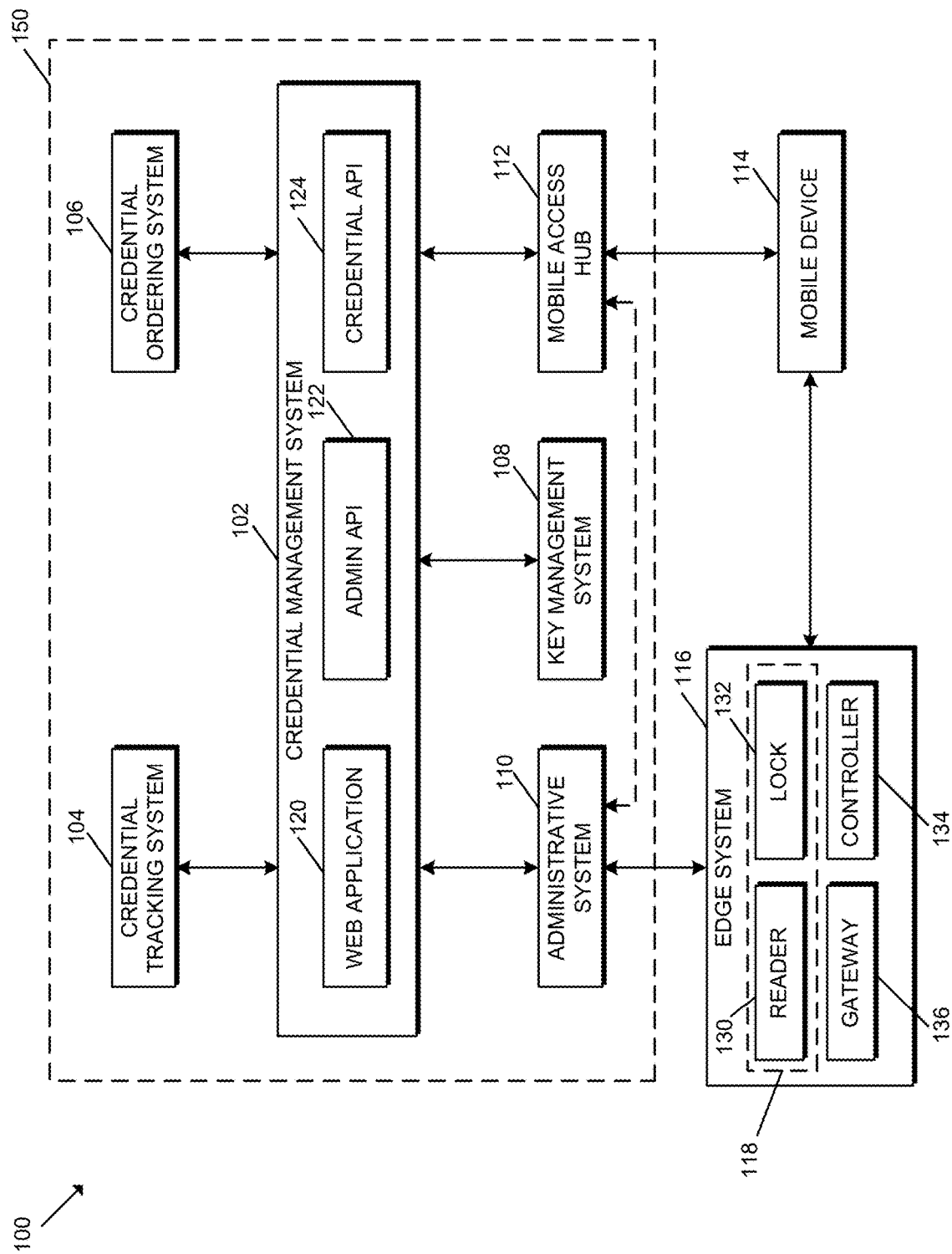
FIG. 1 is a simplified block diagram of at least one embodiment of an access control system for using a wireless access credential.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, an access control system 100 for using a wireless access credential includes a credential management system 102, a credential tracking system 104, a credential ordering system 106, a key management system 108, an administrative system 110, a mobile access hub 112, a mobile device 114, and an access control edge system 116. Additionally, as shown in FIG. 1, the access control edge system 116 may include one or more access control edge devices 118 (e.g., a reader device 130, a lock device 132), an access controller 134, and/or a gateway device 136 depending on the particular embodiment.

As described in detail below, the illustrative access control system 100 leverages wireless access credentials (e.g., Bluetooth or Bluetooth Low Energy (BLE) access credentials) to allow a user to securely gain access to a secured area (e.g., through a door or other passageway) using his or her mobile device 114 even when the mobile device 114 is offline. That is, the credentialed mobile device 114 may permit access without leveraging a real-time connection to the credential management system 102, the administrative system 110, and/or other credential management devices and systems. In some embodiments, the wireless access credentials may be delivered to the edge device 118 via a Bluetooth or, more specifically, a BLE communication connection. As such, it should be appreciated that the wireless access credential may be referred to, for example, as a Bluetooth access credential or a BLE access credential. In some embodiments, once decrypted, the wireless access credentials may be in the same format as traditional physical credentials, which allows an existing access control system to process the wireless access credentials and grant/deny access without significant changes to the infrastructure. In the illustrative embodiment, the wireless access credentials are generated in a cloud-based computing environment (e.g., a cloud-based credential management system 102) and delivered to end user mobile devices 114 (e.g., via a mobile access hub 112). The mobile device 114 may execute a mobile application to deliver the wireless access credential to a lock device 132, reader device 130, and/or other edge device 118. Additionally, in the illustrative embodiment, the lock device 132, reader device 130, and/or other edge device 118 may establish and simultaneously maintain multiple Bluetooth (e.g., BLE) wireless communication connections. For example, in some embodiments, the edge device 118 may be persistently connected to a gateway device 136 while simultaneously receiving a BLE access credential from a mobile device 114. Accordingly, in embodiments that permit multiple simultaneous persistent connections, it is generally unnecessary to periodically break an existing connection in order to establish a connection with another BLE device. It should be appreciated that, in some embodiments, the access control system 100 allows for the use of a near field communication (NFC) access credential and a BLE access credential via the same mobile application on a mobile device 114. In some embodiments, the BLE wireless communications established by the various devices of the access control system 100 may be compliant with Bluetooth Core Specification Version 4.2 or newer.

As described herein, various embodiments of the illustrative system 100 support improved security, support the authorized transferability of issued/existing credentials to a different mobile device 114 without the purchase of new credentials (e.g., when a using gets a new mobile device 114), support the ability of devices (e.g., edge devices 118) to have multiple simultaneous and persistent BLE connections, support multiple mobile credential technologies in the same mobile application (e.g., BLE and NFC), support multiple credentials on a single mobile device 114 within the same mobile application (e.g., work credential, gym credential, home credential, etc.), provide for onboarding a mobile device 114 via a user's mobile line number (e.g., even with iOS devices), allow for the revocation and/or expiration of credentials on the mobile device 114 (e.g., for convenience and increased procedural security), allow "no tour" functionality via a BLE credential (e.g., to add user access rights to a lock device 132 without an administrator touring the door and/or using a card), prevent copying of a credential for use on a different mobile device 114, support a secondary credential via the mobile device 114 (e.g., using a PIN without a keypad on the edge device 118), use a cryptography chipset to enhance security and performance, support the ability to roll BLE credential keys in the field securely, and/or support integration with other access control systems and domains (e.g., via the mobile access hub 112). In some embodiments, the illustrative system 100 further supports openness by virtue of the availability of the corresponding software development kit(s) (SDKs) and application programming interface(s) (APIs). As such, the credentials may be embedded with OEM partner applications, thereby allowing the OEM partner to leverage the credentials in a custom manner. For example, if a university has created its own application for students, the university could add the credential into that application and use it for access instead of having them use a secondary application for access control. The illustrative system 100 is also amendable to subscription based credential issuance models.

It should be appreciated that each of the credential management system 102, the credential tracking system 104, the credential ordering system 106, the key management system 108, the administrative system 110, the mobile access hub 112, the mobile device 114, the edge system 116, the edge device(s) 118, the reader device 130, the lock device 132, the access controller 134, and the gateway device 136 may be embodied as any type of device or collection of devices suitable for performing the functions described herein. More specifically, in the illustrative embodiment, the credential management system 102 is configured to manage the issuance of wireless access credentials, provide support for channel partners, and otherwise perform the functions described herein. As depicted in FIG. 1, in some embodiments, the credential management system 102 includes, serves, or otherwise interfaces with a web application 120 and one or more APIs for interaction with other devices and/or systems. For example, in the illustrative embodiment, the credential management system 102 includes an administrative API 122 for interacting with the administrative system 110 and/or site/facility administrators and a credential API 124 for interacting with the mobile access hub 112 for exchanging credential data and/or related information. In some embodiments, the credential management system 102 is configured to communicate and/or interact with the credential tracking system 104, the credential ordering system 106, the key management system 108, the administrative system 110, and the mobile access hub 112. For example, as described below, the credential management system 102 may encrypt and issue a new wireless/mobile access credential (e.g., a BLE credential and/or NFC credential) to a user or mobile device in response to a new credential order from the credential ordering system 106 and a credential request from the administrative system 110. The credential management system 102 may also coordinate with the credential tracking system 104 to ensure that the credential value of the issued credential is not duplicative of another issued credential.

The credential tracking system 104 provides additional security to the access control system 100 by tracking credential values (e.g., credential "card" numbers) that are issued to ensure that the credential values are not duplicated. In some embodiments, the credential tracking system 104 ensures that credential values are not duplicated across a particular site, whereas in other embodiments, the credential tracking system 104 ensures that credential values are not duplicated across all credential values ever used. For example, the credential value may be composed of the facility/site code and a unique credential/badge value. As such, in some embodiments, the credential tracking system 104 ensures that the entire credential value is unique, whereas in other embodiments the credential tracking system 104 ensures that credential/badge value is unique. Such differences may be based, for example, on the bit format of the particular credential.

The credential ordering system 106 processes orders of credentials placed by a customer such as, for example, an original equipment manufacturer (OEM), systems integrator, wholesaler, locksmith, or other relevant party. In particular, a customer may submit a purchase order for BLE credentials via the credential ordering system 106, which interfaces with the credential management system 102 to populate credential credits in the credential management system 102 indicative of a number of credentials available to the customer for issuance to users (e.g., one credential credit equaling one wireless access credential available for issuance). As such, it should be appreciated that upon issuance of a credential, the credential management system 102 reduces the number of credential credentials available for issuance of credentials. In some embodiments, the credential ordering system 106 may include or leverage an Oracle Application (e.g., Oracle Applications Release 11i, Oracle Documentation Library Release 12i, etc.) to perform one or more functions described herein.

The key management system 108 is configured to securely store and control access to cryptographic keys and other secure data (e.g., credentials), and to perform cryptographic functions on behalf of the credential management system 102. For example, as described in greater detail below, the key management system 108 may access an issued credential, generate a credential blob (e.g., a credential-bearing payload) including the credential and/or other relevant data, and encrypt the credential blob for transmittal to the credential management system 102. In some embodiments, it should be appreciated that the key management system 108 may leverage or include an Azure Key Vault to perform various functions described herein (e.g., in cloud-based embodiments). In other embodiments, it should be appreciated that the key management system 108 may be omitted and/or form a portion of the credential management system 102. It should be further appreciated that the monikers assigned herein to the various cryptographic keys are for readability and may vary in other embodiments without loss of generality. Additionally, the order and/or other organizational aspects of the data transmitted in payloads described herein may vary depending on the particular embodiment.

The administrative system 110 includes one or more devices accessible to a site/facility administrator to perform various system administrative functions, maintenance functions, updates, and/or other suitable functions as described herein. In some embodiments, the site administrator may utilize the administrative system 110 to access the credential management system 102 (e.g., via the web application 120 or portal) to monitor various features associated with the access control system 100 including, for example, the number of credential credits available for distribution of credentials to end user's mobile devices 114. Further, the administrative system 110 may be used to request a new wireless access credential to be assigned/issued and transmitted to a mobile device 114 of an end user. For example, in some embodiments, the administrative system 110 may manually request the credential issuance via the web application 120. In other embodiments, the administrative system 110 may be integrated with the credential management system 102 via the administrative API 122 such that the issuance of credentials may be automated. The administrative API 122 may further enable the administrative system 110 to simultaneously issue a credential to a user and add the user to the relevant access control database(s).

In some embodiments, the administrative system 110 may be configured to manage credentials of the access control system 100 with respect to the access control database(s). For example, the administrative system 110 may be responsible for ensuring that the access control database has updated authorized credentials, whitelists, blacklists, device parameters, and/or other suitable data. Additionally, in some embodiments, the administrative system 110 may receive security data, audit data, raw sensor data, and/or other suitable data from various edge devices 118.

The mobile access hub 112 interfaces directly with the mobile device 114 of a user and also interfaces with the credential management system 102 via the credential API 124 to receive the user's credential(s) for transmittal to the mobile device 114 via the mobile application. Further, in some embodiments, the mobile access hub 112 is leveraged during the onboarding of a wireless access credential as described below. More specifically, the mobile access hub 112 may generate and transmit a deep link via Short Message Service (SMS) to the mobile device 114 at the mobile device number entered when the credential was issued to the user. As described below, the deep link may be configured to launch a mobile application on the mobile device 114 to securely receive the credential or, if the mobile application not accessible on the mobile device 114, direct the user to the download location (e.g., an "App store") to download the relevant mobile application. In other embodiments, the mobile access hub 112 may interface with Twilio and/or another suitable messaging service for generating and transmitting the appropriate messages to the mobile device 114. Similarly, in some embodiments, the mobile access hub 112 may interface with Branch.IO and/or another suitable service for generating deep links. Further, in some embodiments, the messages may be transmitted to the mobile device 114 via email and/or another suitable communication mechanism. It should be appreciated that the mobile access hub 112 serves as an interface or hub between the credential management system 102 and mobile devices 114. In some embodiments, the mobile access hub 112 may be configured to interface with the access control system 3400 and/or the access control system 3500 described below, for example, for the exchange of various data between the systems. Further, in some embodiments, the mobile access hub 112 may also interface with other systems of the access control system 100 not described herein for brevity of the description.

As described herein, in some embodiments, the mobile access hub 112 is responsible for the onboarding of mobile devices 114, the activation/expiration of credentials, revocation of credentials, and/or account recovery. It should be further appreciated that the mobile access hub 112 may also serve as an interface to other access control systems having different protocols, devices, control domains, and/or systems. For example, in some embodiments, the mobile device 114 may be configured to store multiple/dynamic credentials including a cryptographic bearer token (e.g., a cryptographic macaroon), and the mobile access hub 112 may serve as an interface between the mobile device 114 and a corresponding access control system such as the access control system 100 (or, more specifically, a cloud server thereof) for flexible access control over offline devices described in U.S. patent application Ser. No. 15/656,641, titled "Leveraging Flexible Distributed Tokens in an Access Control System" and filed on Jul. 21, 2017 (hereinafter the "Leveraging Flexible Distributed Tokens" application), the entirety of which is incorporated herein by reference. In some embodiments, the access control system 100 of the Leveraging Flexible Distributed Tokens application and the cloud server thereof may be embodied as a Schlage® Sense™ system and/or cloud server, respectively.

The mobile device 114 may be embodied as a mobile computing device, cellular phone, smartphone, wearable computing device, personal digital assistant, Internet of Things (IoT) device, or other mobile device suitable for performing the functions described herein. As described herein, the mobile device 114 is configured to wirelessly communicate with the mobile access hub 112 and various edge devices 118 (e.g., lock devices 132, reader devices 130, etc.). In some embodiments, the mobile device 114 installs and executes a mobile application to securely communicate with the various devices of the access control system 100. It should be appreciated that the mobile application may be embodied as any suitable application for performing the functions described herein. For example, in some embodiments, the mobile application is embodied as a smartphone application. In other embodiments, the application may serve (e.g., in part) as a client-side user interface for a web-based application or service (e.g., of the mobile access hub 112). Further, it should be appreciated that, in some embodiments, the mobile application may be embodied as or otherwise include a software development kit (SDK), one or more libraries, and/or user interfaces.

In some embodiments, the mobile application of the mobile device 114 can support both a BLE credential and a NFC credential within the same application. Further, in some embodiments, both credentials for a particular user or mobile number have the same credential value such that there's only one entry in the access control database to identify that user. In some embodiments, in use, the user may have an option to select to send a BLE credential to the edge device 118 or just tap the mobile device 114 to the edge device 118 (or, more specifically, the reader device 130) such that a peer-to-peer connection is detected by the mobile device 114 and the mobile device 114 transmits the NFC credential to the edge device 118. As such, in some embodiments, the mobile application can support newer BLE-only reader devices 130 in addition to older SMART technology reader devices 130 that support NFC. Further, if necessary (e.g., in high 2.4 GHz BLE frequency areas), NFC may be used as a backup to BLE. Also, the mobile device 114 may transmit a BLE credential in circumstances that previously may have required more user interaction (e.g., transmitting a BLE credential in parking garages without lowering the vehicle window). In other embodiments, it should be appreciated that BLE credential or the NFC credential may be selected based on the user intent, which may be determined according to any suitable technique. Depending on the particular embodiment, the mobile application may also support revocation or expiration of credentials, multiple credentials on the same mobile device 114, and/or off-line use of the credential.

The access control edge system 116 includes one or more access control edge devices 118 including, for example, a reader device 130 and/or a lock device 132. Additionally, in some embodiments, the access control edge system 116 may further include one or more intermediate devices including, for example, an access controller 134 and/or a gateway device 136. As described in greater detail below in reference to FIGS. 24-29 and, for example, in addition to the components described in reference to FIG. 2, it should be appreciated that each of the access control edge devices 118 may include a BLE chipset 140, a main chipset 142, and a cryptography chipset 144. In such embodiments, the BLE chipset 140 may be configured to transmit, receive, and/or process BLE communications. Further, the main chipset 142 may include a main/primary processor of the access control edge device 118. Additionally, the cryptography chipset 144 may be configured to quickly and efficiently perform various cryptographic functions on behalf of the access control edge device 118. It should be appreciated that, in some embodiments, each of the chipsets 140, 142, 144 may include or be otherwise embodied as one or more integrated circuits and/or other circuitry. Further, in some embodiments, the edge device 118 may include I2C and/or similar security between the main chipset 142 and the cryptography chipset 144.

It should be appreciated that the cryptography chipset 144 may be embodied as any integrated circuit(s) and/or other circuitry suitable for performing the functions described herein. However, in the illustrative embodiment, the cryptography chipset 144 is designed and structured to efficiency perform cryptographic functions based on Elliptical Curve Cryptography (ECC) including, for example, Elliptical Curve Diffie Hellman (ECDH), Elliptical Curve Digital Signature Algorithm (ECDSA), asymmetric (public/private) cryptographic key generation, and cryptographic key storage. In some embodiments, the cryptography chipset 144 is configured to perform ECDH and ECDSA calculations in fewer than two hundred milliseconds. Such efficiency improves battery performance and the overall user experience due to the credential being processed quickly. In some embodiments, the cryptography chipset 144 includes a set of cryptographic keys (W1, W2) that secures the writing of keys such that different cryptographic keys cannot be written to the cryptographic chipset 144 by another party after the cryptography chipset 144 has been factory provisioned. Additionally, in some embodiments, the cryptography chipset 144 includes some cryptographic keys that are designed to change/roll and others that do not. At least one configuration of cryptographic keys provisioned/stored to the cryptography chipset 144 is depicted in the chart 3300 of FIG. 33. As shown, the chart 3300 depicts specific keys and key pairs and the associated purpose of the key or key pair, and whether the key or key pair can be read, written, and/or rolled.

The reader device 130 is configured to communicate with mobile devices 114 to receive wireless access credentials (e.g., Bluetooth or BLE credentials) that are processed in order to make a corresponding access control decision with respect to that mobile device 114. As such, the reader device 130 includes Bluetooth and/or other suitable wireless communication circuitry. Additionally, in some embodiments, the reader device 130 may be further configured to read contactless credentials (e.g., via RFID or NFC) and/or contact credential presented to the reader device 130.

The lock device 132 includes an access control mechanism and is configured to control access through a passageway. For example, in some embodiments, the access control mechanism may be embodied as a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the access control mechanism may be embodied as any another mechanism suitable for controlling access through a passageway in other embodiments. In some embodiments, the lock device 132 may be embodied as an electronic lock including a reader device 130, whereas in other embodiments, the lock device 132 may be separate from the reader device 130.

In some embodiments, the reader device 130 may be electrically coupled to an access controller 134 that analyzes the received credential data. For example, the reader device 130 may be embodied as an RS-485 reader or Wiegand reader. Further, in such embodiments, the access controller 134 may be electrically coupled to the lock device 132 such that the access controller 134 may instruct or signal (e.g., via a relay) the lock mechanism to permit/deny access through the barrier based on the access control decision. In some embodiments, the access controller 134 may be embodied as a "peripheral" controller in the sense that it is not integrated with an electronic lock. That is, in such embodiments, the access controller is not mounted on the door/barrier. Further, in other embodiments, the access controller 134 may be embodied as an access control panel.

The gateway device 136 may serve as an interface between the access control edge device 118 (e.g., the reader device 130 and/or the lock device 132) and the administrative system 110. For example, in some embodiments, the gateway device 136 may communicate with the access control edge device 118 over a Wi-Fi Connection and/or a Bluetooth connection, and the gateway device 136 may, in turn, forward the communicated data to the relevant administrative system 110, management server, and/or access control panel. For example, in some embodiments, the gateway device 136 may communicate with an access control panel over a serial communication link (e.g., using RS-485 standard communication), and/or the gateway device 136 may communicate with the administrative system 110 over a Wi-Fi connection, an Ethernet connection, or another wired/wireless communication connection (e.g., via the Internet).

Figure 2:
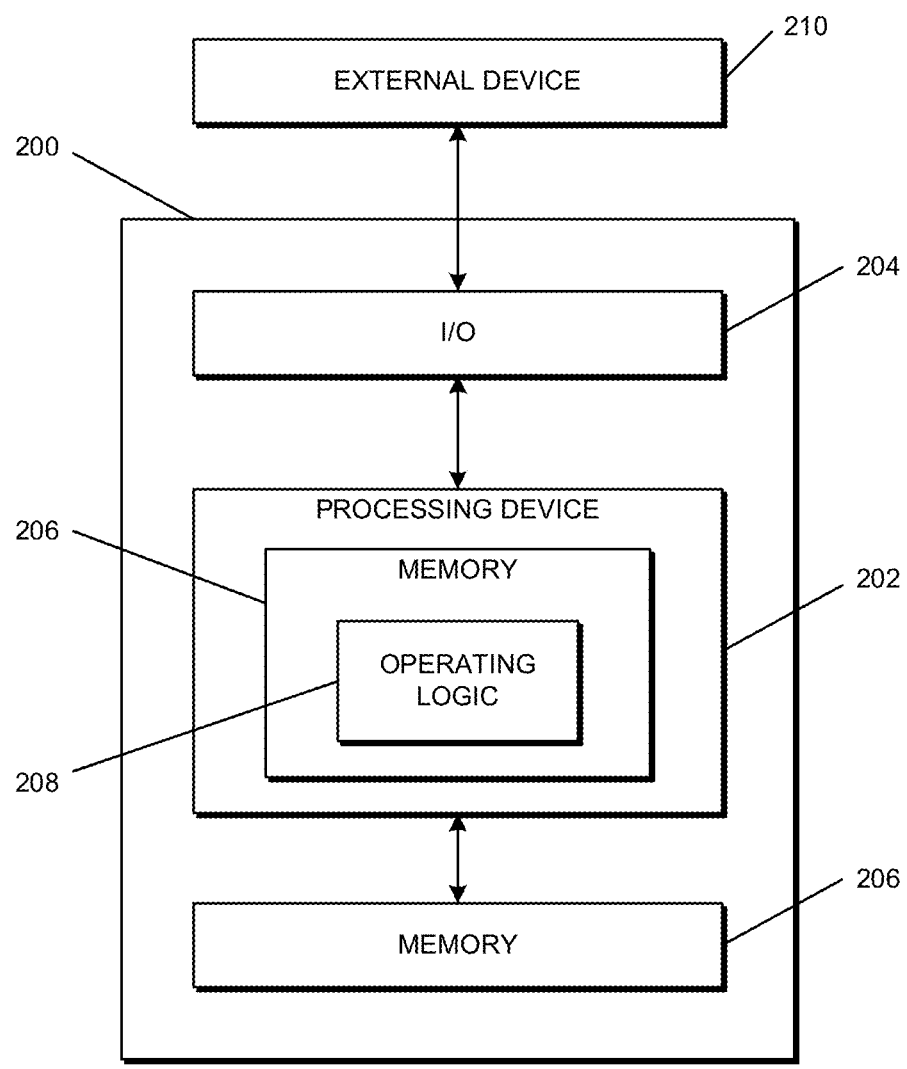
FIG. 2 is a simplified block diagram of at least one embodiment of a computing system.
Figure 3:
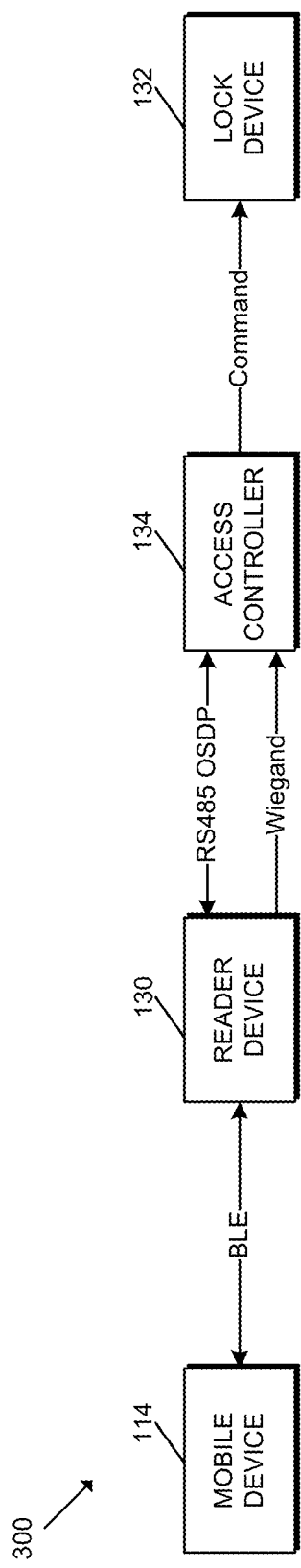
FIGS. 3-8 are simplified block diagrams illustrating various communication capabilities of the access control system of FIG. 1.

It should be appreciated that each of the credential management system 102, the credential tracking system 104, the credential ordering system 106, the key management system 108, the administrative system 110, the mobile access hub 112, the mobile device 114, the access control edge system 116, the access control edge devices 118, the reader device 130, the lock device 132, the access controller 134, and/or the gateway device 136 may be embodied as a computing device similar to the computing device 200 described below in reference to FIG. 2. For example, in the illustrative embodiment, each of the credential management system 102, the credential tracking system 104, the credential ordering system 106, the key management system 108, the administrative system 110, the mobile access hub 112, the mobile device 114, the access control edge system 116, the access control edge devices 118, the reader device 130, the lock device 132, the access controller 134, and the gateway device 136 includes a processing device 202 and a memory 206 having stored thereon operating logic 208 for execution by the processing device 202 for operation of the corresponding device.

It should be appreciated that, although the credential management system 102, the credential tracking system 104, the credential ordering system 106, the key management system 108, the administrative system 110, and the mobile access hub 112 are described herein as one or more computing devices outside of a cloud computing environment for simplicity of the description, in some embodiments, one or more of the credential management system 102, the credential tracking system 104, the credential ordering system 106, the key management system 108, the administrative system 110, and/or the mobile access hub 112 may be embodied as a cloud-based device or collection of devices. Accordingly, as depicted in FIG. 1, each of those devices/systems may be referred to herein as one or more cloud servers 150. For simplicity and without limiting the description, it should be appreciated that the one or more cloud servers 150 may be referred to herein in the singular (i.e., as the cloud server 150). For further clarity, as indicated above, it should be appreciated that one or more of the servers referenced herein as a cloud server 150 may be embodied as a server or other type of computing device situated outside of a cloud computing environment (e.g., a distributed server system) in some embodiments unless expressly indicated to the contrary.

Further, in cloud-based embodiments, one or both of the credential management system 102, the credential tracking system 104, the credential ordering system 106, the key management system 108, the administrative system 110, and/or the mobile access hub 112 may be embodied as a "serverless" or server-ambiguous computing solution, for example, that executes a plurality of instructions on-demand, contains logic to execute instructions only when prompted by a particular activity/trigger, and does not consume computing resources when not in use. That is, the credential management system 102, the credential tracking system 104, the credential ordering system 106, the key management system 108, the administrative system 110, and/or the mobile access hub 112 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the credential management system 102, the credential tracking system 104, the credential ordering system 106, the key management system 108, the administrative system 110, and/or the mobile access hub 112 described herein. For example, when an event occurs (e.g., data is transferred for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of particular data is made (e.g., via an appropriate interface to credential management system 102, the credential tracking system 104, the credential ordering system 106, the key management system 108, the administrative system 110, and/or the mobile access hub 112), the appropriate virtual function(s) may be executed to perform the actions before eliminating the instance of the virtual function(s).

Although only one credential management system 102, one credential tracking system 104, one credential ordering system 106, one key management system 108, one administrative system 110, one mobile access hub 112, one mobile device 114, one access control edge system 116, one reader device 130, one lock device 132, one access controller 134, and one gateway device 136 are shown in the illustrative embodiment of FIG. 1, the system 100 may include multiple credential management systems 102, credential tracking systems 104, credential ordering systems 106, key management systems 108, administrative systems 110, mobile access hubs 112, mobile devices 114, access control edge systems 116, reader devices 130, lock devices 132, access controllers 134, and/or gateway devices 136 in other embodiments. For example, as indicated above, the credential management system 102, the credential tracking system 104, the credential ordering system 106, the key management system 108, the administrative system 110, and/or the mobile access hub 112 may be embodied as multiple servers in a cloud computing environment in some embodiments. Further, the mobile device 114 may communicate with multiple access control edge systems 116 at various points in time.

It should be appreciated that, in some embodiments, one or more of the devices and/or systems of the access control system 100 may be omitted or divided into multiple devices/systems. Additionally, in some embodiments, one or more of the devices and/or systems of the access control system 100 may form a portion of another device/system such that the functions are performed therein. For example, in some embodiments, the key management system 108 may form a portion of the credential management system 102.

Referring now to FIG. 2, a simplified block diagram of at least one embodiment of a computing device 200 is shown. The illustrative computing device 200 depicts at least one embodiment of a credential management system, a credential tracking system, a credential ordering system, a key management system, an administrative system, a mobile access hub, a mobile device, an access control edge system, an access control edge device, a reader device, a lock device, an access controller, and/or a gateway device that may be utilized in connection with the credential management system 102, the credential tracking system 104, the credential ordering system 106, the key management system 108, the administrative system 110, the mobile access hub 112, the mobile device 114, the access control edge system 116, the access control edge devices 118, the reader device 130, the lock device 132, the access controller 134, and/or the gateway device 136 illustrated in FIG. 1. Further, in some embodiments, the illustrative computing device 200 depicts at least one embodiment of the peripheral controller 3402, the management server 3404, the cloud server(s) 3406, the mobile device 3408, the mobile device 3410, the gateway device 3412, the credential enrollment reader 3414, the RS-485 reader 3416, and/or the Wiegand reader 3418 illustrated in FIG. 34 and/or the electronic lock 3502, the management server 3504, the cloud server(s) 3506, the mobile device 3508, the mobile device 3510, the gateway device 3512, and/or the credential enrollment reader 3514 illustrated in FIG. 35.

Depending on the particular embodiment, computing device 200 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as an access control device, mobile device, management server, gateway device, and/or access control panel. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

Referring now to FIGS. 3-8, simplified block diagrams illustrating various communication capabilities and use cases of the access control system 100 are shown. More specifically, FIGS. 3-8 illustrate communications between subsets of the various devices/systems of the access control device. That is, communication capabilities and use cases of subsystems 300, 400, 500, 600, 700, 800 of the access control system 100 are shown. For example, referring now specifically to FIG. 3, the subsystem 300 includes a mobile device 114, a reader device 130, an access controller 134, and a lock device 132. In the illustrative embodiment of FIG. 3, the reader device 130 is embodied as a BLE-capable wall mount reader device that receives and processes the BLE access credential from the mobile device 114 and transmits the BLE access credential or a portion thereof to the access controller 134 (e.g., an access control panel) to perform the access control decision. The subsystem 300 may be considered to have employed a "decision at host" access control scheme, the "host" being the access control panel. As shown, in some embodiments, the reader device 130 may communicate with the access controller 134 via Wiegand communication lines, which are one-way communication with no feedback, or using the Open Supervised Device Protocol (OSDP), which is generally secure and allows feedback. Further, based on the access control decision, the access controller 134 may transmit a command or signal to the lock device 132, for example, to unlock the lock mechanism.

Figure 4:
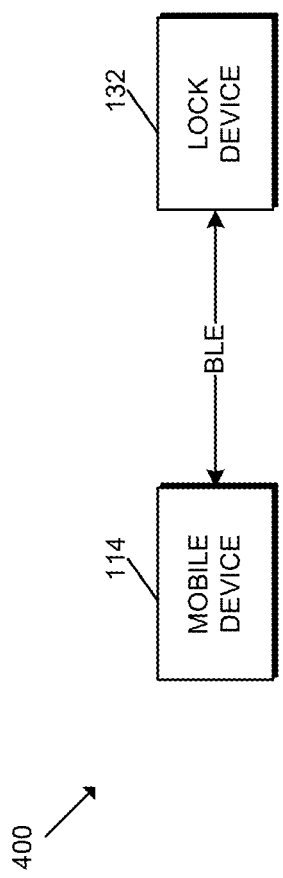

Referring now to FIG. 4, the subsystem 400 includes a mobile device 114 and a lock device 132. In the illustrative embodiment of FIG. 4, the lock device 132 is embodied as an electronic lock with BLE communication circuitry such that the lock device 132 receives and processes the BLE access credential from the mobile device 114. Further, the illustrative lock device 132 is an offline battery-powered electronic lock that includes an internal access control database stored in an internal memory of the lock device 132 such that the lock device 132 can locally make an access control decision based on the BLE access credential. The subsystem 400 may be considered to have employed an offline, "decision at door" access control scheme. It should be appreciated that a lock device 132 is considered to be "online" if the lock device 132 has a real-time connection to the host (e.g., the administrative system 110", whereas the lock device 132 is considered to "offline" if it does not. As such, offline devices may, for example, establish a communication connection with the host periodically or in response to an appropriate condition in some embodiments.

Figure 5:
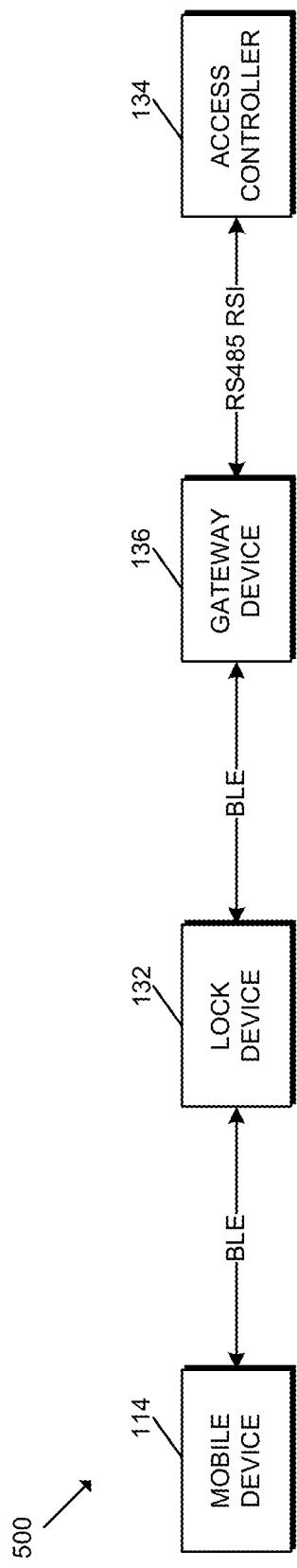

Referring now to FIG. 5, the subsystem 500 includes a mobile device 114, a lock device 132, a gateway device 136, and an access controller 134. In the illustrative embodiment of FIG. 5, the lock device 132 is embodied as an electronic lock with BLE communication circuitry such that the lock device 132 receives and processes the BLE access credential from the mobile device 114. Further, the illustrative lock device 132 is an online electronic lock that transmits the received BLE credential, or a portion thereof, in real-time to the gateway device 136 via BLE communication, which in turn transmits the BLE credential, or a portion thereof, to the access controller 134 (e.g., an access control panel) to perform an access control decision. The subsystem 500 may be considered to have employed an online, "decision at host" access control scheme. In some embodiments, the gateway device 136 has a stable communication connection (e.g., an RSI-485 serial communication connection) to the access controller 134 for transmittal of the BLE credential and/or other relevant data.

It should be appreciated that, in the illustrative subsystem 500, the lock device 132 has a persistent connection to the gateway device 136 and the ability to simultaneously transmit BLE advertisements to BLE devices in the vicinity in order to establish a BLE connection with the mobile device 114 to receive the BLE credential. To do so, in the illustrative embodiment, the BLE chipset 140 of the lock device 132 leverages and/or is otherwise compliant with Bluetooth CS Version 4.2 or newer (i.e., subsequently introduced). In some embodiments, the lock device 132 is capable of establishing at least five simultaneously BLE connections. It should be appreciated that the BLE connection is "persistent" in the sense that the BLE connection disconnects fewer than ten times per day. In other embodiments, the BLE connection may not be so "persistent" but may nonetheless not disconnect periodically by design.

Figure 6:
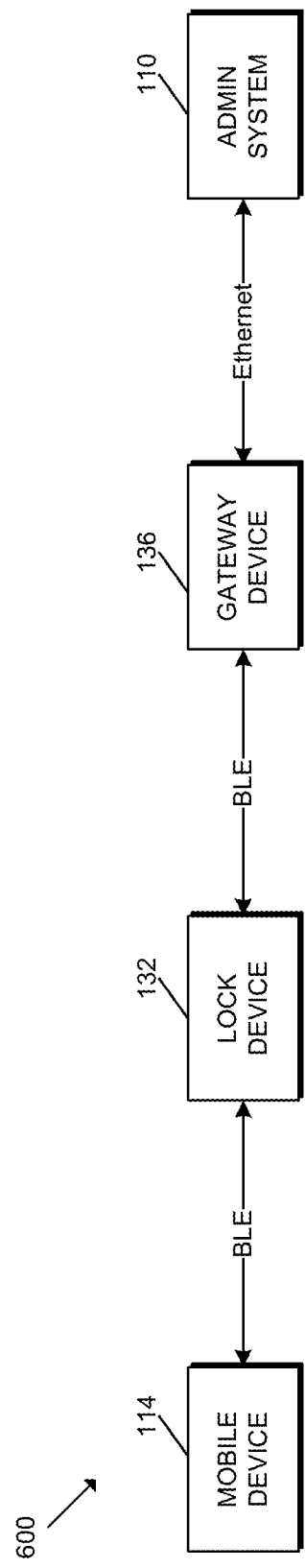

Referring now to FIG. 6, the subsystem 600 includes a mobile device 114, a lock device 132, a gateway device 136, and a host system (e.g., an administrative system 110). In the illustrative embodiment of FIG. 6, the lock device 132 is embodied as an electronic lock with BLE communication circuitry such that the lock device 132 receives and processes the BLE access credential from the mobile device 114. Further, the illustrative lock device 132 is an online electronic lock that includes an internal access control database stored in an internal memory of the lock device 132 such that the lock device 132 can locally make an access control decision based on the BLE access credential. The subsystem 600 may be considered to have employed an online, "decision at door" access control scheme. It should be appreciated that, in the illustrative subsystem 600, the lock device 132 has a persistent connection to the gateway device 136 such that the lock device 132 can receive real-time updates from the host server (e.g., the administrative system 110) while being connected to one or more mobile devices 114. As in the subsystem 500 of FIG. 5, in the subsystem 600 of FIG. 6, the BLE chipset 140 of the lock device 132 leverages and/or is otherwise compliant with Bluetooth CS Version 4.2 or newer (i.e., subsequently introduced). Further, in some embodiments, the gateway device 136 communicates with the host server (e.g., the administrative system 110) via an Ethernet connection (e.g., via the Internet).

Figure 7:
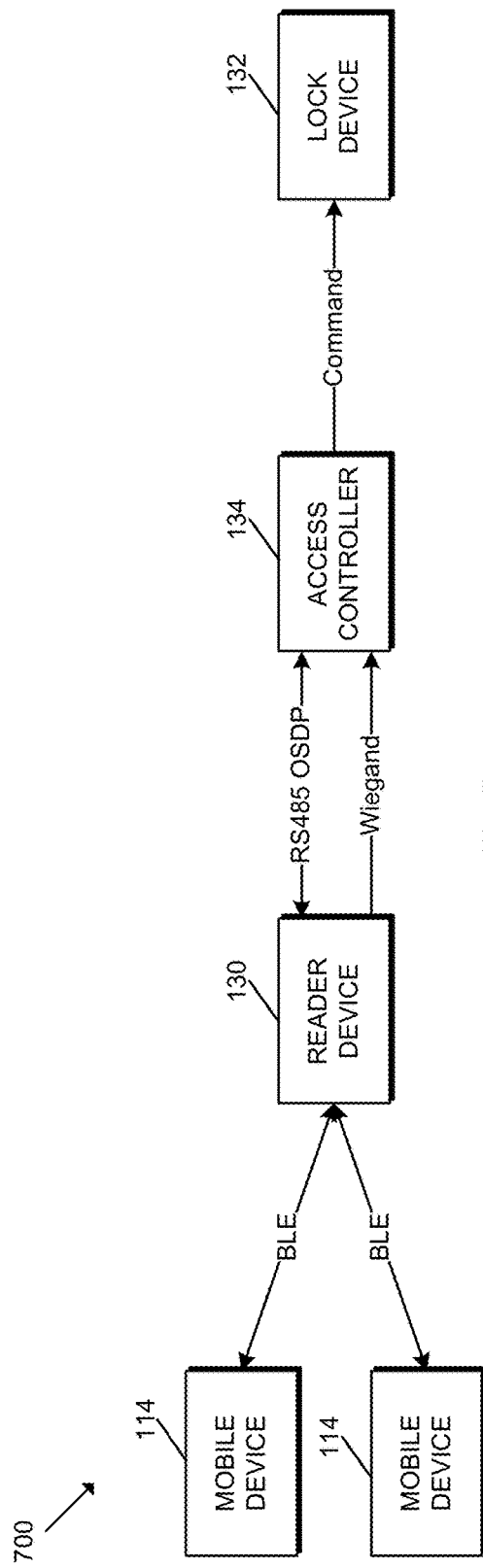

Referring now to FIG. 7, the subsystem 700 includes two mobile devices 114, a reader device 130, an access controller 134, and a lock device 132. In the illustrative embodiment of FIG. 7, the reader device 130 is embodied as a BLE-capable wall mount reader device that receives and processes BLE access credentials from the mobile devices 114 and transmits each of the BLE access credentials or a portion thereof to the access controller 134 (e.g., an access control panel) to perform the access control decision. The subsystem 300 may be considered to have employed a "decision at host" access control scheme, the "host" being the access control panel. As shown, in some embodiments, the reader device 130 may communicate with the access controller 134 via Wiegand communication lines or using OSDP. Further, based on the access control decision, the access controller 134 may transmit a command or signal to the lock device 132, for example, to unlock the lock mechanism. As such, it should be appreciated that the subsystem 700 is similar to the subsystem 300 of FIG. 3. However, the reader device 130 of subsystem 700 is configured to establishing and simultaneously maintain multiple BLE communication connections with other devices (e.g., in conjunction with heavy use doors). In particular, the illustrative reader device 130 of FIG. 7 is configured to establish a BLE communication connection with a first mobile device 114 and maintain that connection while simultaneously establishing and then maintaining a BLE communication connection with a second mobile device 114. It should be appreciated that permitting multiple mobile devices 114 to connect to the reader device 130 simultaneously, the risk and effect of various malicious attacks such as a denial of service attack is significantly reduced.

Figure 8:
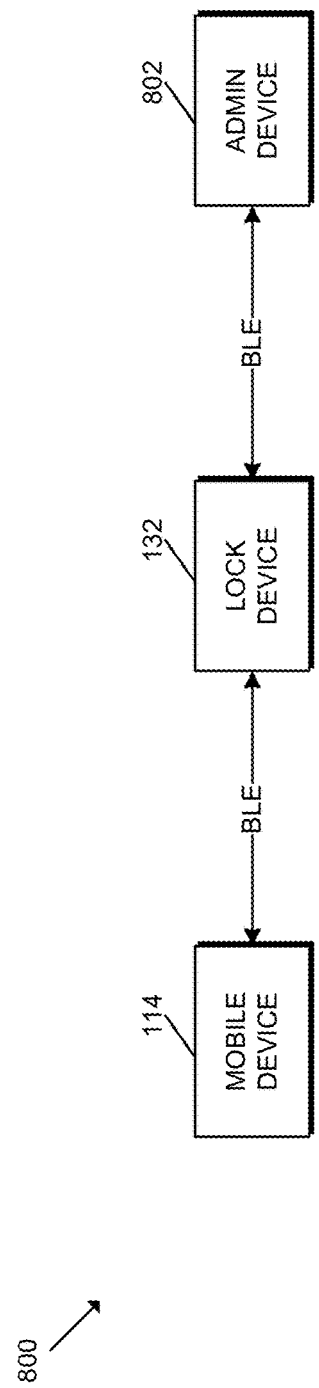

Referring now to FIG. 8, the subsystem 800 includes a mobile device 114, a lock device 132, and an administrative device 802. In some embodiments, the administrative device 802 may be embodied as a device similar to the mobile device 114 and/or another computing device similar to the computing device 200 described in reference to FIG. 2. Further, the administrative device 802 may form a portion of the administrative system 110. In the illustrative embodiment of FIG. 8, the lock device 132 is embodied as an electronic lock with BLE communication circuitry such that the lock device 132 receives and processes the BLE access credential from the mobile device 114. Further, in some embodiments, the illustrative lock device 132 may be an offline battery-powered electronic lock that includes an internal access control database stored in an internal memory of the lock device 132 such that the lock device 132 can locally make an access control decision based on the BLE access credential. Additionally, the lock device 132 may be configured to communicate with the administrative device 802 via the BLE communication circuitry such that the administrative device 802 may perform various administrative functions, maintenance functions, updates, and/or other suitable functions with respect to the lock device 132. Similar to the reader device 130 of FIG. 7, the lock device 132 of FIG. 8 is configured to simultaneously establish and maintain BLE communication connections with the mobile device 114 (e.g., a user mobile device) and the administrative device 802 such that an administrator application can be connected to the lock device 132, and the lock device 132 can simultaneously advertise and connect with mobile devices 114 via BLE.

Figure 9:
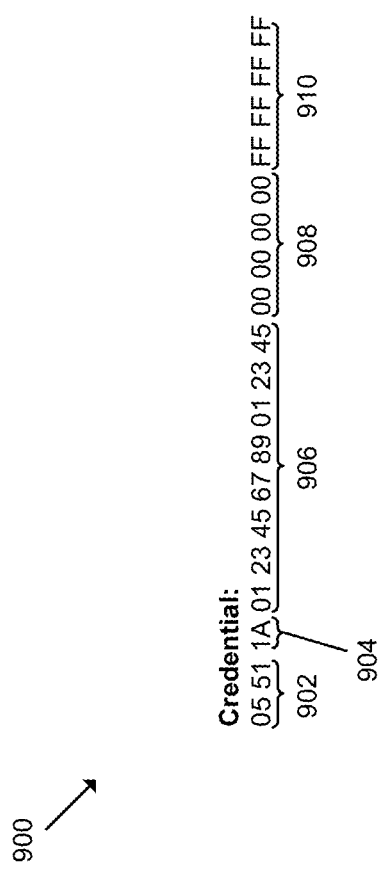
FIG. 9 is an example data structure of at least one embodiment of a wireless access credential.

Referring now to FIG. 9, an example of a data structure of a wireless access credential 900 is shown. In particular, the illustrative wireless access credential 900 (e.g., a BLE access credential) of FIG. 9 is represented in Concise Binary Object Representation (CBOR) format or, more specifically, according to the RFC7049 CBOR standard, with hexadecimal representations. In some embodiments, each of the payloads and/or encrypted payloads described below may be transmitted in this format. However, it should be appreciated that the example data structure of FIG. 9 is shown by way of example, and the techniques described herein may be employed for different data representations and/or data structures.

As shown, the illustrative wireless access credential 900 of FIG. 9 includes various data fields. In particular, the wireless access credential 900 includes data 902, 904, 906, 908, 910. In the illustrative embodiment, the data 902 is a tag that indicates the type of the data to follow. In particular, the data 902 (via "05") indicates that the data is a credential value with a credential activation time and a credential expiration time. Other tags my include, for example, a nonce, public key(s), signature(s), key exchange data, a unique identifier (e.g., UUID), a PIN request, a PIN reply, key provisioning data (e.g., rolling keys), configuration data, firmware download, status reporting, error handling, reporting data, command information, and/or other suitable information. The data 904 indicates the type/length of the data. The data 906 indicates the credential bit format and, therefore, indicates (via "1A") that the credential is in a 26-bit format. Further, the data 906 indicates the credential value, the data 908 indicates an activation time of the credential, and the data 910 indicates an expiration time of the credential. It should be appreciated that the activation and expiration times may be in any suitable format (e.g., date-time, etc.). It should be further appreciated that the number and types of the data fields may vary depending on the particular data and/or the particular embodiment.

Figure 10:
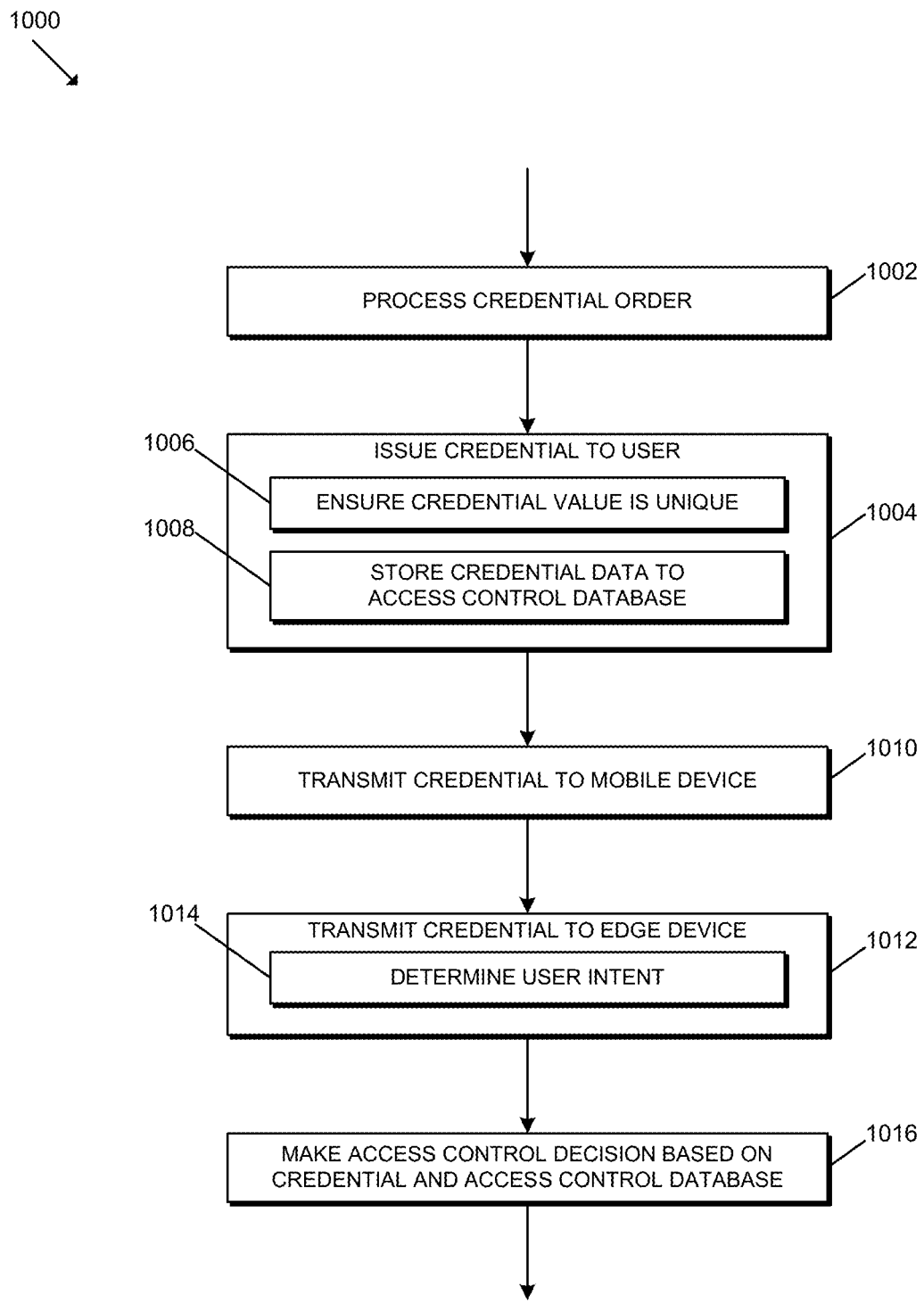
FIG. 10 is a simplified flow diagram of at least one embodiment of a method of using a wireless access credential in the access control system of FIG. 1.

Referring now to FIG. 10, in use, the access control system 100 may execute a method 1000 for using a wireless access credential. It should be appreciated that the particular blocks of the method 1000 are illustrated by way of example, and such blocks may be combined or divided, added or removed, and/or reordered in whole or in part depending on the particular embodiment, unless stated to the contrary. The illustrative method 1000 begins with block 1002 of FIG. 10 in which the access control system 100 processes a wireless access credential order. More specifically, a customer may place an order for additional credentials via the credential ordering system 106 and/or the credential management system 102. Further, in the illustrative embodiment, the credential management system 102 populates credential credits (commensurate with the number of credentials purchased) in the credential management system 102 indicative of a number of credentials available to the customer for issuance to users. Although often described throughout the description as BLE credentials or Bluetooth credentials, it should be appreciated that the techniques described herein may also be employed with respect to other types of wireless access credentials.

In block 1004, the access control system 100 receives a request for issuance of a credential and issues a credential to a user or the mobile device 114 of the user. In doing so, in block 1006, the access control system 100 may ensure that the credential value of the credential being issued is unique and, in block 1008, the access control system 100 may store credential data to an access control database (e.g., stored locally at the edge device 118 and/or remotely at the administrative system 110 or another suitable location). More specifically, in some embodiments, a site/facility administrator utilizes the administrative system 110 to access the credential management system 102 (e.g., via the web application 120 and/or administrative API 122) to request a new wireless access credential to be assigned/issued and transmitted to a mobile device 114 of an end user. Further, the credential management system 102 may coordinate with the credential tracking system 104 to ensure that the credential value of the issued credential is not duplicative of another issued credential. As described above, in some embodiments, the administrative system 110 may manually request the credential issuance via the web application 120, whereas in other embodiments, the administrative system 110 may be integrated with the credential management system 102 via the administrative API 122 such that the request for and issuance of credentials may be automated.

In the illustrative embodiment, it should be appreciated that assigning/issuing the credential to a user further involves transmitting the issued credential and/or other relevant credential data to the administrative system 110, which is, in turn, stored to the relevant access control database(s). It should be appreciated that the location of the access control database(s) may vary depending, for example, on the particular site's access control and network topologies. As such, in various embodiments, the access control database(s) may be located on the access control edge device 118, access controller 134 (e.g., access control panel), host device (e.g., the administrative system 110), a cloud-based system, and/or another suitable location. It should be appreciated that the access control database includes the credential, the assigned user (e.g., identified by mobile phone number), and/or other relevant credential data.

In block 1010, the access control system 100 transmits the issued credential to the appropriate mobile device 114. The appropriate mobile device 114 may be identified, for example, based on the various communication protocols described herein. In some embodiments, the credential management system 102 transmits the credential to the mobile device 114 via the mobile access hub 112. In particular, the credential management system 102 may leverage the credential API 124 to interface with and/or "call" the mobile access hub 112 requesting a message to be transmitted to the user's mobile device 114 (e.g., a text/SMS message). For example, the mobile access hub 112 may generate and transmit a deep link via SMS to the mobile device 114 at the mobile device number entered when the credential was issued to the user. In other embodiments, the mobile access hub 112 may interface with Twilio and/or another suitable messaging service for generating and transmitting the appropriate messages to the mobile device 114. However, in other embodiments, the messages may be transmitted to the mobile device 114 via email and/or another suitable communication mechanism.

After the mobile device 114 has received the issued credential, the mobile device 114 may transmit the credential to the access control edge device 118 to make an access control decision with respect to the mobile device 114 and, therefore, with respect to the user. As such, in block 1012, the mobile device 114 transmits the credential to the edge device 118. In some embodiments, it should be appreciated that the credential may be transmitted based on the user's express or implied intent to convey the credential to the edge device 118. For example, in some embodiments, the credential is transmitted based on a user's selection on a graphical user interface of an option to transmit the credential, whereas in other embodiments, the credential may be transmitted based on sensor data, contextual information, and/or other relevant information. Accordingly, in block 1014, the mobile device 114 may determine the user intent based on various factors/options as described herein. In block 1016, the edge device 118 and/or other device(s) in the edge system 116 makes an access control decision based on the credential and the access control database. For example, as described above, the edge device 118 itself or another device may perform the access control decision based, for example, on whether a "decision at door" or "decision at host" access control scheme is employed, among other factors.

Although the blocks 1002-1016 are described in a relatively serial manner, it should be appreciated that various blocks of the method 1000 may be performed in parallel in some embodiments. It should be further appreciated that one or more of the features described in reference to the flow diagrams of FIGS. 11-29 may be incorporated into the method 1000 of FIG. 10 in some embodiments.

Figure 31:
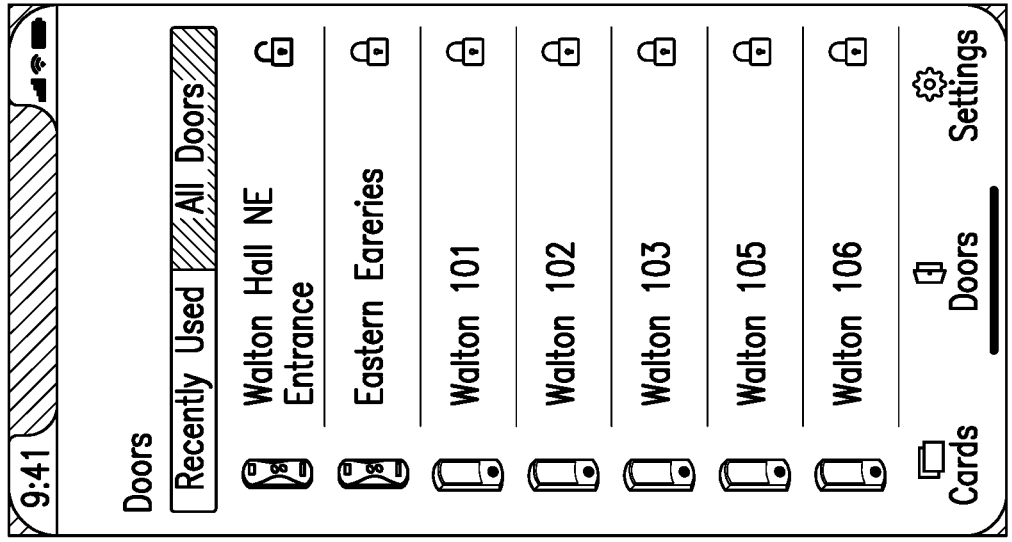
FIGS. 30-31 are simplified diagrams of a graphical user interface of the mobile device of FIG. 1.
Figure 30:
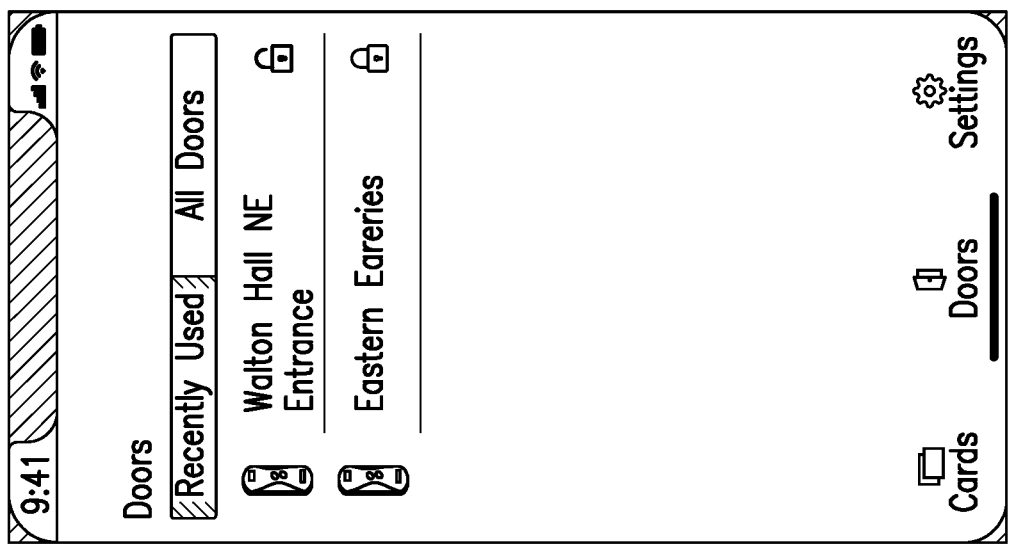

Referring now to FIGS. 30-31, in some embodiments, the mobile device 114 may execute a mobile application that has a graphical user interface 3000 that allows the user to select a particular door/lock to indicate an intent to access that door, which causes the mobile device 114 to transmit the appropriate credential to the corresponding edge device 118. As shown in FIGS. 30-31, the graphical user interface 3000 may include a cards tab 3002, a doors tab 3004, and a settings tab 3006. In some embodiments, when selected, the cards tab 3002 provides the user with options to select various credential stored to the mobile device 114. Depending on the particular embodiment, selection of a particular card may transmit the corresponding credential to the associated edge device 118, open properties or settings associated with the corresponding credential, and/or perform other suitable functions. As shown in the illustrative embodiment of FIGS. 30-31, when the doors tab 3004 is selected, the graphical user interface 3000 further displays a recently used tab 3008 and an all doors tab 3010. As shown in FIG. 30, when the recently used tab 3008 is selected, the illustrative graphical user interface 3000 identifies each of the doors that have been recently accessed. In other words, in some embodiments, the graphical user interface 300 identifies each door associated with an edge device 118 that has performed an access control decision or, alternatively, an access control decision associated with an authenticated credential. In some embodiments, door may be considered to have been "recently used" if the door is one of a certain number of most recently used doors and/or used within a certain period of time. Such number and/or time may vary depending on the particular embodiment. In some embodiments, the graphical user interface 3000 may identify the state of each door including, for example, whether the door is unlocked (as depicted by indicia 3012) or locked (as depicted by indicia 3014). As shown in FIG. 31, when the all doors tab 3010 is selected, the illustrative graphical user interface 3000 identifies each of the doors within range of the mobile device 114 than can accept a wireless access credential (e.g., a BLE access credential). In some embodiments, in order to identify the devices that support a BLE access credential, a new BLE generic attribute (GATT) service may be defined such that the mobile application of the mobile device 114 can identify via the advertising data of the nearby BLE devices whether each nearby device supports the BLE access credential. Accordingly, the list of doors that the graphical user interface 3000 displays may be significantly reduced. However, in other embodiments, the graphical user interface 3000 may display every door within range of the mobile device 114.

It should be appreciated that the mobile device 114 may employ one or more other user intent options in other embodiments. Further, the user intent options may vary by the amount of user interaction required to convey the user intent and, in some embodiments, may be configurable by the site administrator (e.g., via the administrative system 110). In some embodiments, a graphical user interface (e.g., similar to the graphical user interface 3000) may provide the user with one or more user intent options to select for each of the edge devices 118 accessible to the user. It should be appreciated that such user intent options may be permitted at the discretion of the site administrator in some embodiments. For example, a site administrator may permit more relaxed user intent options for an interior door housing nothing secure, whereas the site administrator may permit only more strict user intent options (e.g., express selections of the door) for an exterior door or an interior door securing critical infrastructure.

In some embodiments, the user intent may be conveyed without user interaction. In particular, the access control system 100 may engage in triangulation (e.g., between BLE edge devices 118) and/or leverage GPS circuitry to determine the location of the mobile device 114. In such embodiments, the mobile device 114 may transmit the credential (or alternatively, the edge device 118 may only process the received credential) when the mobile device 114 is moving toward the edge device 118 and on the proper side of the edge device 118 (e.g., corresponding with an exterior side of the door). In other embodiments, the mobile device 114 may transmit the credential to the nearest edge device 118 based on the location data. In another embodiment, the user may convey an intent to access by walking up to the door (and therefore the corresponding edge device 118) and stopping instead of walking by. It should be appreciated that the mobile device 114 and/or the edge device 118 may leverage received signal strength (e.g., signal strength indication (RSSI) values) or time of flight data to determine the distance of the mobile device 114 relative to the edge device 118 in some embodiments. Further, in some embodiments, the mobile device 114 may automatically transmit the credential to the edge device 118 when the mobile device 114 is within a predetermined distance of the edge device 118 or other reference device/component (e.g., the door) such that the lock device 132 may be automatically unlocked.

In other embodiments, the user intent may be conveyed with user interaction but without removing the mobile device 114 from safekeeping (e.g., without removing the mobile device 114 from the user's pocket, handbag, briefcase, etc.). For example, in some embodiments, the user may convey the intent by tapping the mobile device 114. That is, when the mobile device 114 is within a close proximity to the edge device 118, a tap on the mobile device 114 informs the mobile application to transmit the credential to the edge device 118. It should be appreciated that the mobile device 114 may include and leverage an accelerometer and/or other inertial sensor(s) to perform such functions. In other embodiments, the mobile device 114 may be embodied as, or otherwise include, a wearable device, and an indication appears on a display of the wearable device when the user is within range of an edge device 118. A user's tap of the wearable device may be indicative of an intent to access the passageway secured by the edge device 118. In some embodiments, the mobile device 114 may sense the tap via an inertial sensor, capacitive sensor, pressure sensor, and/or other suitable sensor. For example, in various embodiments, the sensors leveraged by the mobile device 114 to determine a user intent may include environmental sensors (e.g., temperature sensors, air pressure sensors, humidity sensors, light sensors, etc.), inertial sensors (accelerometers, gyroscopes, magnetometers, etc.), proximity sensors, optical sensors, electromagnetic sensors, audio sensors (e.g., microphones), motion sensors, cameras, piezoelectric sensors, pressure sensors, and/or other types of sensors.

In yet other embodiments, the user intent may involve both user interaction and removal of the mobile device 114 from safekeeping (e.g., removing the moving device 114 from the user's pocket, handbag, briefcase, etc.). For example, in some embodiments, the near field communication (NFC) circuitry of the mobile device 114 may be used as an intent option to transmit a BLE credential (e.g., by tapping the mobile device 114 to the reader device 130). Further, in some embodiments, the mobile device 114 may utilize a voice recognition system (e.g., via the mobile application, a system application, and/or another application) to determine the user's intent to transmit the credential to an edge device 118. That is, the user may give an audible command to the mobile device 114 to do so.

Referring now to FIGS. 11-29, various embodiments of methods for securely transmitting an access credential over a wireless communication connection or, in some embodiments, a BLE communication connection more specifically are shown. It should be appreciated that the illustrative methods of FIGS. 11-29 leverage different security and encryption algorithms to secure the data across the wireless/BLE communication connection and/or while stored on specific devices in the access control system 100. In some embodiments, it should be appreciated that if a particular verification, validation, authorization, and/or authentication fails, one or more devices of the access control system 100 may perform error handling procedures. For example, in some embodiments, the communication protocol may terminate. It should be appreciated that, in the illustrative methods of FIGS. 11-29, the edge device 118 need not have ever been pre-commissioned to communicate with the mobile device 114 and/or the mobile application thereof. That is, in some embodiments, the edge device 118 has no pre-shared information about the specific mobile device 114 prior to commencing communication with the mobile device 114.

Figure 11:
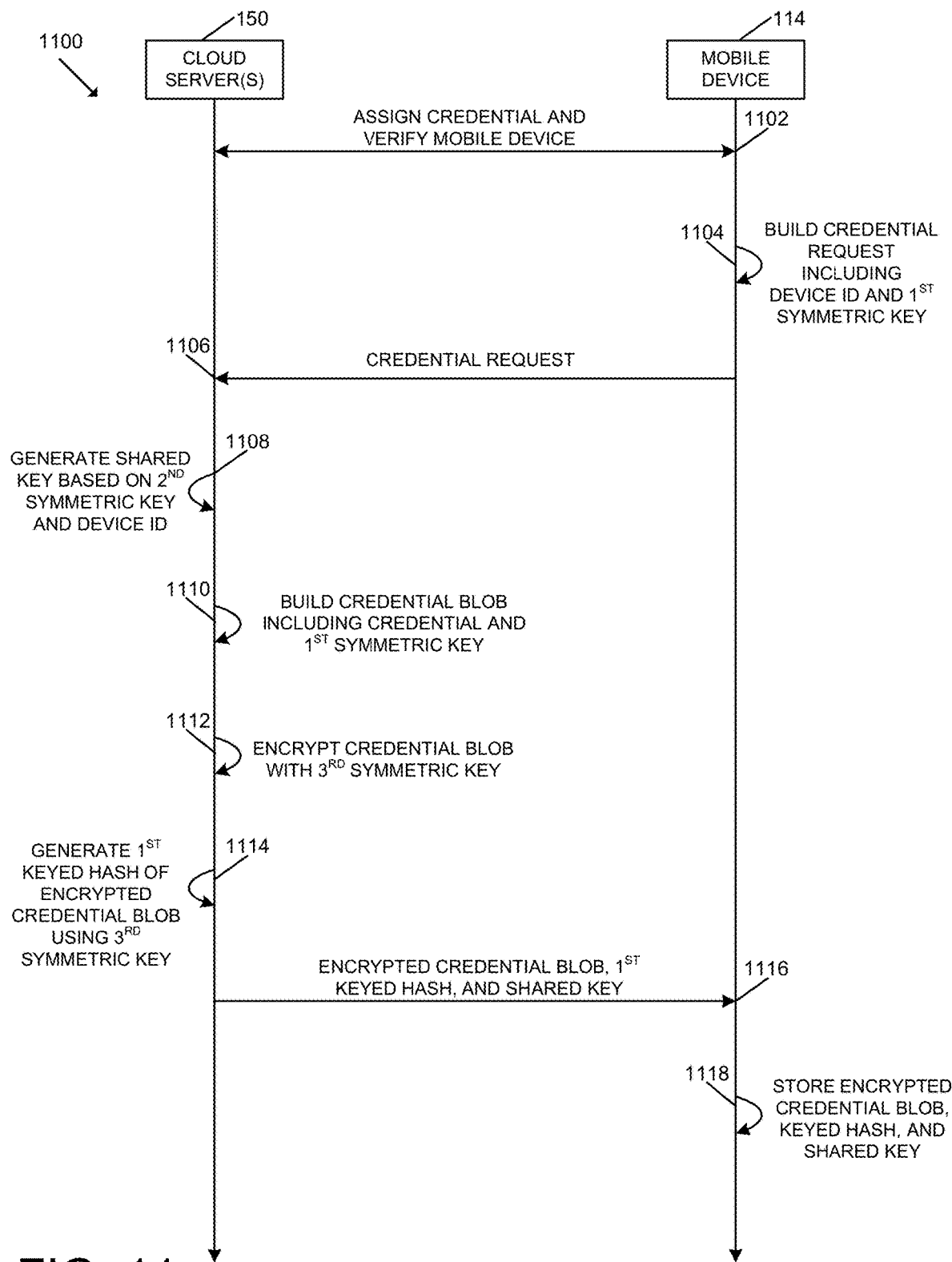
FIG. 11 is a simplified flow diagram of at least one embodiment of a method of storing a wireless access credential to a mobile device of the access control system of FIG. 1.

Referring now to FIG. 11, in use, the access control system 100 may execute a method 1100 for storing a wireless access credential to the mobile device 114. It should be appreciated that the particular flows of the method 1100 are illustrated by way of example, and such flows may be combined or divided, added or removed, and/or reordered in whole or in part depending on the particular embodiment, unless stated to the contrary. Additionally, it should be appreciated that, in the illustrative embodiment, the method 1100 may be executed in conjunction with and prior to the method 1200 of FIGS. 12-13.

As shown, the illustrative method 1100 involves one or more cloud servers 150 and a mobile device 114 (e.g., executing a mobile application as described herein). As indicated above, the cloud server(s) 150 may be referred to herein in the singular for simplicity. Further, the illustrative method 1100 assumes that a cryptographic key exchange has occurred such that the cloud server 150 and an edge device 118 (see, for example, FIGS. 12-13) share two symmetric cryptographic keys, K and B. It should appreciated that the cloud server 150 and the edge device 118 may employ any suitable key exchange algorithm to do so. The illustrative method 1100 further assumes that the mobile device 114 has stored thereon another symmetric cryptographic key, A, which may be generated, for example, by the mobile device 114 in a trusted execution environment (TEE) or secure enclave in some embodiments. Additionally, the symmetric cryptographic keys may vary by type and/or length depending on the particular embodiment. For example, in the illustrative embodiment, the symmetric cryptographic keys, K, B, and A, are embodied as 256-bit Advanced Encryption Standard (AES) keys. In other embodiments, however, the symmetric cryptographic keys may be associated with another cryptographic algorithm such as, for example, Data Encryption Standard (DES), Triple DES, Blowfish, Twofish, Serpent, and/or another symmetric cryptographic algorithm. Similarly, the keys may be 128-bit keys, 512-bit keys, or another size in other embodiments (e.g., depending on the cryptographic algorithm). In some embodiments, the cryptographic keys are generated by the cloud server 150 and transmitted to the edge device 118.

The illustrative method 1100 begins with flow 1102 of FIG. 11 in which the cloud server 150 and the mobile device 114 coordinate to assign a wireless access credential to a user (and therefore the mobile device 114 of that user) and verify the mobile device 114 (e.g., by confirming that the mobile number corresponds with the mobile device 114). It should be appreciated that, in some embodiments, the access control system 100 may execute the method 2200 of FIGS. 22-23 to do so. Further, in some embodiments, the mobile device 114 may establish a Transport Layer Security (TLS) connection with the cloud server 150 and/or other devices with which the mobile device 114 communicates.

In flow 1104, the mobile device 114 (e.g., using the mobile application) builds a credential request including a device identifier (e.g., UUID) of the mobile device 114 and the symmetric cryptographic key, A, retrieved from a memory of the mobile device 114. Further, in some embodiments, the credential request may identify the payload as a credential request (e.g., via a corresponding flag, CRED_REQ). As such, in some embodiments, the credential request may be represented as CRED_REQ||device_ID||A. It should be appreciated that the device identified (e.g., a UUID) may be tied to the mobile device 114 and may allow the edge device 118 to generate the information necessary to identify that the credential is correct any coming from the correct mobile device 114 as described below. In flow 1106, the mobile device 114 transmits the credential request to the cloud server 150 (e.g., via a TLS connection).

In flow 1108, the cloud server 150 generates a shared cryptographic key, M, based on the symmetric cryptographic key, B, retrieved from a memory of the cloud server 150 and the unique identifier (e.g., UUID) received from the mobile device 114 with the credential request. As described below in reference to FIGS. 12-13, it should be appreciated that the cryptographic key, M, is shared in the sense that the edge device 118 is able to independently derive the same cryptographic key based on the same data (i.e., the key, B, and the unique identifier). It should be appreciated that the shared cryptographic key, M, may be generated based on a key derivation function (KDF). More specifically, in the illustrative embodiment, the shared cryptographic key, M, is generated based on a HKDF, a key derivation function based on a hash-based message authentication code (HMAC). However, in other embodiments, the shared cryptographic key, M, may be otherwise generated.

In flow 1110, the cloud server 150 builds a credential blob including the credential to be transmitted to the mobile device 114 (i.e., the credential assigned to the mobile device 114 and the user) and the shared cryptographic key, M. Further, in some embodiments, the credential blob may further include a nonce value, for example, to reduce the efficacy of replay attacks. As such, in some embodiments, the credential blob may be represented as nonce||credential||A. In flow 1112, the cloud server 150 encrypts the credential blob with the symmetric cryptographic key, K, and, in flow 1114, the cloud server 150 generates a keyed hash of the encrypted credential blob using the same symmetric cryptographic key, K. In particular, in the illustrative embodiment, the cloud server 150 generates an HMAC of the encrypted credential blob based on the symmetric cryptographic key, K (e.g., an HMAC-SHA256 keyed hash). However, it should be appreciated that another type of keyed hash may be generated in other embodiments.

In flow 1116, the cloud server 150 transmits the encrypted credential blob ($E_K$(nonce||credential||A)), the keyed hash of the encrypted credential blob ($HMAC_K$), and the shared cryptographic key (M) to the mobile device 114. In particular, in some embodiments, a payload including those data may be represented as $E_K$(nonce||credential||A)||$HMAC_K$||M. In flow 1118, the mobile device 114 stores each of the encrypted credential blob ($E_K$(nonce||credential||A)), the keyed hash of the encrypted credential blob ($HMAC_K$), and the shared cryptographic key (M) to a memory of the mobile device 114. As such, it should be appreciated that the mobile device 114 (and the mobile application) now has access to the shared cryptographic key (M), for example, to perform one or more cryptographic functions described below in reference to FIGS. 12-13. Additionally, in the illustrative embodiment, the mobile device 114 now has a credential stored thereon that is tied to the mobile device 114, but the mobile device 114 is unable to read the credential data due to the encryption. It should be appreciated that the memory of the mobile device 114 to which such data is stored is a secure memory in some embodiments.

Although the flows 1102-1118 are described in a relatively serial manner, it should be appreciated that various flows of the method 1100 may be performed in parallel in some embodiments.

Figure 12:
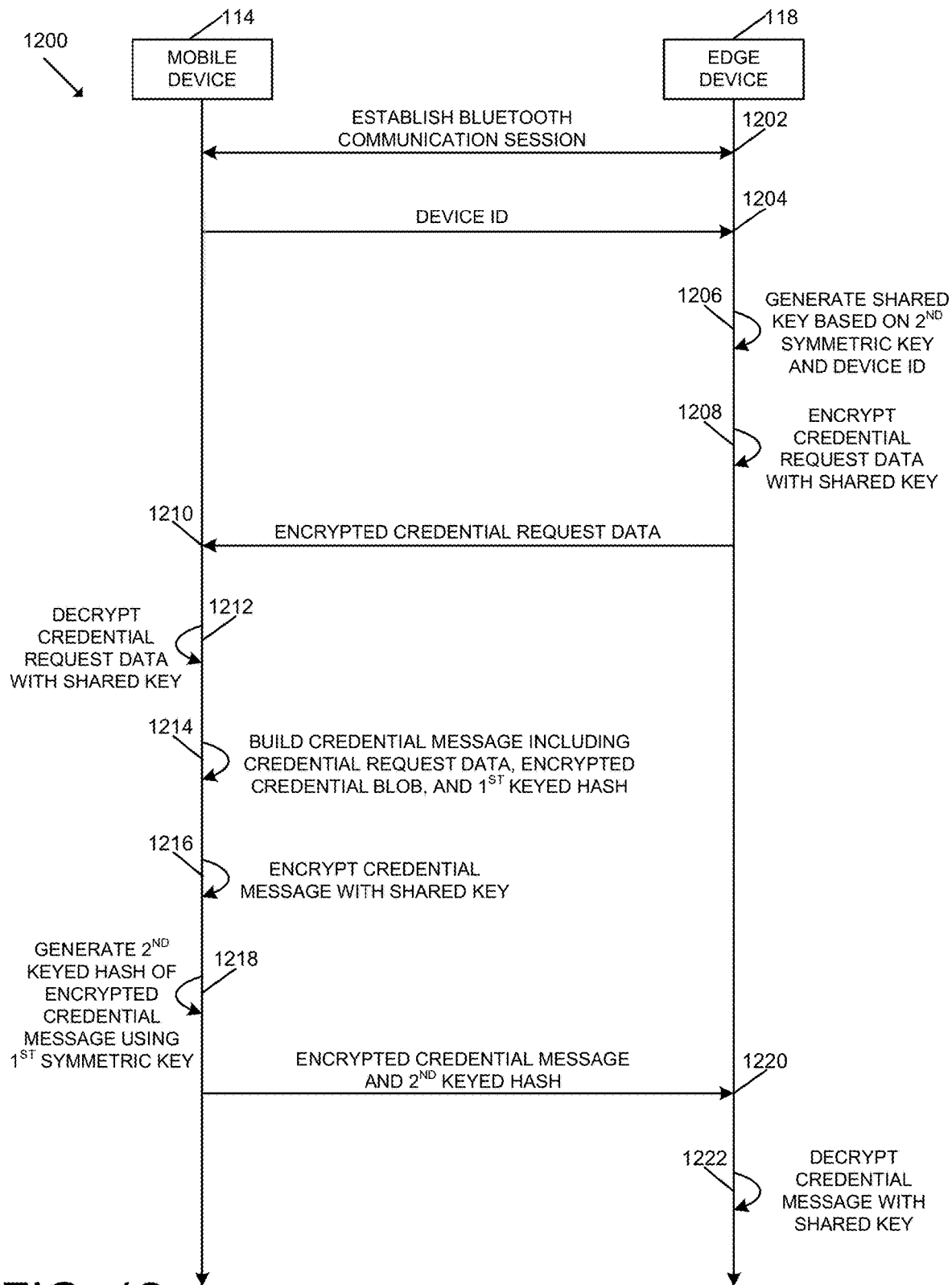
FIGS. 12-13 are a simplified flow diagram of at least one embodiment of a method of using the wireless access credential of FIG. 11.
Figure 13:
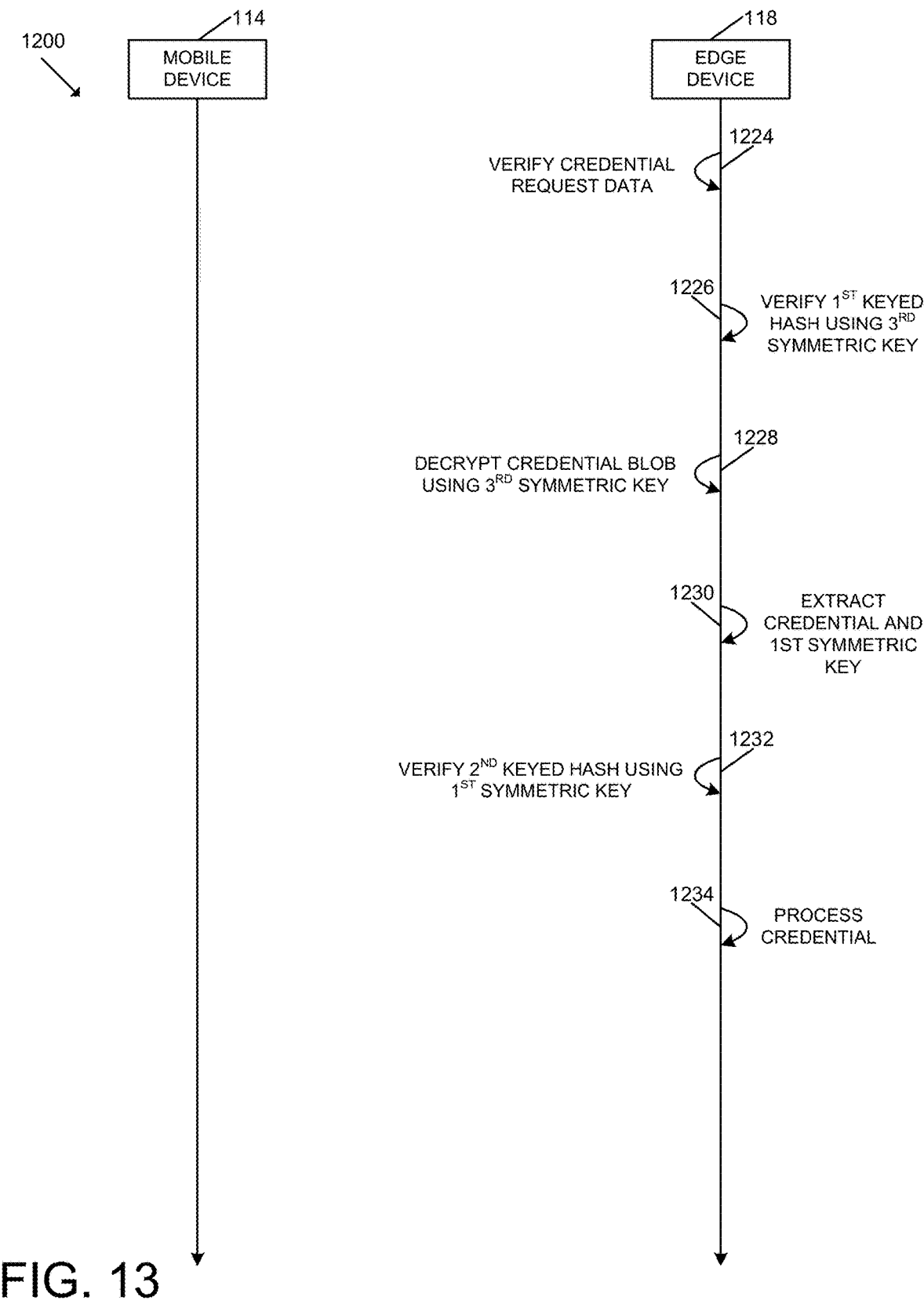

Referring now to FIGS. 12-13, in use, the access control system 100 may execute a method 1200 for using a wireless access credential (e.g., a wireless access credential stored to the mobile device 114 according to the method 1100 of FIG. 11). It should be appreciated that the particular flows of the method 1100 are illustrated by way of example, and such flows may be combined or divided, added or removed, and/or reordered in whole or in part depending on the particular embodiment, unless stated to the contrary. In some embodiments, the method 1200 of FIGS. 12-13 may be executed in conjunction with and subsequent to the method 1100 of FIG. 11.

As shown, the illustrative method 1200 involves the mobile device 114 (e.g., the mobile device 114 described in reference to FIG. 11) and an edge device 118. Also as described above in reference to FIG. 11, the illustrative method 1200 assumes that a cryptographic key exchange has occurred such that the cloud server 150 (see, for example, FIG. 11) and the edge device 118 share two symmetric cryptographic keys, K and B. Also, the mobile device 114 has stored thereon another symmetric cryptographic key, A. Further, in embodiments involving the method 1100 of FIG. 11 in conjunction with the method 1200 of FIGS. 12-13, the mobile device 114 also has stored thereon the encrypted credential blob ($E_K$(nonce||credential||A)), the keyed hash of the encrypted credential blob ($HMAC_K$), and the shared cryptographic key (M) after the execution of the method 1100 of FIG. 11.

The illustrative method 1200 begins with flow 1202 of FIG. 12 in which the mobile device 114 and the edge device 118 establish a Bluetooth communication session/connection with one another (e.g., a BLE 4.2 or newer connection). In doing so, the mobile device 114 and/or the edge device 118 may execute various Bluetooth-defined functions including, for example, getDevice( ), tryConnecting( ), onSuccess, tryDiscovering( ), and/or onServicesDiscovered( ) functions. In flow 1204, the mobile deice 114 transmits the device identifier (e.g., UUID) of the mobile device 114 to the edge device 118 (e.g., in the clear).

In flow 1206, the edge device 118 generates the shared cryptographic key, M, based on the symmetric cryptographic key, B, and the device identifier (e.g., UUID). As described above in reference to FIG. 11, in the illustrative embodiment, the cryptographic key, M, is shared in the sense that the edge device 118 is able to independently derive the same cryptographic key (e.g., based on the key, B, and the unique identifier) used by the cloud device 150 to previously generate the shared cryptographic key, M. It should be appreciated that the edge device 118 may use the same key derivation function and/or other key-generating function used by the cloud device 150 to previously generate the shared cryptographic key, M. As such, in the illustrative embodiment, the shared cryptographic key, M, is generated based on a HKDF.

In flow 1208, the edge device 118 encrypts credential request data with the shared cryptographic key, M In some embodiments, it should be appreciated that the credential request data may be embodied as, or otherwise include, a nonce value, for example, to reduce the efficacy of replay attacks. As such, in some embodiments, the encrypted credential request data may be represented as $E_M$(requestDat a). In flow 1210, the edge device 118 transmits the encrypted credential request data, $E_M$(requestDat a), to the mobile device 114 via the established Bluetooth communication connection.

In flow 1212, the mobile device 114 decrypts the encrypted credential request data using the shared cryptographic key, M, retrieved from a memory of the mobile device 114 and, in flow 1214, the mobile device 114 (e.g., using the mobile application) builds a credential message including the credential request data received from the edge device 118, the encrypted credential blob retrieved from the memory of the mobile device 114, and the keyed hash retrieved from the memory of the mobile device 114. As such, in some embodiments, the credential message may be represented as requestDat a||$E_K$(nonce||credential||A)||$HMAC_K$. In flow 1216, the mobile device 114 encrypts the credential message with the shared cryptographic key, M, and in flow 1218, the mobile device 114 generates a keyed hash of the encrypted credential message using the symmetric cryptographic key, A, retrieved from the memory of the mobile device 114. In particular, in the illustrative embodiment, mobile device 114 generates an HMAC of the encrypted credential message based on the symmetric cryptographic key, A (e.g., an HMAC-SHA256 keyed hash). However, it should be appreciated that another type of keyed hash may be generated in other embodiments.

In flow 1220, the mobile device 114 transmits the encrypted credential message ($E_K$(requestDat a||$E_K$(nonce||credential||A)||$HMAC_K$)) and the keyed hash ($HMAC_A$) of the encrypted credential message to the edge device 118. In flow 1222, the edge device 118 decrypts the encrypted credential message using the shared cryptographic key, K, retrieved from the memory of the edge device 118.

In flow 1224 of FIG. 13, the edge device 118 verifies the credential request data. For example, in embodiments in which the credential request data is a nonce, the edge device 118 may confirm that the nonce is the same as the nonce previously encrypted and transmitted to the mobile device 114 (see, for example, flows 1208-1210 of FIG. 12). In other embodiments, it should be appreciated that the edge device 118 may otherwise verify and/or validate the decrypted credential request data. In flow 1226, the edge device 118 verifies the keyed hash ($HMAC_K$) of the encrypted credential blob (e.g., extracted from the decrypted credential message) using the symmetric cryptographic key, K, retrieved from the memory of the edge device 118. In some embodiments, to do so, the edge device 118 generates a reference keyed hash (e.g., a reference HMAC) of the encrypted credential blob extracted from the decrypted credential message using the symmetric cryptographic key, K, and compares the reference keyed hash to the keyed hash (HMAC$_K$) of the encrypted credential blob extracted from the decrypted credential message to confirm the keyed hashes match.

In flow 1228, the edge device 118 decrypts the encrypted credential blob using the symmetric cryptographic key, K, retrieved from the memory of the edge device 118 and, in block 1230, the edge device 118 extracts the credential and the symmetric cryptographic key, A, from the decrypted credential blob. It should be appreciated that, in the illustrative embodiment, the edge device 118 and the cloud server 150 are capable of encrypting/decrypting the credential blob including the credential, whereas the mobile device 114 is not. Instead, in such embodiments, the mobile device 114 acts as a conduit for the secure transfer of the credential between the cloud server 150 and the edge device 118.

In flow 1232, the edge device 118 verifies the keyed hash (HMAC$_A$) of the encrypted credential message using the symmetric cryptographic key, A, extracted from the credential blob. In some embodiments, to do so, the edge device 118 generates a reference keyed hash (e.g., a reference HMAC) of the encrypted credential message received from the mobile device 114 using the symmetric cryptographic key, K, and compares the reference keyed hash to the keyed hash (HMAC$_A$) of the encrypted credential received from the mobile device 114 to confirm the keyed hashes match.

In flow 1234, the edge device 118 processes the credential extracted from the credential blob. For example, in some embodiments, the edge device 118 and/or other device(s) in the edge system 116 may make an access control decision based on the extracted credential and an access control database. As described above, the edge device 118 itself or another device (e.g., the administrative system 110, the access controller 134, etc.) may perform the access control decision based, for example, on whether a "decision at door" or "decision at host" access control scheme is employed, among other factors. Further, in some embodiments, in response to successful authentication of the credential, the lock device 132 may unlock a lock mechanism as described above. In some embodiments, it should be appreciated that further authentication of the user and/or the mobile device 114 may be required in advance of, or in conjunction with, the processing of the credential. For example, in some embodiments, the method 1400 of FIG. 14 may be executed to process a PIN of the user. In other embodiments, the user may be required to comply with a multi-factor authentication protocol requiring, for example, facial identification, thumb print, other biometrics, voice recognition, gestures, and/or additional information. It should be appreciated that, in some embodiments, the credential value and/or other portion of the credential may include an indicator that further authentication is required.

Although the flows 1202-1236 are described in a relatively serial manner, it should be appreciated that various flows of the method 1200 may be performed in parallel in some embodiments.

Figure 14:
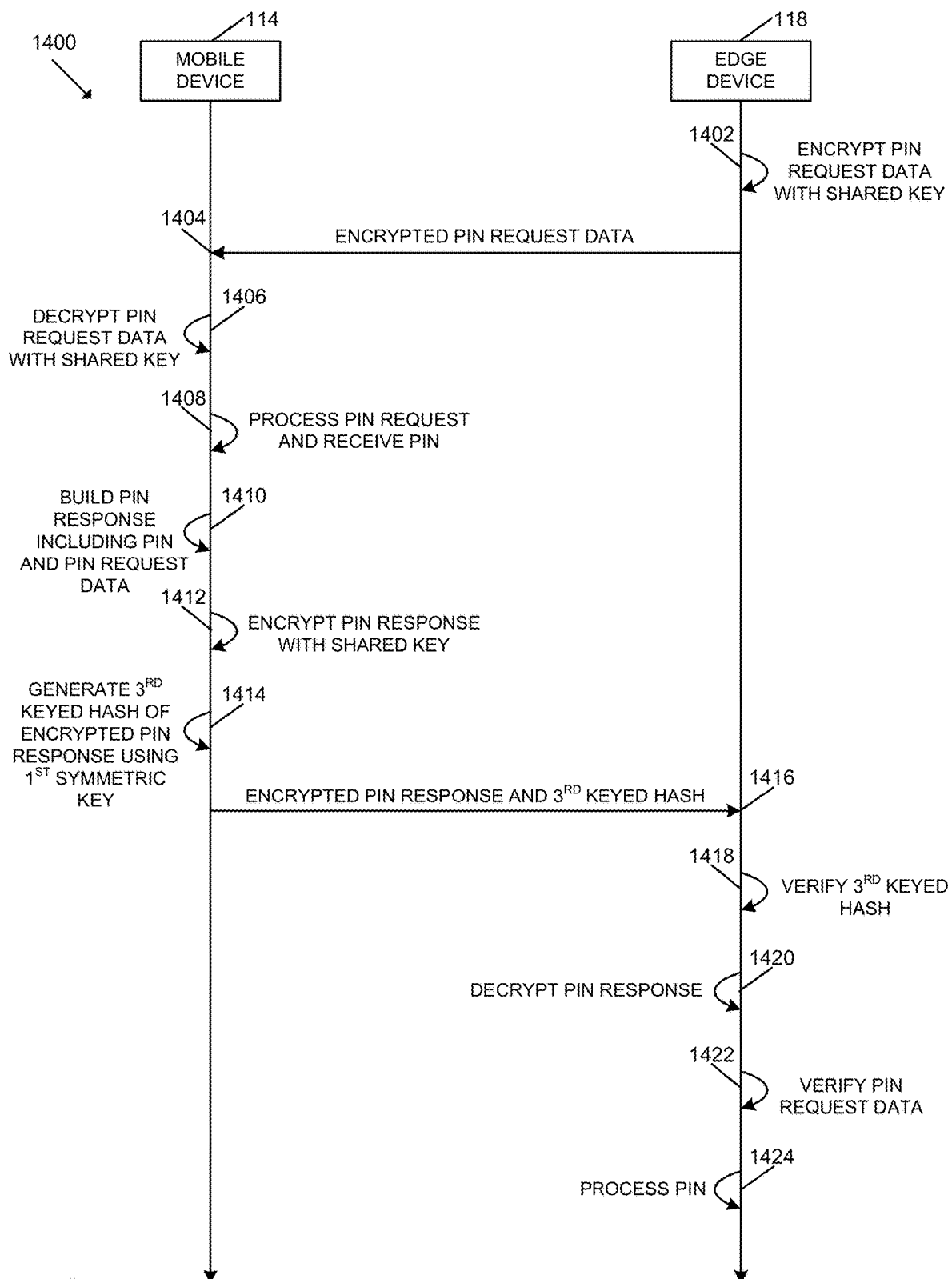
FIG. 14 is a simplified flow diagram of at least one embodiment of a method for further authenticating a user of the mobile device of FIG. 1.

Referring now to FIG. 14, in use, the access control system 100 may execute a method 1400 for further authenticating a user of the mobile device 114. It should be appreciated that the particular flows of the method 1400 are illustrated by way of example, and such flows may be combined or divided, added or removed, and/or reordered in whole or in part depending on the particular embodiment, unless stated to the contrary.

The illustrative method 1400 begins with flow 1402 of FIG. 14 in which the edge device 118 encrypts PIN request data with the shared cryptographic key, M In some embodiments, it should be appreciated that the PIN request data may be embodied as, or otherwise include, a nonce value, for example, to reduce the efficacy of replay attacks. As such, in some embodiments, the encrypted PIN request data may be represented as E$_M$(requestPIN). In flow 1404, the edge device 118 transmits the encrypted PIN request data, E$_M$ (requestPIN), to the mobile device 114.

In flow 1406, the mobile device 114 decrypts the encrypted PIN request data using the shared cryptographic key, M, retrieved from a memory of the mobile device 114. In flow 1408, mobile device 114 processes the PIN request and receives a PIN from the user. For example, in some embodiments, the mobile device 144 may present a request to the user for an input of a PIN value via a graphical user interface of the mobile application and receive the user's PIN input. Although the authentication data is described herein as a PIN or PIN value, it should be appreciated that the authentication data requested may vary depending on the particular embodiment. Further, in embodiments involving a PIN, the PIN may or may not be alphanumeric depending on the particular embodiment. Additionally, in some embodiments, the pin request and corresponding PIN may constitute a request and response for multiple data (e.g., in embodiments involving multifactor authentication).

In flow 1410, the mobile device 114 (e.g., using the mobile application) builds a PIN response including the PIN value received from the user and the decrypted PIN request data. As such, in some embodiments, the PIN response may be represented as requestPIN||PIN. In flow 1412, the mobile device 114 encrypts the PIN response with the shared cryptographic key, M, and in flow 1414, the mobile device 114 generates a keyed hash of the encrypted PIN request using the symmetric cryptographic key, A, retrieved from the memory of the mobile device 114. In particular, in the illustrative embodiment, mobile device 114 generates an HMAC of the encrypted PIN request based on the symmetric cryptographic key, A (e.g., an HMAC-SHA256 keyed hash). However, it should be appreciated that another type of keyed hash may be generated in other embodiments.

In flow 1416, the mobile device 114 transmits the encrypted PIN response (E$_M$ (requestPIN||PIN)) and the keyed hash (HMAC$_A$) of the encrypted PIN response to the edge device 118. In flow 1418, the edge device 118 verifies the keyed hash of the encrypted PIN request using the symmetric cryptographic key, A, retrieved from the memory of the edge device 118 (e.g., subsequently extracted from the decrypted credential blob as described above). In some embodiments, to do so, the edge device 118 generates a reference keyed hash (e.g., a reference HMAC) of the encrypted PIN response using the symmetric cryptographic key, A, and compares the reference keyed hash to the keyed hash (HMAC$_A$) received from the mobile device 114 to confirm the keyed hashes match. In flow 1420, the edge device 118 decrypts the encrypted PIN response using the shared cryptographic key, M, to extract the PIN request data and the user-provided PIN.

In flow 1422, the edge device 118 verifies the PIN request data. For example, in embodiments in which the PIN request data is a nonce, the edge device 118 may confirm that the nonce is the same as the nonce previously encrypted and transmitted to the mobile device 114 (see, for example, flows 1402-1404 of FIG. 14). In other embodiments, it should be appreciated that the edge device 118 may otherwise verify and/or validate the decrypted PIN request data. In flow 1424, the edge device 114 processes the user-provided PIN extracted from the decrypted PIN response. For example, in some embodiments, the edge device 118 and/or other device(s) in the edge system 116 may include a reference PIN value in an access control database against which the user-provided PIN value is compared to determine if the PIN values match.

Although the flows 1402-1424 are described in a relatively serial manner, it should be appreciated that various flows of the method 1400 may be performed in parallel in some embodiments.

Figure 15:
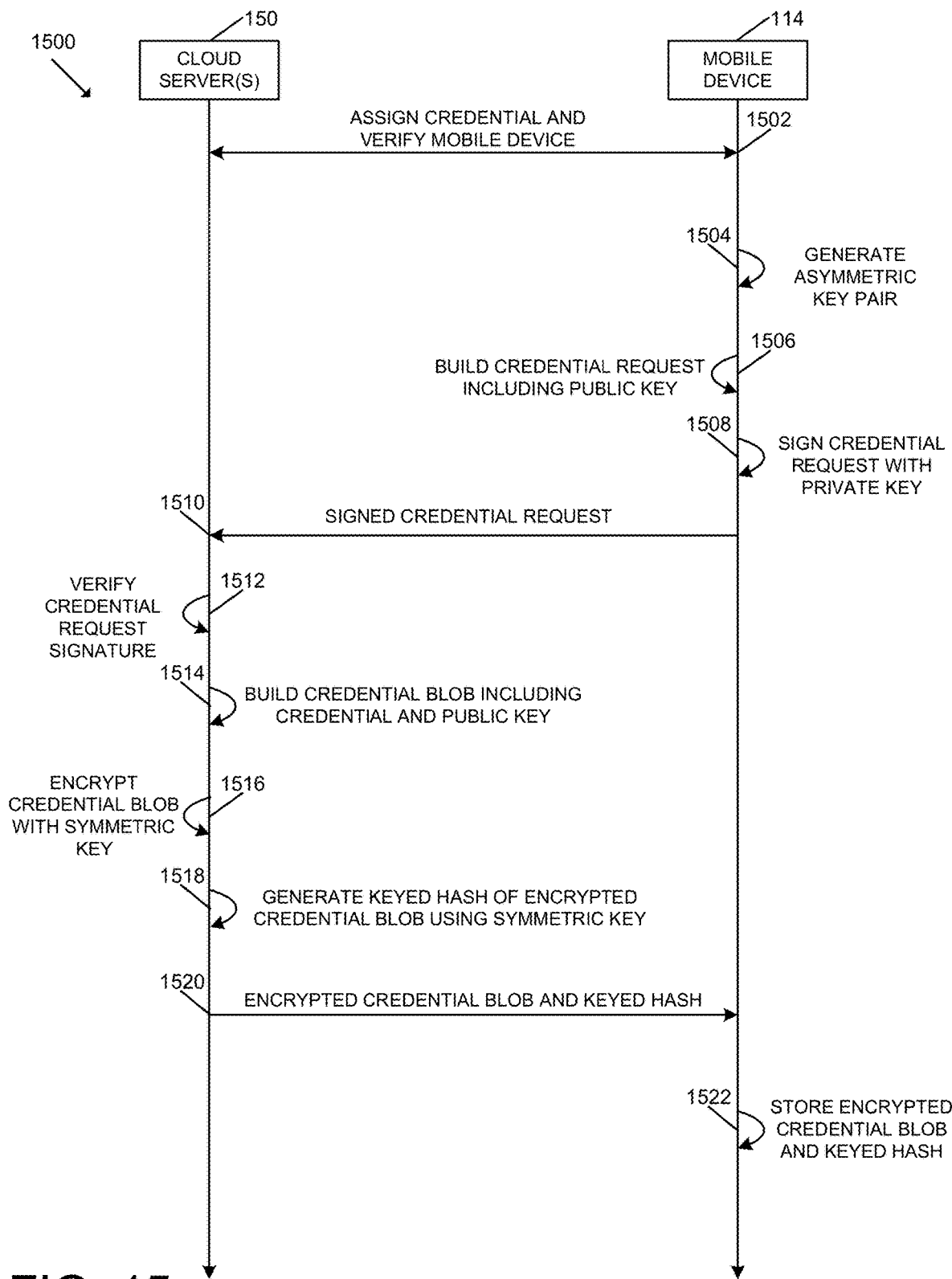
FIG. 15 is a simplified flow diagram of at least one embodiment of another method of storing a wireless access credential to the mobile device of FIG. 1.

Referring now to FIG. 15, in use, the access control system 100 may execute a method 1500 for storing a wireless access credential to the mobile device 114. It should be appreciated that the particular flows of the method 1500 are illustrated by way of example, and such flows may be combined or divided, added or removed, and/or reordered in whole or in part depending on the particular embodiment, unless stated to the contrary. Additionally, it should be appreciated that, in the illustrative embodiment, the method 1500 may be executed in conjunction with and prior to the method 1600 of FIGS. 16-17.

As shown, the illustrative method 1500 involves one or more cloud servers 150 and a mobile device 114 (e.g., executing a mobile application as described herein). As indicated above, the cloud server(s) 150 may be referred to herein in the singular for simplicity. Further, the illustrative method 1500 assumes that a cryptographic key exchange has occurred such that the cloud server 150 and an edge device 118 (see, for example, FIGS. 16-17) share a symmetric cryptographic key, K. It should appreciated that the cloud server 150 and the edge device 118 may employ any suitable key exchange algorithm to do so. Additionally, the symmetric cryptographic key, K, may vary by type and/or length depending on the particular embodiment. For example, in the illustrative embodiment, the symmetric cryptographic key, K, is embodied as 256-bit Advanced Encryption Standard (AES) keys. In other embodiments, however, the symmetric cryptographic keys may be associated with another cryptographic algorithm such as, for example, Data Encryption Standard (DES), Triple DES, Blowfish, Twofish, Serpent, and/or another symmetric cryptographic algorithm. Similarly, the key may be a 128-bit keys, 512-bit key, or another size in other embodiments (e.g., depending on the cryptographic algorithm). In some embodiments, the cryptographic key is generated by the cloud server 150 and transmitted to the edge device 118.

The illustrative method 1500 begins with flow 1502 of FIG. 15 in which the cloud server 150 and the mobile device 114 coordinate to assign a wireless access credential to a user (and therefore the mobile device 114 of that user) and verify the mobile device 114 (e.g., by confirming that the mobile number corresponds with the mobile device 114). It should be appreciated that, in some embodiments, the access control system 100 may execute the method 2200 of FIGS. 22-23 to do so. Further, in some embodiments, the mobile device 114 may establish a Transport Layer Security (TLS) connection with the cloud server 150 and/or other devices with which the mobile device 114 communicates.

In flow 1504, the mobile device 114 generates an asymmetric cryptographic key pair, (C,c), including a private cryptographic key, c, and a public cryptographic key, C, for storage to the mobile device 114 and use as described herein. It should be appreciated that they asymmetric cryptographic key pair and corresponding public/private keys may vary by type depending on the particular embodiment. For example, in the illustrative embodiment, the asymmetric cryptographic key pair is generated based on elliptical curve cryptography (ECC) based on the EC P256 curve. In other embodiments, the asymmetric cryptographic key pair may be associated with another suitable ECC curve. Further, in other embodiments, the asymmetric cryptographic key pair may be associated with another cryptographic algorithm such as, for example, Digital Signature Standard (DSS), Digital Signature Algorithm (DSA), Rivest-Shamir-Adleman (RSA), ElGamal, and/or another asymmetric cryptographic algorithm. Similarly, the public/private key sizes may vary depending, for example, on the particular algorithm employed. In some embodiments, the asymmetric cryptographic key pair may be generated and stored on the mobile device 114 in advance of the execution of the method 1500 of FIG. 15. Further, it should be appreciated that the mobile device 114 may generate the asymmetric cryptographic key pair, (C,c), in a trusted execution environment (TEE) or secure enclave in some embodiments.

In flow 1506, the mobile device 114 (e.g., using the mobile application) builds a credential request including the public key, C, of the cryptographic key pair (C,c) retrieved from a memory of the mobile device 114. Further, in some embodiments, the credential request may identify the payload as a credential request (e.g., via a corresponding flag, CRED_REQ). As such, in some embodiments, the credential request may be represented as CRED_REQ∥C. In flow 1508, the mobile device 114 cryptographically signs the credential request using the private key, c, of the cryptographic key pair (C,c) retrieved from a memory of the mobile device 114. In other words, the mobile device 114 generates a cryptographic signature of the credential request. In flow 1510, the mobile device 114 transmits the signed credential request to the cloud server 150 (e.g., via a TLS connection). As such, in the illustrative embodiment, the mobile device 114 transmits the credential request and the signature thereof to the cloud server 150.

In flow 1512, the cloud server 150 extracts the public key, C, from the credential request received from the mobile device 114 and verifies the credential request signature using that public key. That is, the cloud server 150 verifies that the credential request was signed using the private key that corresponds with the public key, C. It should be appreciated that the cloud server 150 executes the appropriate asymmetric signature verification algorithm based on the type of the cryptographic key pair (e.g., ECC in the illustrative embodiment).

In flow 1514, the cloud server 150 builds a credential blob including the credential to be transmitted to the mobile device (i.e., the credential assigned to the mobile device 114 and the user) and the public key, C. Further, in some embodiments, the credential blob may further include a nonce value, for example, to reduce the efficacy of replay attacks. As such, in some embodiments, the credential blob may be represented as nonce∥C∥credential. In flow 1516, the cloud server 150 encrypts the credential blob with the symmetric cryptographic key, K, and, in flow 1518, the cloud server 150 generates a keyed hash of the encrypted credential blob using the same symmetric cryptographic key, K. In particular, in the illustrative embodiment, the cloud server 150 generates an HMAC of the encrypted credential blob based on the symmetric cryptographic key, K (e.g., an HMAC-SHA256 keyed hash). However, it should be appreciated that another type of keyed hash may be generated in other embodiments.

In flow 1520, the cloud server 150 transmits the encrypted credential blob ($E_K$ (nonce∥C∥credential)) and the keyed hash of the encrypted credential blob to the mobile device 114. In particular, in some embodiments, a payload including those data may be represented as $E_K$ (nonce||C||credential)||$HMAC_K$. In flow 1522, the mobile device 114 stores the encrypted credential blob ($E_K$ (nonce||C||credential)) and the keyed hash of the encrypted credential blob ($HMAC_K$) to a memory of the mobile device 114. As such, it should be appreciated that, in the illustrative embodiment, the mobile device 114 now has a credential stored thereon that is tied to the mobile device 114, but the mobile device 114 is unable to read the credential data due to the encryption. It should be appreciated that, in some embodiments, the memory of the mobile device 114 to which such data is stored is a secure memory.

Although the flows 1502-1522 are described in a relatively serial manner, it should be appreciated that various flows of the method 1500 may be performed in parallel in some embodiments.

Figure 16:
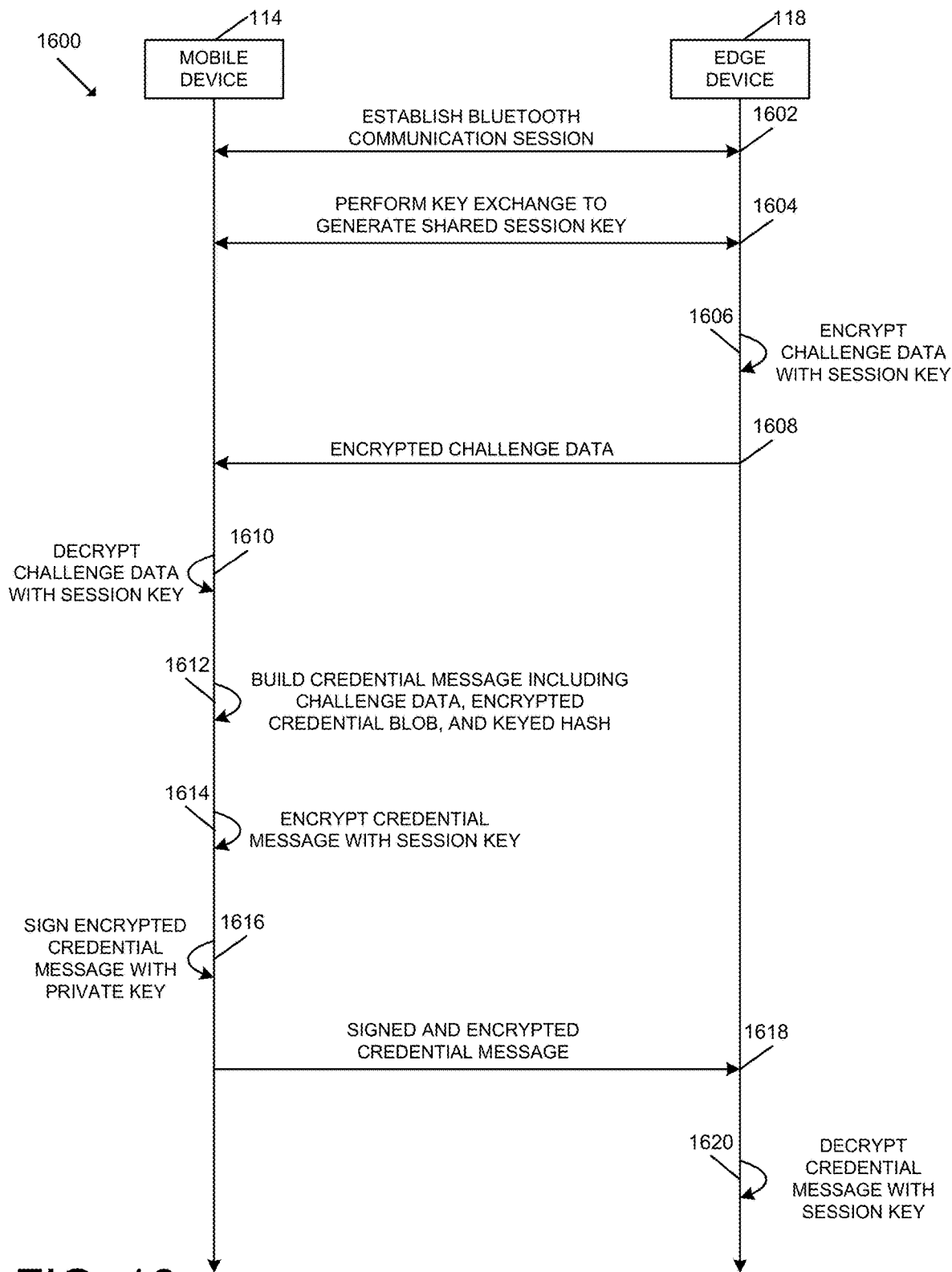
FIGS. 16-17 are a simplified flow diagram of at least one embodiment of a method of using the wireless access credential of FIG. 15.
Figure 17:
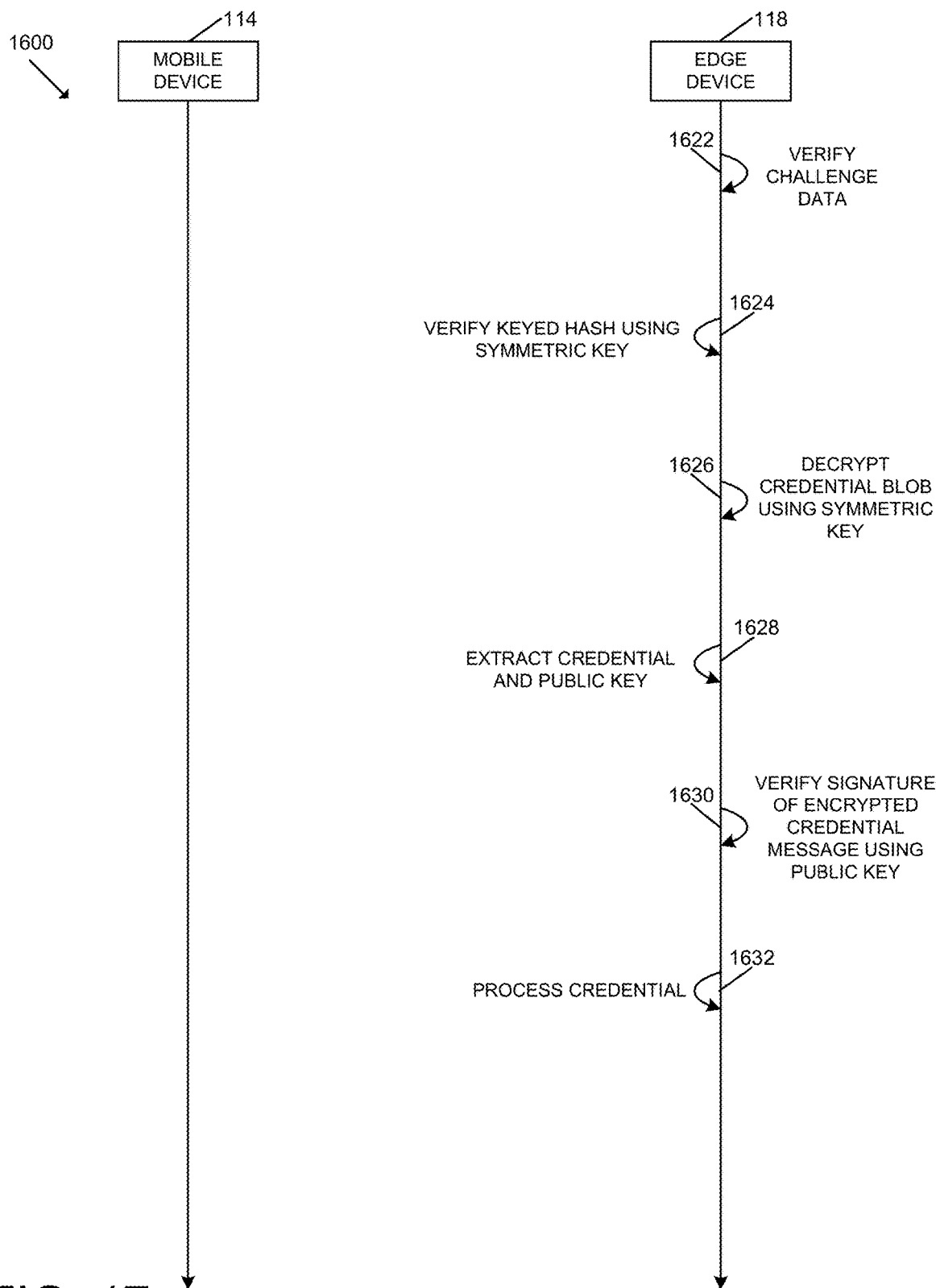

Referring now to FIGS. 16-17, in use, the access control system 100 may execute a method 1600 for using a wireless access credential (e.g., a wireless access credential stored to the mobile device 114 according to the method 1500 of FIG. 15). It should be appreciated that the particular flows of the method 1600 are illustrated by way of example, and such flows may be combined or divided, added or removed, and/or reordered in whole or in part depending on the particular embodiment, unless stated to the contrary. In some embodiments, the method 1600 of FIGS. 12-13 may be executed in conjunction with and subsequent to the method 1500 of FIG. 15.

As shown, the illustrative method 1600 involves the mobile device 114 (e.g., the mobile device 114 described in reference to FIG. 15) and an edge device 118. Also as described above in reference to FIG. 15, the illustrative method 1600 assumes that a cryptographic key exchange has occurred such that the cloud server 150 (see, for example, FIG. 15) and the edge device 118 share a symmetric cryptographic key, K. Also, the mobile device 114 has stored thereon the asymmetric cryptographic key pair, (C,c), including a private cryptographic key, c, and a public cryptographic key, C, described above. Further, in embodiments involving the method 1500 of FIG. 15 in conjunction with the method 1600 of FIGS. 16-17, the mobile device 114 also has stored thereon the encrypted credential blob ($E_K$ (nonce||C||credential)) and the keyed hash of the encrypted credential blob ($HMAC_K$) after the execution of the method 1500 of FIG. 15.

The illustrative method 1600 begins with flow 1602 of FIG. 16 in which the mobile device 114 and the edge device 118 establish a Bluetooth communication session/connection with one another (e.g., a BLE 4.2 or newer connection). In doing so, the mobile device 114 and/or the edge device 118 may execute various Bluetooth-defined functions including, for example, getDevice( ), tryConnecting( ), onSuccess, tryDiscovering( ) and/or onServicesDiscovered( ) functions. In flow 1604, the mobile device 114 and the edge device 118 perform a secure key exchange to generate a shared cryptographic session key, s, separately at each of the mobile device 114 and the edge device 118. In the illustrative embodiment, the session key, s, is generated based on Elliptical Curve Diffie-Hellman (ECDH). By using ECDH instead of HKDF to perform a key exchange, it should be appreciated that the shared cryptographic session key, s, is dynamic in the sense that the key is different every time the key is generated. As such, in some embodiments, each exchange may have a different session key. More specifically, in some embodiments, the mobile device 114 and the edge device 118 may execute a method similar to the method 2600 of FIG. 26 to perform the secure key exchange. However, it should be appreciated that the session key, s, may be generated based on a different key derivation function and/or other suitable algorithm in other embodiments. Following the execution of the secure key exchange, each of the mobile device 114 and the edge device 118 has the same session key, s, stored thereon.

In flow 1606, the edge device 118 encrypts challenge data with the shared cryptographic session key, s. In some embodiments, it should be appreciated that the challenge data may be embodied as, or otherwise include, a nonce value, for example, to reduce the efficacy of replay attacks. As such, in some embodiments, the encrypted challenge data may be represented as $E_s$(challenge). In flow 1608, the edge device 118 transmits the encrypted challenge data, $E_s$(challenge), to the mobile device 114 via the established Bluetooth communication connection.

In flow 1610, the mobile device 114 decrypts the encrypted challenge data using the shared cryptographic session key, s, retrieved from a memory of the mobile device 114 and, in flow 1612, the mobile device 114 (e.g., using the mobile application) builds a credential message including the challenge data received from the edge device 118, the encrypted credential blob retrieved from the memory of the mobile device 114, and the keyed hash retrieved from the memory of the mobile device 114. As such, in some embodiments, the credential message may be represented as challenge||$E_K$(nonce||credential)||$HMAC_K$. In flow 1614, the mobile device 114 encrypts the credential message with the shared cryptographic session key, s, and in flow 1616, the mobile device 114 cryptographically signs the encrypted credential message using the private key, c, of the cryptographic key pair (C,c) retrieved from a memory of the mobile device 114. In other words, the mobile device 114 generates a cryptographic signature (cSig) of the encrypted credential message.

In flow 1618, the mobile device 114 transmits the signed credential message to the edge device 118. As such, in the illustrative embodiment, the mobile device 114 transmits the encrypted credential message and the signature thereof to the edge device 118. In flow 1620, the edge device 118 decrypts the encrypted credential message using the shared cryptographic session key, s, retrieved from the memory of the edge device 118.

In flow 1622 of FIG. 17, the edge device 118 verifies the challenge data. For example, in embodiments in which the challenge data is a nonce, the edge device 118 may confirm that the nonce is the same as the nonce previously encrypted and transmitted to the mobile device 114 (see, for example, flows 1606-1608 of FIG. 16). In other embodiments, it should be appreciated that the edge device 118 may otherwise verify and/or validate the decrypted challenge data. In flow 1624, the edge device 118 verifies the keyed hash ($HMAC_K$) of the encrypted credential blob (e.g., extracted from the decrypted credential message) using the symmetric cryptographic key, K, retrieved from the memory of the edge device 118. In some embodiments, to do so, the edge device 118 generates a reference keyed hash (e.g., a reference HMAC) of the encrypted credential blob extracted from the decrypted credential message using the symmetric cryptographic key, K, and compares the reference keyed hash to the keyed hash ($HMAC_K$) of the encrypted credential blob extracted from the decrypted credential message to confirm the keyed hashes match.

In flow 1626, the edge device 118 decrypts the encrypted credential blob using the symmetric cryptographic key, K, retrieved from the memory of the edge device 118 and, in block 1628, the edge device 118 extracts the credential and the public cryptographic key, C, from the decrypted credential blob. It should be appreciated that, in the illustrative embodiment, the edge device 118 and the cloud server 150 are capable of encrypting/decrypting the credential blob including the credential, whereas the mobile device 114 is not. Instead, in such embodiments, the mobile device 114 acts as a conduit for the secure transfer of the credential between the cloud server 150 and the edge device 118. Further, in the illustrative embodiment, the public cryptographic key, C, is not directly transmitted from the mobile device 114 to the edge device 118. As such, the public cryptographic key, C, may be leveraged to verify that the mobile device 114 that made the initial contact with the cloud server 150 is the same device that signed the payload (e.g., the encrypted credential message) toward the end of the communication sequence.

In flow 1630, the edge device 118 verifies the signature of the encrypted credential message using the public cryptographic key, C, extracted from the decrypted credential blob. That is, the edge device 118 verifies that the encrypted credential message was signed using the private key that corresponds with the public key, C. It should be appreciated that the edge device 118 executes the appropriate asymmetric signature verification algorithm based on the type of the cryptographic key pair (e.g., ECC in the illustrative embodiment).

It should be appreciated that the credential payload (e.g., the encrypted credential blob) stored to the mobile device in flow 1522 of FIG. 15 includes the public cryptographic key, C, that is associated with and stored on the mobile device 114 and provided to the mobile access hub 112 at onboarding. As such, when the credential message is subsequently delivered to the edge device 118 with the cryptographic signature (cSig) in flow 1618 of FIG. 16, the public cryptographic key, C, verifies that the credential is associated with the same mobile device 114. As such, in the illustrative embodiment, if the credential is copied to a different mobile device 114, the verification of the cryptographic signature (cSig) will fail, because the cryptographic key pair (C,c) is unique for each mobile device 114. In other words, the use of the cryptographic key pair (C,c) as described herein serves, for example, to prevent the unauthorized copying of a credential to a different mobile device 114.

In flow 1632, the edge device 118 processes the credential extracted from the credential blob. It should be appreciated that the credential may be processed in a manner similar to that described in reference to flow 1234 of FIG. 13. As such, in some embodiments, the edge device 118 and/or other device(s) in the edge system 116 may make an access control decision based on the extracted credential and an access control database. Further, the edge device 118 itself or another device (e.g., the administrative system 110, the access controller 134, etc.) may perform the access control decision based on the particular embodiment. Further, in some embodiments, in response to successful authentication of the credential, the lock device 132 may unlock a lock mechanism as described above. In some embodiments, it should be appreciated that further authentication of the user and/or the mobile device 114 may be required in advance of, or in conjunction with, the processing of the credential. For example, in some embodiments, the method 1800 of FIG. 18 may be executed to process a PIN of the user. In other embodiments, the user may be required to comply with a multi-factor authentication protocol requiring, for example, facial identification, thumb print, other biometrics, voice recognition, gestures, and/or additional information. It should be appreciated that, in some embodiments, the credential value and/or other portion of the credential may include an indicator that further authentication is required.

Although the flows 1602-1632 are described in a relatively serial manner, it should be appreciated that various flows of the method 1600 may be performed in parallel in some embodiments.

Figure 18:
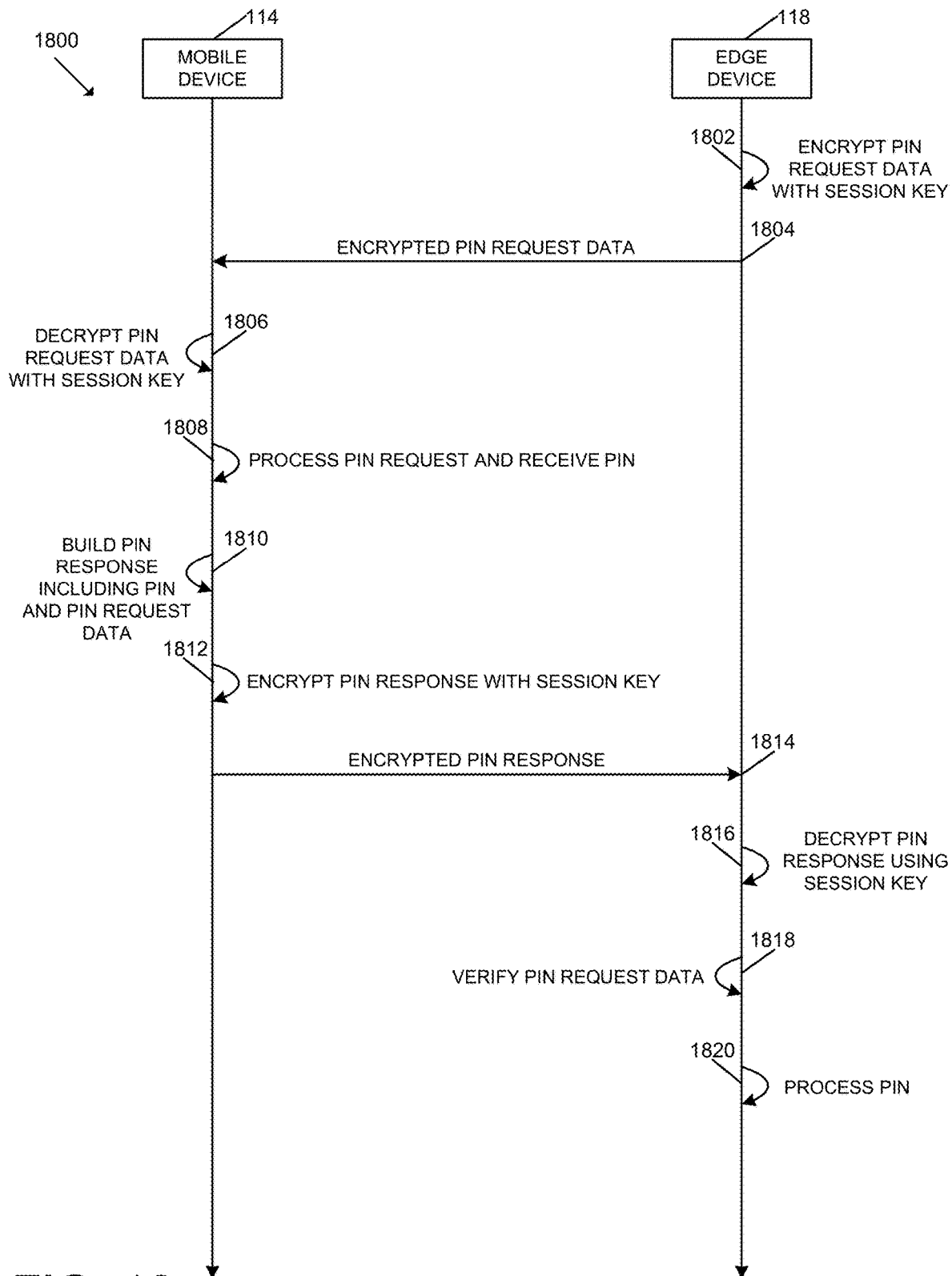
FIG. 18 is a simplified flow diagram of at least one embodiment of another method for further authenticating a user of the mobile device of FIG. 1.

Referring now to FIG. 18, in use, the access control system 100 may execute a method 1800 for further authenticating a user of the mobile device 114. It should be appreciated that the particular flows of the method 1800 are illustrated by way of example, and such flows may be combined or divided, added or removed, and/or reordered in whole or in part depending on the particular embodiment, unless stated to the contrary. Although the techniques are generally described herein in reference to a PIN value, it should be appreciated that similar techniques may be employed with respect to other secondary credential/authentication data. For example, in some embodiments, facial identification, thumb print, other biometrics, voice recognition, gestures, and/or other relevant authentication data may be used in conjunction with the method 1800 and other techniques described herein.

The illustrative method 1800 begins with flow 1802 of FIG. 18 in which the edge device 118 encrypts PIN request data with the shared cryptographic session key, s. In some embodiments, it should be appreciated that the PIN request data may be embodied as, or otherwise include, a nonce value, for example, to reduce the efficacy of replay attacks. As such, in some embodiments, the encrypted PIN request data may be represented as $E_s(\text{requestPIN})$. In flow 1804, the edge device 118 transmits the encrypted PIN request data, $E_s$ (requestPIN), to the mobile device 114.

In flow 1806, the mobile device 114 decrypts the encrypted PIN request data using the shared cryptographic session key, s, retrieved from a memory of the mobile device 114. In flow 1808, mobile device 114 processes the PIN request and receives a PIN from the user (e.g., in a manner similar to that described above in reference to the method 1400 of FIG. 14). For example, in some embodiments, the mobile device 144 may present a request to the user for an input of a PIN value via a graphical user interface of the mobile application and receive the user's PIN input. As indicated above, although the authentication data is described herein as a PIN or PIN value, it should be appreciated that the authentication data requested may vary (e.g., in type, source, format, etc.) depending on the particular embodiment.

In flow 1810, the mobile device 114 (e.g., using the mobile application) builds a PIN response including the PIN value received from the user and the decrypted PIN request data. As such, in some embodiments, the PIN response may be represented as requestPIN∥PIN. In flow 1812, the mobile device 114 encrypts the PIN response with the shared cryptographic session key, s, and in flow 1814, the mobile device 114 transmits the encrypted PIN response ($E_s$(requestPIN∥PIN)) to the edge device 118. It should be appreciated that, in some embodiments, the mobile device 114 may further generate a keyed hash of the encrypted PIN request (e.g., as in the method 1400 of FIG. 14) or otherwise convey data indicative of the integrity of the message.

In flow 1816, the edge device 118 decrypts the encrypted PIN response using the shared cryptographic session key, s, to extract the PIN request data and the user-provided PIN and, in flow 1818, the edge device 118 verifies the PIN request data. For example, in embodiments in which the PIN request data is a nonce, the edge device 118 may confirm that the nonce is the same as the nonce previously encrypted and transmitted to the mobile device 114 (see, for example, flows 1802-1804 of FIG. 18). In other embodiments, it should be appreciated that the edge device 118 may otherwise verify and/or validate the decrypted PIN request data. In flow 1820, the edge device 114 processes the user-provided PIN extracted from the decrypted PIN response (e.g., in a manner similar to that described in reference to the method 1400 of FIG. 14 and/or otherwise described herein). For example, in some embodiments, the edge device 118 and/or other device(s) in the edge system 116 may include a reference PIN value in an access control database against which the user-provided PIN value is compared to determine if the PIN values match.

Although the flows 1802-1820 are described in a relatively serial manner, it should be appreciated that various flows of the method 1800 may be performed in parallel in some embodiments.

Figure 19:
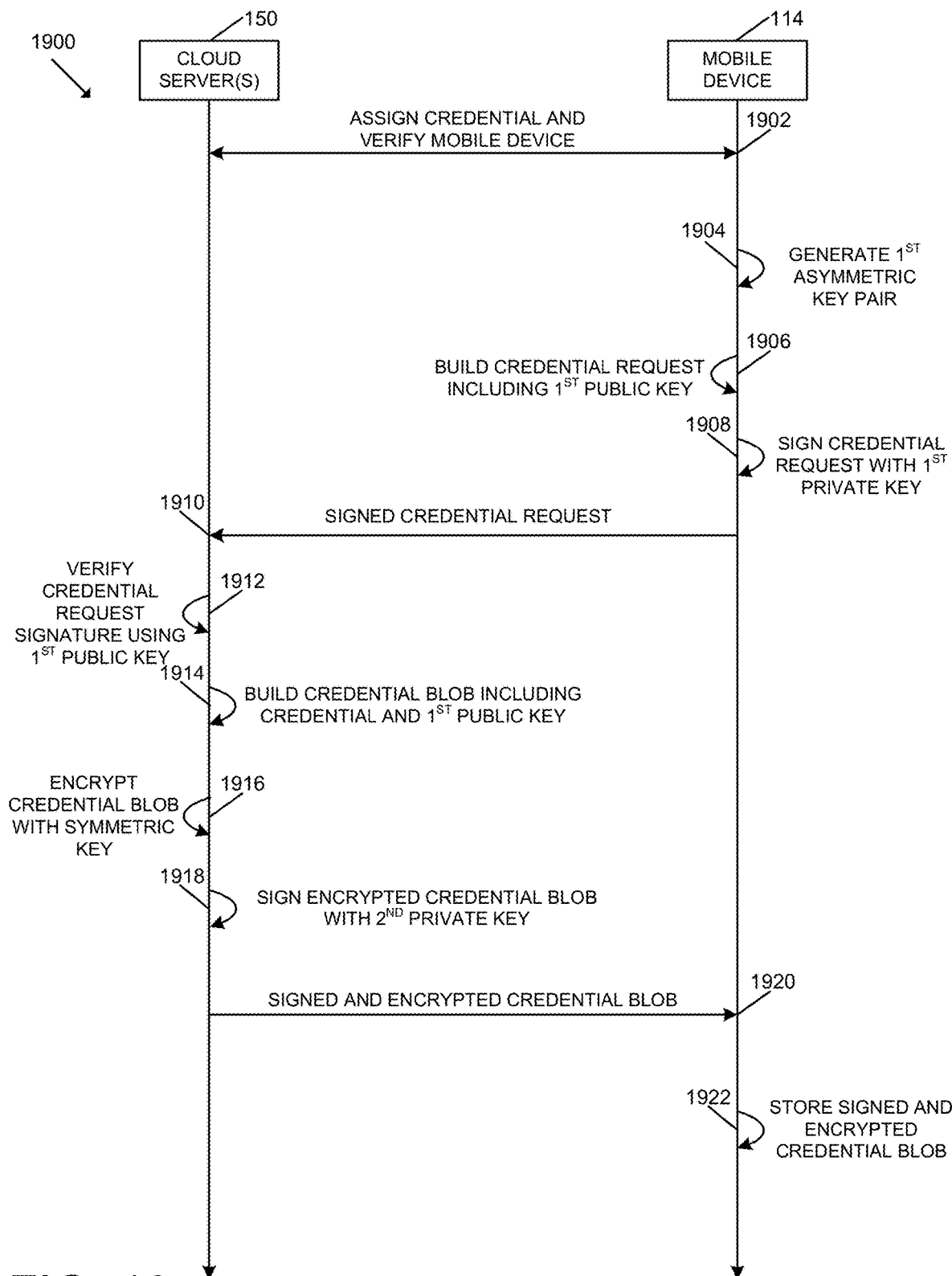
FIG. 19 is a simplified flow diagram of at least one embodiment of yet another method of storing a wireless access credential to the mobile device of FIG. 1.

Referring now to FIG. 19, in use, the access control system 100 may execute a method 1900 for storing a wireless access credential to the mobile device 114. It should be appreciated that the particular flows of the method 1900 are illustrated by way of example, and such flows may be combined or divided, added or removed, and/or reordered in whole or in part depending on the particular embodiment, unless stated to the contrary. Additionally, it should be appreciated that, in the illustrative embodiment, the method 1900 may be executed in conjunction with and prior to the method 2000 of FIGS. 20-21.

As shown, the illustrative method 1900 involves one or more cloud servers 150 and a mobile device 114 (e.g., executing a mobile application as described herein). As indicated above, the cloud server(s) 150 may be referred to herein in the singular for simplicity. Further, the illustrative method 1900 assumes that a cryptographic key exchange has occurred such that the cloud server 150 and an edge device 118 (see, for example, FIGS. 20-21) share a symmetric cryptographic key, K. It should appreciated that the cloud server 150 and the edge device 118 may employ any suitable key exchange algorithm to do so. Additionally, the symmetric cryptographic key, K, may vary by type and/or length depending on the particular embodiment. For example, in the illustrative embodiment, the symmetric cryptographic key, K, is embodied as 256-bit Advanced Encryption Standard (AES) keys. In other embodiments, however, the symmetric cryptographic keys may be associated with another cryptographic algorithm such as, for example, Data Encryption Standard (DES), Triple DES, Blowfish, Twofish, Serpent, and/or another symmetric cryptographic algorithm. Similarly, the key may be a 128-bit keys, 512-bit key, or another size in other embodiments (e.g., depending on the cryptographic algorithm). In some embodiments, the cryptographic key is generated by the cloud server 150 and transmitted to the edge device 118.

It should also appreciated that the illustrative method 1900 further assumes that an asymmetric cryptographic key pair, (D,d), including a private cryptographic key, d, and a public cryptographic key, D, has been generated and stored to the cloud server 150, and that the public cryptographic key, D, has been stored to the edge device 118 for use as described herein. It should be appreciated that they asymmetric cryptographic key pair, (D,d), and corresponding public/private keys may vary by type depending on the particular embodiment. For example, in the illustrative embodiment, the asymmetric cryptographic key pair, (D,d), is generated based on elliptical curve cryptography (ECC) based on the EC P256 curve. In other embodiments, the asymmetric cryptographic key pair may be associated with another suitable ECC curve. Further, in other embodiments, the asymmetric cryptographic key pair may be associated with another cryptographic algorithm such as, for example, Digital Signature Standard (DSS), Digital Signature Algorithm (DSA), Rivest-Shamir-Adleman (RSA), ElGamal, and/or another asymmetric cryptographic algorithm. Similarly, the public/private key sizes may vary depending, for example, on the particular algorithm employed. In some embodiments, the asymmetric cryptographic key pair, (D,d), may be generated by the cloud server 150 and the public cryptographic key, D, may be securely transmitted to the edge device 118 according to any suitable exchange protocol or provisioning mechanism.

The illustrative method 1900 begins with flow 1902 of FIG. 19 in which the cloud server 150 and the mobile device 114 coordinate to assign a wireless access credential to a user (and therefore the mobile device 114 of that user) and verify the mobile device 114 (e.g., by confirming that the mobile number corresponds with the mobile device 114). It should be appreciated that, in some embodiments, the access control system 100 may execute the method 2200 of FIGS. 22-23 to do so. Further, in some embodiments, the mobile device 114 may establish a Transport Layer Security (TLS) connection with the cloud server 150 and/or other devices with which the mobile device 114 communicates.

In flow 1904, the mobile device 114 generates an asymmetric cryptographic key pair, (C,c), including a private cryptographic key, c, and a public cryptographic key, C, for storage to the mobile device 114 and use as described herein. Similar to the asymmetric cryptographic key pair, (D,d), it should be appreciated that they asymmetric cryptographic key pair, (C,c), and corresponding public/private keys may vary by type depending on the particular embodiment. In some embodiments, it should be appreciated that the asymmetric cryptographic key pair, (C,c), may be a similar type of key pair as the asymmetric cryptographic key pair, (D,d), described above. For example, in the illustrative embodiment, the asymmetric cryptographic key pair, (C,c), is generated based on elliptical curve cryptography (ECC) based on the EC P256 curve. In other embodiments, the asymmetric cryptographic key pair may be associated with another suitable ECC curve. Further, in other embodiments, the asymmetric cryptographic key pair, (C,c), may be associated with another cryptographic algorithm such as, for example, Digital Signature Standard (DSS), Digital Signature Algorithm (DSA), Rivest-Shamir-Adleman (RSA), ElGamal, and/or another asymmetric cryptographic algorithm. Similarly, the public/private key sizes may vary depending, for example, on the particular algorithm employed. In some embodiments, the asymmetric cryptographic key pair, (C,c), may be generated and stored on the mobile device 114 in advance of the execution of the method 1900 of FIG. 19. Further, it should be appreciated that the mobile device 114 may generate the asymmetric cryptographic key pair, (C,c), in a trusted execution environment (TEE) or secure enclave in some embodiments.

In flow 1906, the mobile device 114 (e.g., using the mobile application) builds a credential request including the public key, C, of the cryptographic key pair (C,c) retrieved from a memory of the mobile device 114. Further, in some embodiments, the credential request may identify the payload as a credential request (e.g., via a corresponding flag, CRED_REQ). As such, in some embodiments, the credential request may be represented as CRED_REQ∥C. In flow 1908, the mobile device 114 cryptographically signs the credential request using the private key, c, of the cryptographic key pair, (C,c), retrieved from a memory of the mobile device 114. In other words, the mobile device 114 generates a cryptographic signature of the credential request. In flow 1910, the mobile device 114 transmits the signed credential request to the cloud server 150 (e.g., via a TLS connection). As such, in the illustrative embodiment, the mobile device 114 transmits the credential request and the signature thereof to the cloud server 150.

In flow 1912, the cloud server 150 extracts the public key, C, from the credential request received from the mobile device 114 and verifies the credential request signature using that public key. That is, the cloud server 150 verifies that the credential request was signed using the private key that corresponds with the public key, C. It should be appreciated that the cloud server 150 executes the appropriate asymmetric signature verification algorithm based on the type of the cryptographic key pair (e.g., ECC in the illustrative embodiment).

In flow 1914, the cloud server 150 builds a credential blob including the credential to be transmitted to the mobile device (i.e., the credential assigned to the mobile device 114 and the user) and the public key, C. Further, in some embodiments, the credential blob may further include a nonce value, for example, to reduce the efficacy of replay attacks. As such, in some embodiments, the credential blob may be represented as nonce||C||credential. In flow 1916, the cloud server 150 encrypts the credential blob with the symmetric cryptographic key, K, and, in flow 1918, the cloud server 150 cryptographically signs the encrypted credential blob using the private key, d, of the cryptographic key pair, (D,d), stored in the memory of the cloud server 150. In other words, the cloud server 150 generates a cryptographic signature of the encrypted credential blob.

In flow 1920, the cloud server 150 transmits the encrypted credential blob ($E_K$(nonce||C||credential)) and the signature thereof to the mobile device 114. In flow 1922, the cloud server 150 stores the encrypted credential blob ($E_K$(nonce||C||credential)) and the signature thereof to a memory of the mobile device 114. As such, it should be appreciated that, in the illustrative embodiment, the mobile device 114 now has a credential stored thereon that is tied to the mobile device 114, but the mobile device 114 is unable to read the credential data due to the encryption. It should be appreciated that, in some embodiments, the memory of the mobile device 114 to which such data is stored is a secure memory.

Although the flows 1902-1922 are described in a relatively serial manner, it should be appreciated that various flows of the method 1900 may be performed in parallel in some embodiments.

Figure 20:
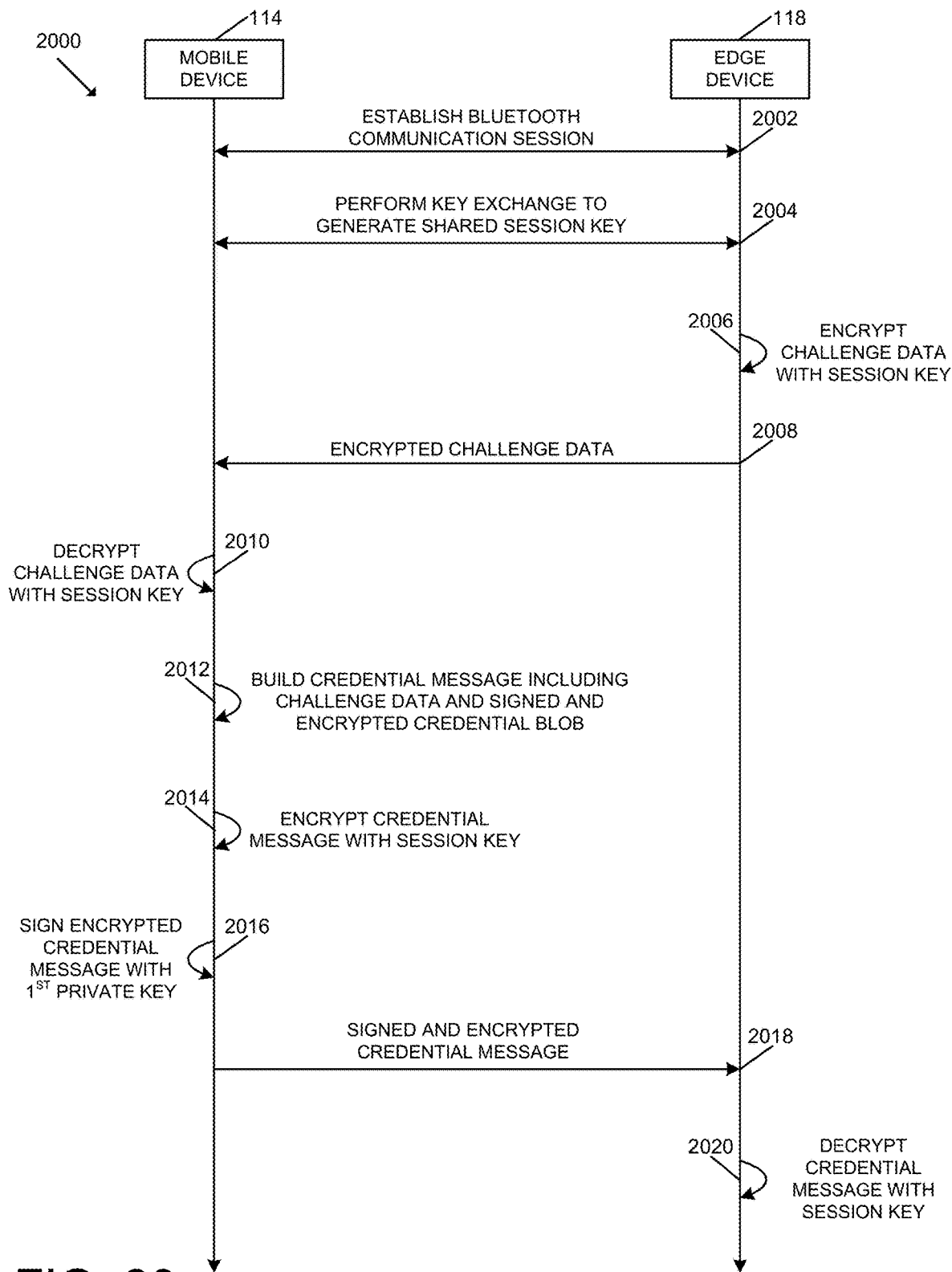
FIGS. 20-21 are a simplified flow diagram of at least one embodiment of a method of using the wireless access credential of FIG. 19.
Figure 21:
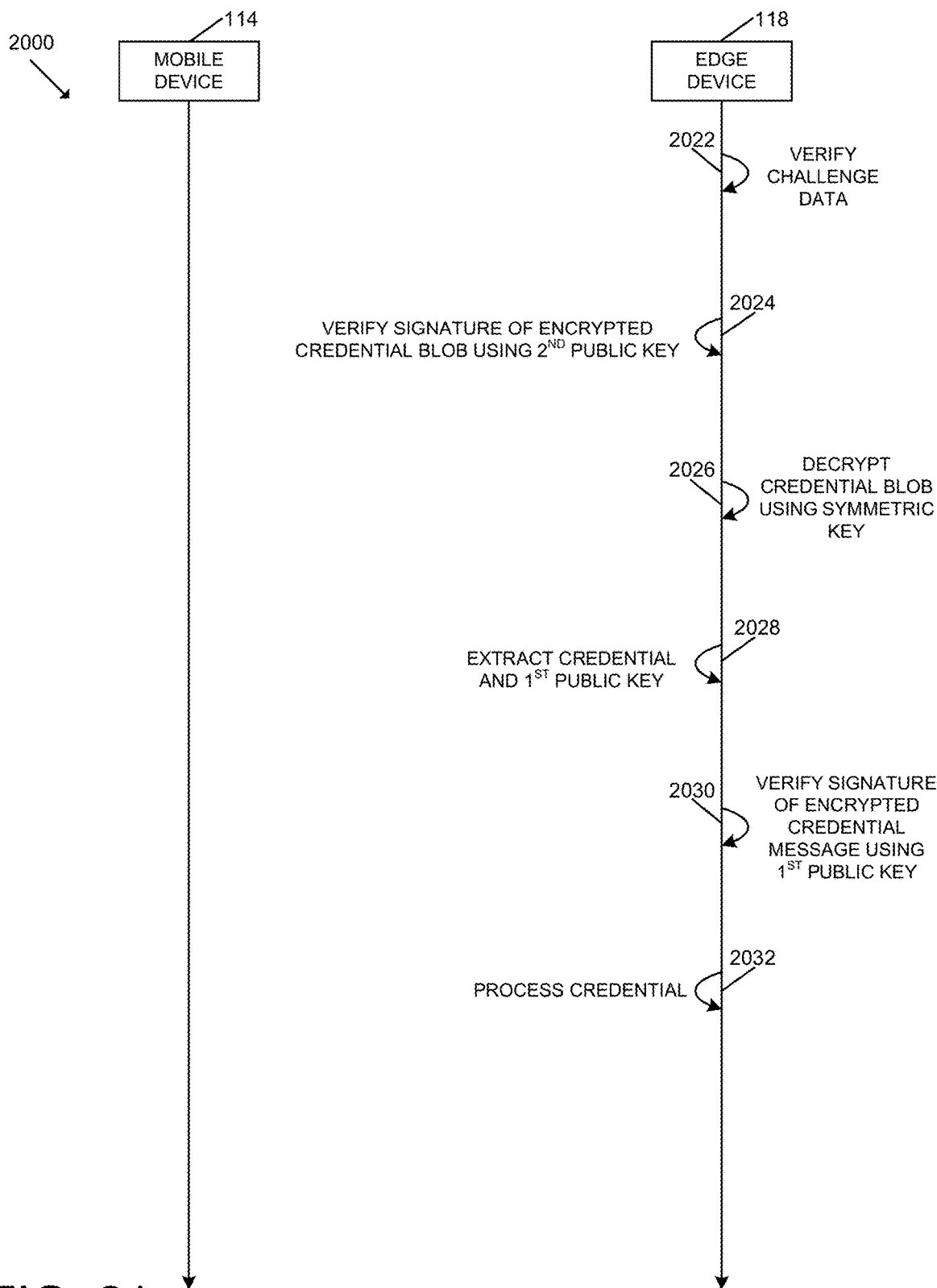

Referring now to FIGS. 20-21, in use, the access control system 100 may execute a method 2000 for using a wireless access credential (e.g., a wireless access credential stored to the mobile device 114 according to the method 1900 of FIG. 19). It should be appreciated that the particular flows of the method 2000 are illustrated by way of example, and such flows may be combined or divided, added or removed, and/or reordered in whole or in part depending on the particular embodiment, unless stated to the contrary. In some embodiments, the method 2000 of FIGS. 20-21 may be executed in conjunction with and subsequent to the method 1900 of FIG. 19.

As shown, the illustrative method 2000 involves the mobile device 114 (e.g., the mobile device 114 described in reference to FIG. 19) and an edge device 118. Also as described above in reference to FIG. 19, the illustrative method 2000 assumes that a cryptographic key exchange has occurred such that the cloud server 150 (see, for example, FIG. 19) and the edge device 118 share a symmetric cryptographic key, K. Also, the mobile device 114 has stored thereon the asymmetric cryptographic key pair, (C,c), including a private cryptographic key, c, and a public cryptographic key, C, described above. It should also be appreciated that the illustrative method 2000 further assumes that an asymmetric cryptographic key pair, (D,d), including a private cryptographic key, d, and a public cryptographic key, D, has been stored to the cloud server 150, and that the public cryptographic key, D, has been stored to the edge device 118. Further, in embodiments involving the method 1900 of FIG. 19 in conjunction with the method 2000 of FIGS. 20-21, the mobile device 114 also has stored thereon the encrypted credential blob ($E_K$(nonce||C||credential)) and signature thereof after the execution of the method 1900 of FIG. 19.

The illustrative method 2000 begins with flow 2002 of FIG. 20 in which the mobile device 114 and the edge device 118 establish a Bluetooth communication session/connection with one another (e.g., a BLE 4.2 or newer connection). In doing so, the mobile device 114 and/or the edge device 118 may execute various Bluetooth-defined functions including, for example, getDevice( ), tryConnecting( ), onSuccess, tryDiscovering( ), and/or onServicesDiscovered( ) functions. In flow 2004, the mobile device 114 and the edge device 118 perform a secure key exchange to generate a shared cryptographic session key, s, separately at each of the mobile device 114 and the edge device 118. In the illustrative embodiment, the session key, s, is generated based on Elliptical Curve Diffie-Hellman (ECDH). More specifically, in some embodiments, the mobile device 114 and the edge device 118 may execute a method similar to the method 2600 of FIG. 26 to perform the secure key exchange. However, it should be appreciated that the session key, s, may be generated based on a different key derivation function and/or other suitable algorithm in other embodiments. Following the execution of the secure key exchange, each of the mobile device 114 and the edge device 118 has the same session key, s, stored thereon.

In flow 2006, the edge device 118 encrypts challenge data with the shared cryptographic session key, s. In some embodiments, it should be appreciated that the challenge data may be embodied as, or otherwise include, a nonce value, for example, to reduce the efficacy of replay attacks. As such, in some embodiments, the encrypted challenge data may be represented as $E_s$(challenge). In flow 2008, the edge device 118 transmits the encrypted challenge data, $E_s$(challenge), to the mobile device 114 via the established Bluetooth communication connection.

In flow 2010, the mobile device 114 decrypts the encrypted challenge data using the shared cryptographic session key, s, retrieved from a memory of the mobile device 114 and, in flow 2012, the mobile device 114 (e.g., using the mobile application) builds a credential message including the challenge data received from the edge device 118, the encrypted credential blob retrieved from the memory of the mobile device 114, and the signature of the encrypted credential blob retrieved from the memory of the mobile device 114. In flow 2014, the mobile device 114 encrypts the credential message with the shared cryptographic session key, s, and in flow 2016, the mobile device 114 cryptographically signs the encrypted credential message using the private key, c, of the cryptographic key pair (C,c) retrieved from a memory of the mobile device 114. In other words, the mobile device 114 generates a cryptographic signature of the encrypted credential message.

In flow 2018, the mobile device 114 transmits the signed and encrypted credential message to the edge device 118. As such, in the illustrative embodiment, the mobile device 114 transmits the encrypted credential message and the signature thereof to the edge device 118. In flow 2020, the edge device 118 decrypts the encrypted credential message using the shared cryptographic session key, s, retrieved from the memory of the edge device 118.

In flow 2022 of FIG. 21, the edge device 118 verifies the challenge data. For example, in embodiments in which the challenge data is a nonce, the edge device 118 may confirm that the nonce is the same as the nonce previously encrypted and transmitted to the mobile device 114 (see, for example, flows 2006-2008 of FIG. 20). In other embodiments, it should be appreciated that the edge device 118 may otherwise verify and/or validate the decrypted challenge data. In flow 2024, the edge device 118 verifies the signature of the encrypted credential blob using the public cryptographic key, D, retrieved from the memory of the edge device 118. That is, the edge device 118 verifies that the encrypted credential blob was signed using the private key that corresponds with the public key, D. It should be appreciated that the edge device 118 executes the appropriate asymmetric signature verification algorithm based on the type of the cryptographic key pair (e.g., ECC in the illustrative embodiment).

In flow 2026, the edge device 118 decrypts the encrypted credential blob using the symmetric cryptographic key, K, retrieved from the memory of the edge device 118 and, in block 2028, the edge device 118 extracts the credential and the public cryptographic key, C, from the decrypted credential blob. It should be appreciated that, in the illustrative embodiment, the edge device 118 and the cloud server 150 are capable of encrypting/decrypting the credential blob including the credential, whereas the mobile device 114 is not. Instead, in such embodiments, the mobile device 114 acts as a conduit for the secure transfer of the credential between the cloud server 150 and the edge device 118.

In flow 2030, the edge device 118 verifies the signature of the encrypted credential message using the public cryptographic key, C, extracted from the decrypted credential blob. That is, the edge device 118 verifies that the encrypted credential message was signed using the private key that corresponds with the public key, C. It should be appreciated that the edge device 118 executes the appropriate asymmetric signature verification algorithm based on the type of the cryptographic key pair (e.g., ECC in the illustrative embodiment). It should be further appreciated that the use of the cryptographic key pair (C,c) serves, for example, to prevent the unauthorized copying of a credential to a different mobile device 114 as described above in reference to FIGS. 15-17.

In flow 2032, the edge device 118 processes the credential extracted from the credential blob. It should be appreciated that the credential may be processed in a manner similar to that described in reference to flow 1234 of FIG. 13. As such, in some embodiments, the edge device 118 and/or other device(s) in the edge system 116 may make an access control decision based on the extracted credential and an access control database. Further, the edge device 118 itself or another device (e.g., the administrative system 110, the access controller 134, etc.) may perform the access control decision based on the particular embodiment. Further, in some embodiments, in response to successful authentication of the credential, the lock device 132 may unlock a lock mechanism as described above. In some embodiments, it should be appreciated that further authentication of the user and/or the mobile device 114 may be required in advance of, or in conjunction with, the processing of the credential. For example, in some embodiments, the method 1800 of FIG. 18 may be executed to process a PIN of the user. In other embodiments, the user may be required to comply with a multi-factor authentication protocol requiring, for example, facial identification, thumb print, other biometrics, voice recognition, gestures, and/or additional information. It should be appreciated that, in some embodiments, the credential value and/or other portion of the credential may include an indicator that further authentication is required.

Although the flows 2002-2032 are described in a relatively serial manner, it should be appreciated that various flows of the method 2000 may be performed in parallel in some embodiments.

Figure 22:
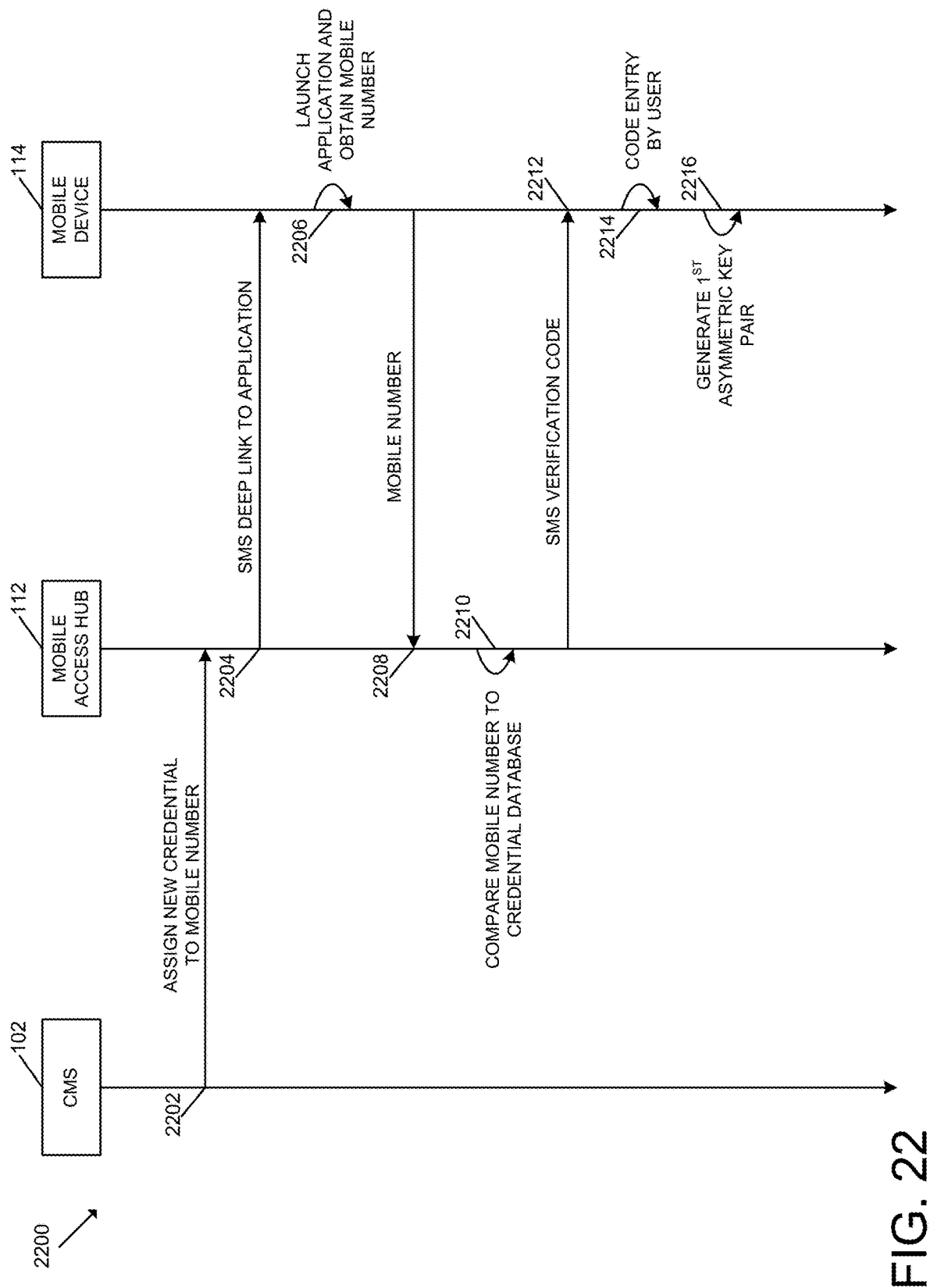
FIGS. 22-23 are a simplified flow diagram of at least one embodiment of a method of assigning a wireless access credential.
Figure 23:
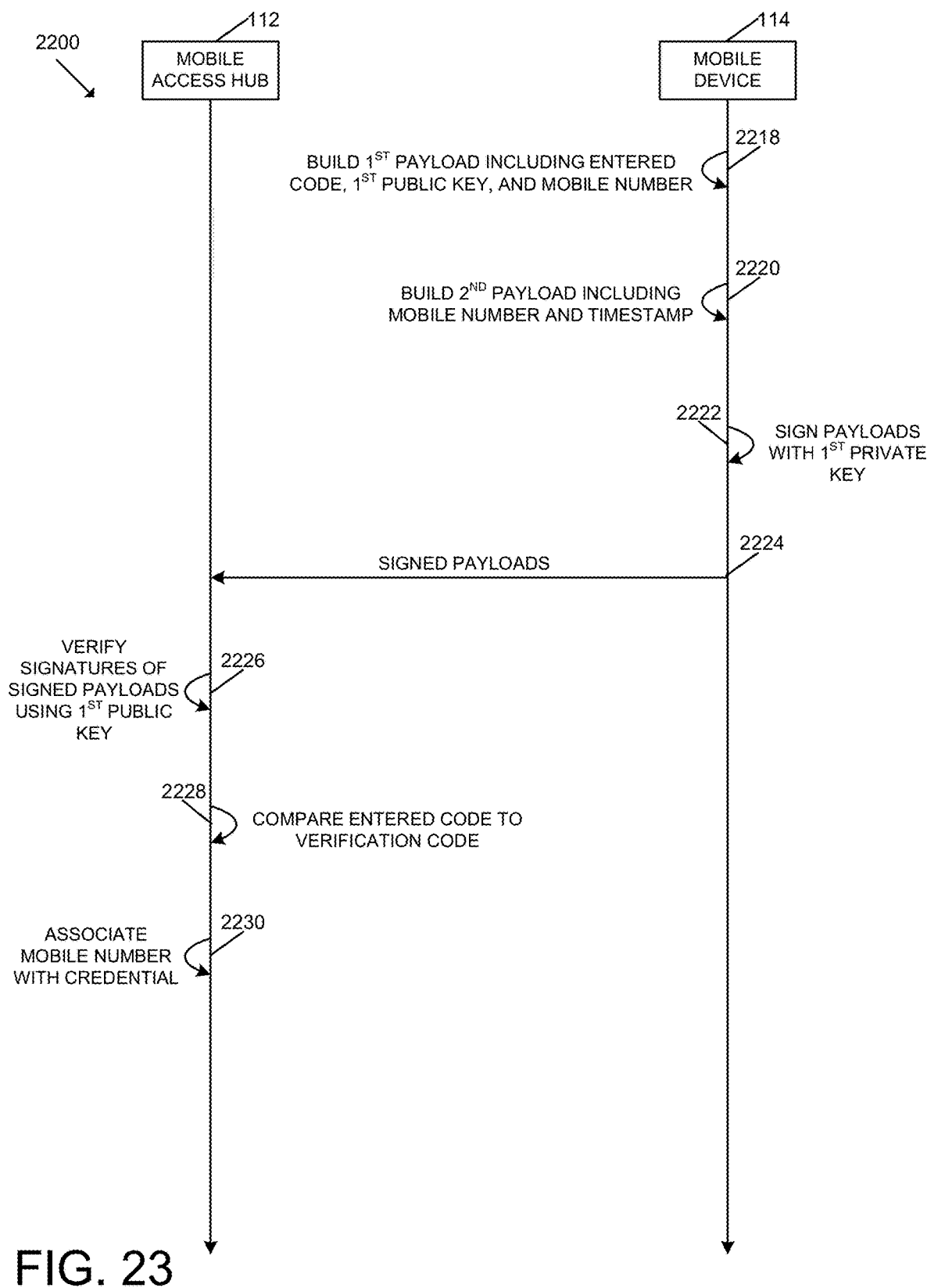

Referring now to FIGS. 22-23, in use, the access control system 100 may execute a method 2200 for assigning a wireless access credential to a mobile number. It should be appreciated that the particular flows of the method 2200 are illustrated by way of example, and such flows may be combined or divided, added or removed, and/or reordered in whole or in part depending on the particular embodiment, unless stated to the contrary. As shown, the illustrative method 2200 involves a credential management system 102, a mobile access hub 112, and a mobile device 114 (e.g., executing a mobile application as described herein). Additionally, it should be appreciated that, in some embodiments, the method 2200 may be executed in conjunction with and prior to the method 2400 of FIGS. 24-25.

The illustrative method 2200 begins with flow 2202 of FIG. 22 in which the credential management system 102 transmits an indication that a new credential has been assigned to a mobile line/phone number of a user to the mobile access hub 112. For example, as described above, the system/site administrator may request that the credential be issued to the user (and/or the mobile line number) by the credential management system 102, and the credential management system 102 may assign the credential to the user (and/or mobile line number). In particular, in some embodiments, the credential management system 102 may leverage the credential API 124 to interface with and/or "call" the mobile access hub 112 requesting a message to be transmitted to the user's mobile device 114 (e.g., a text/SMS message).

In flow 2204, the mobile access hub 112 generates and transmits a deep link via SMS to the mobile device 114 at the mobile device number provided when the credential was issued to the user. In other embodiments, the mobile access hub 112 may interface with Twilio and/or another suitable messaging service for generating and transmitting the appropriate messages to the mobile device 114. In flow 2206, the mobile device 114 launches a corresponding mobile application via the deep link and obtains the mobile number of the mobile device 114. It should be appreciated that the illustrative deep link is configured to launch a mobile application on the mobile device 114 to securely receive the credential or, if the mobile application not accessible (e.g., not installed) on the mobile device 114, direct the user to the download location (e.g., an "App store") to download the relevant mobile application. Further, it should be appreciated that the mobile number may be obtained automatically, semi-automatically, or via user input depending on the particular embodiment. For example, some mobile device operating systems (e.g., Android operating systems) may allow the mobile application to access the mobile number via a simple prompt, whereas other mobile device operating systems (e.g., iOS operating systems) may require the user to manually enter the mobile number into the application.

In some embodiments, the mobile device 114 may establish a Transport Layer Security (TLS) connection with the mobile access hub 112 for secure communications. In flow 2208, the mobile device 114 (e.g., via the mobile application) transmits the obtained mobile number to the mobile access hub 112 (e.g., along with a request for a verification code) and, in flow 2210, the mobile access hub 112 compares the mobile number to a credential database (e.g., an access control database) to determine whether the mobile number is already associated with a wireless access credential (e.g., a BLE credential). In doing so, the mobile access hub 112 may also determine whether the mobile number has already been authenticated (e.g., via a verification code and response). In some embodiments, if the mobile number is not already associated with a credential (e.g., and therefore not authenticated), the method 2200 may advances to flow 2212 in which the mobile access hub 112 generates a verification code (e.g., a 6-digit verification code) and transmits the verification code to the mobile device 114 via SMS. In flow 2214, the mobile device 114 (e.g., via a graphical user interface of the mobile application) prompts the user to enter the verification code (e.g., received by the mobile device 114 via SMS) and received/processes the user's input (i.e., the code entry).

In flow 2216, the mobile device 114 generates an asymmetric cryptographic key pair, (P,p), including a private cryptographic key, p, and a public cryptographic key, P, for storage to the mobile device 114 and use as described herein. It should be appreciated that they asymmetric cryptographic key pair, (P,p), and corresponding public/private keys may vary by type depending on the particular embodiment. For example, in the illustrative embodiment, the asymmetric cryptographic key pair, (P,p), is generated based on elliptical curve cryptography (ECC) based on the EC P256 curve. In other embodiments, the asymmetric cryptographic key pair may be associated with another suitable ECC curve. Further, in other embodiments, the asymmetric cryptographic key pair, (P,p), may be associated with another cryptographic algorithm such as, for example, Digital Signature Standard (DSS), Digital Signature Algorithm (DSA), Rivest-Shamir-Adleman (RSA), ElGamal, and/or another asymmetric cryptographic algorithm. Similarly, the public/private key sizes may vary depending, for example, on the particular algorithm employed. In some embodiments, the asymmetric cryptographic key pair, (P,p), may be generated and stored on the mobile device 114 in advance of the execution of the method 2200 of FIG. 22. Further, it should be appreciated that the mobile device 114 may generate the asymmetric cryptographic key pair, (P,p), in a trusted execution environment (TEE) or secure enclave in some embodiments.

In flow 2218 of FIG. 23, the mobile device 114 (e.g., using the mobile application) builds a payload including the public key, P, of the cryptographic key pair (P,p) retrieved from a memory of the mobile device 114, the user-entered code, and the mobile number of the mobile device 114. In flow 2220, the mobile device 114 also builds another payload including a timestamp (e.g., generated from a real-time clock of the mobile device 114) and the mobile number of the mobile device 114. In some embodiments, the payload including the timestamp and mobile number may be utilized by the mobile access hub 112 as login credentials for the mobile device 114. In flow 2222, the mobile device 114 cryptographically signs the payloads using the private key, p, of the cryptographic key pair, (P,p), retrieved from the memory of the mobile device 114. In other words, the mobile device 114 generates a cryptographic signature of the payload built in flow 2218 and a cryptographic signature of the payload built in flow 2220. In some embodiments, it should be appreciated that the mobile device 114 may combine the data of the two payloads into a single payload that is cryptographically signed. In flow 2224, the mobile device 114 transmits the signed payloads to the mobile access hub 112 (e.g., via a TLS connection). As such, in the illustrative embodiment, the mobile device 114 transmits each of the payloads (e.g., from flows 2218-2220) and the signatures thereof to the mobile access hub 112. However, in other embodiments, the mobile device 114 may transmit a single payload (or combination of payloads) and a single signature thereof to the mobile access hub 112 as indicated above.

In flow 2226, the mobile access hub 112 extracts the public key, P, from the payload (e.g., the first payload) received from the mobile device 114 and verifies the signature(s) of the payload(s) using that public key. That is, the mobile access hub 112 verifies that each of the relevant payloads was signed using the private key that corresponds with the public key, P. It should be appreciated that the mobile access hub 112 executes the appropriate asymmetric signature verification algorithm based on the type of the cryptographic key pair (e.g., ECC in the illustrative embodiment).

In flow 2228, the mobile access hub 112 extracts the user-entered code received from the mobile device 114 to the verification code transmitted from the mobile access hub 112 to the mobile device 114 in flow 2212. It should be appreciated that the mobile access hub 112 may consider the mobile device 114 to be the device corresponding with the mobile number if the user-entered code matches the verification code. Otherwise, the mobile access hub 112 may undergo one or more error handling procedures (e.g., re-sending the verification code, etc.). In flow 2230, the mobile access hub 112 associates the mobile number of the user with the wireless access credential in the credential database (e.g., an access control database). As such, in some embodiments, the mobile access hub 112 may subsequently determine that the mobile number is associated with a particular account (e.g., in flow 2210 of FIG. 22) and, for example, transmit a push notification to the mobile application of the mobile device 114 instead of transmitting a deep link to the mobile device 114 (e.g., for pulling multiple credentials associated with a mobile number).

Although the flows 2202-2230 are described in a relatively serial manner, it should be appreciated that various flows of the method 2200 may be performed in parallel in some embodiments.

As described herein, multiple credentials may be associated with the same mobile number and therefore the same mobile device 114. As such, it should be appreciated that techniques similar to those of the method 2200 may be used to onboard subsequent credentials after the mobile application has already been instead. In such embodiments, for example, the flows 2204-2214 regarding the downloading of the application and the code verification and the flow 2218 associated with building the payload with the user-entered code may be omitted. More specifically, in some embodiments, those flows 2204-2214 may be replaced with a flow in which the mobile access hub 112 determines that the mobile number is already associated with a credential and transmits a notification (e.g., a push notification) to the mobile device 114 regarding the assignment of the new credential to the mobile number, and the method 2200 may resume at flow 2216 to obtain the new credential. It should be further appreciated that, in some embodiments, the method 2200 may include flows (e.g., after the flow 2230) in which the mobile device 114 transmits a request to the mobile access hub 112 for a list or identification of the credentials and/or access rights of the mobile device 114 and/or associated with the mobile number (e.g., GET /MobileAccessRights), and the mobile access hub 112 responds with such list or identifiers (e.g., CMSMobileAccess_A, CMSMobileAccess_B). Based on the list, the mobile device 114 may request the proper credential.

It should be appreciated that a modified version of the method 2200 may also be employed when a user gets a new mobile device 114 or deletes the mobile application such that the user's credentials need to be re-downloaded/onboarded via the mobile access hub 112. In such embodiments, the mobile access hub 112 may re-verify the user's mobile number and re-download the credentials for that user. For example, the flow 2204 associated with the transmission of the deep link from the mobile access hub 112 to the mobile device 114 may be omitted. Instead, the mobile device 114 may launch the newly installed mobile application in flow 2206 and resume execution of the method 2200 to onboard the credential. It should be appreciated that the access control system 100 allows the user to keep the same credentials without purchasing a new credential for each new mobile device 114.

Figure 24:
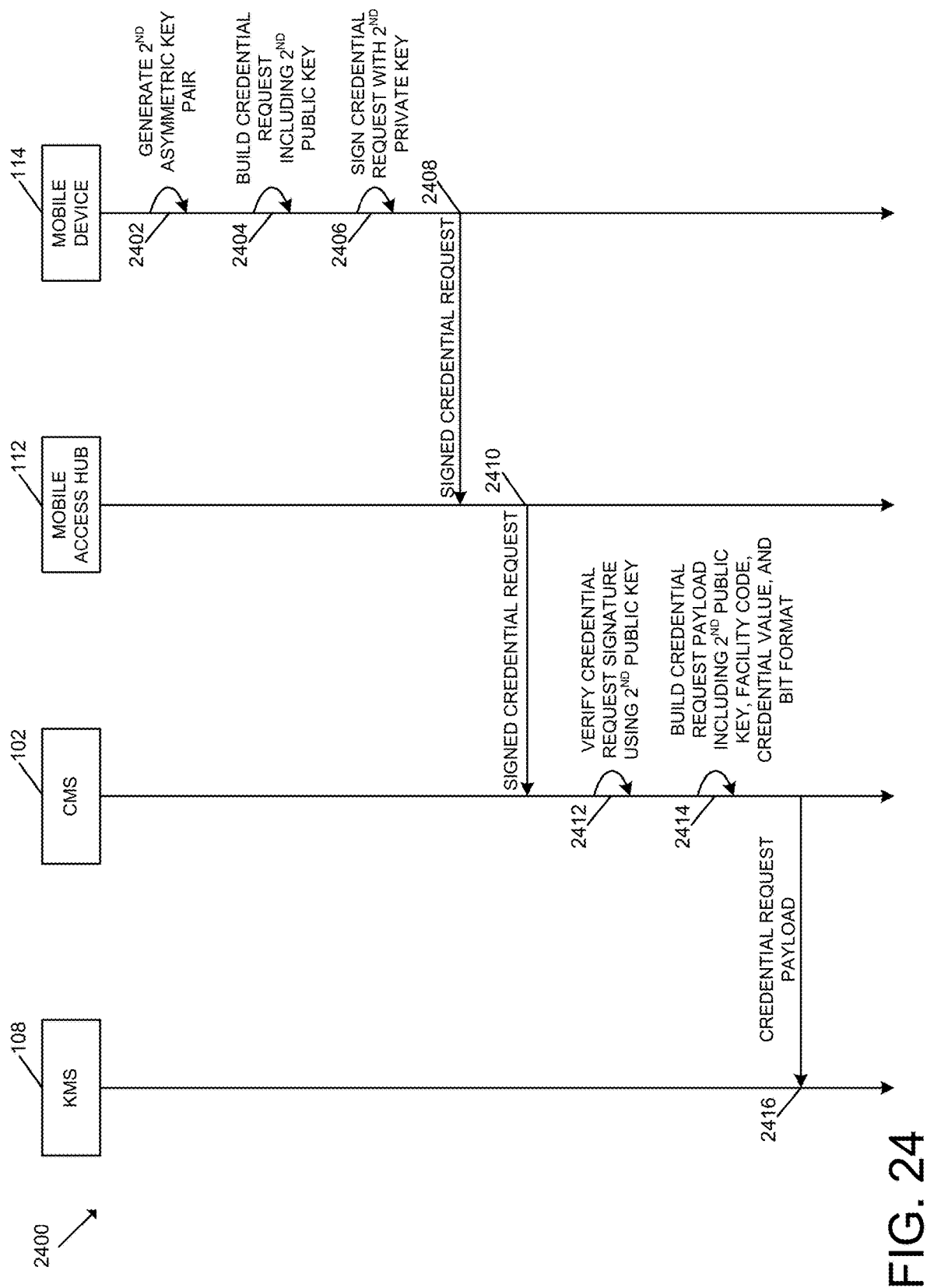
FIGS. 24-25 are a simplified flow diagram of at least one embodiment of a method of storing a wireless access credential to the mobile device of FIG. 1.
Figure 25:
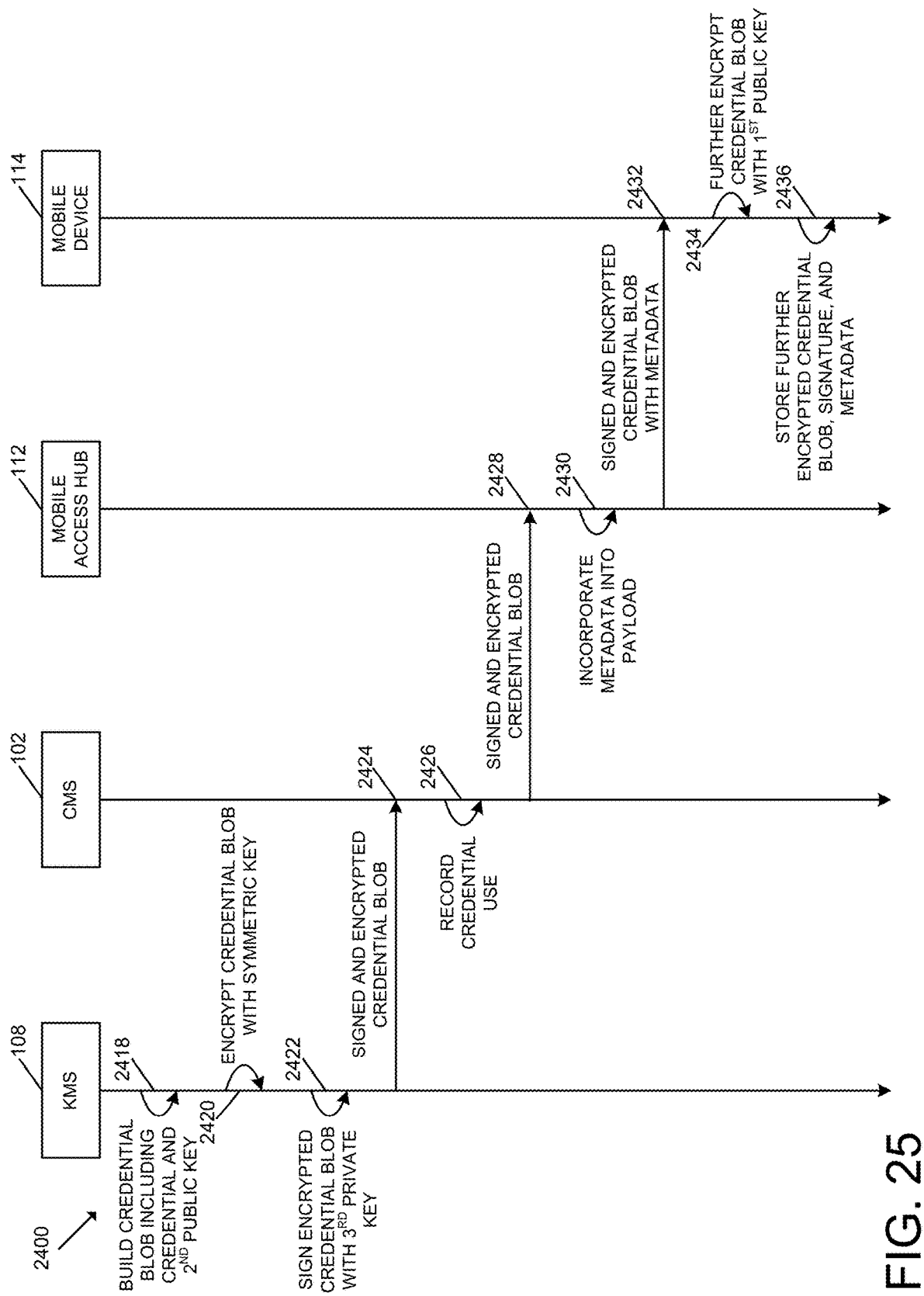

Referring now to FIGS. 24-25, in use, the access control system 100 may execute a method 2400 for storing a wireless access credential to the mobile device 114. It should be appreciated that the particular flows of the method 2400 are illustrated by way of example, and such flows may be combined or divided, added or removed, and/or reordered in whole or in part depending on the particular embodiment, unless stated to the contrary. Additionally, it should be appreciated that, in the illustrative embodiment, the method 2400 may be executed in conjunction with and prior to the method 2700 of FIGS. 27-29 and/or in conjunction with and subsequent to the method 2200 of FIGS. 22-23.

As shown, the illustrative method 2400 involves a key management system 108, a credential management system 102, a mobile access hub 112, and a mobile device 114 (e.g., executing a mobile application as described herein). As indicated above, in some embodiments, one or more of the key management system 108, the credential management system 102, and/or the mobile access hub 112 may be embodied as cloud-based systems and/or may form a portion of one another.

Further, the illustrative method 2400 assumes that a cryptographic key exchange has occurred such that the key management system 108 and an edge device 118 or, more specifically, a main chipset 142 of an edge device 118 (see, for example, FIGS. 26-29) share a symmetric cryptographic key, K. It should appreciated that the key management system 108 (and/or other cloud servers 150) and the edge device 118 may employ any suitable key exchange algorithm to do so. Additionally, the symmetric cryptographic key, K, may vary by type and/or length depending on the particular embodiment. For example, in the illustrative embodiment, the symmetric cryptographic key, K, is embodied as 256-bit Advanced Encryption Standard (AES) keys. In other embodiments, however, the symmetric cryptographic keys may be associated with another cryptographic algorithm such as, for example, Data Encryption Standard (DES), Triple DES, Blowfish, Twofish, Serpent, and/or another symmetric cryptographic algorithm. Similarly, the key may be a 128-bit keys, 512-bit key, or another size in other embodiments (e.g., depending on the cryptographic algorithm). In some embodiments, the cryptographic key is generated by the key management system 108 and transmitted to the edge device 118.

It should also be appreciated that the illustrative method 2400 further assumes that an asymmetric cryptographic key pair, (D,d), including a private cryptographic key, d, and a public cryptographic key, D, has been generated and stored to the key management system 108, and that the public cryptographic key, D, has been stored to the edge device 118 or, more specifically, to the cryptography chipset 144 of the edge device 118 for use as described herein. It should be appreciated that they asymmetric cryptographic key pair, (D,d), and corresponding public/private keys may vary by type depending on the particular embodiment. For example, in the illustrative embodiment, the asymmetric cryptographic key pair, (D,d), is generated based on elliptical curve cryptography (ECC) based on the EC P256 curve. In other embodiments, the asymmetric cryptographic key pair may be associated with another suitable ECC curve. Further, in other embodiments, the asymmetric cryptographic key pair may be associated with another cryptographic algorithm such as, for example, Digital Signature Standard (DSS), Digital Signature Algorithm (DSA), Rivest-Shamir-Adleman (RSA), ElGamal, and/or another asymmetric cryptographic algorithm. Similarly, the public/private key sizes may vary depending, for example, on the particular algorithm employed. In some embodiments, the asymmetric cryptographic key pair, (D,d), may be generated by the key management system 108 (or other cloud server 150) and the public cryptographic key, D, may be securely transmitted to the edge device 118 according to any suitable exchange protocol or provisioning mechanism. In some embodiments, the method 2400 further assumes that the asymmetric cryptographic key pair, (P,p), including the private cryptographic key, p, and the public cryptographic key, P, have been generated and stored to the mobile device 114 as described above.

The illustrative method 2400 begins with flow 2402 of FIG. 24 in which the mobile device 114 generates an asymmetric cryptographic key pair, (C,c), including a private cryptographic key, c, and a public cryptographic key, C, for storage to the mobile device 114 and use as described herein. Similar to the asymmetric cryptographic key pairs, (D,d) and (P,p), it should be appreciated that they asymmetric cryptographic key pair, (C,c), and corresponding public/private keys may vary by type depending on the particular embodiment. In some embodiments, it should be appreciated that the asymmetric cryptographic key pair, (C,c), may be a similar type of key pair as the asymmetric cryptographic key pair, (D,d), and/or the asymmetric cryptographic key pair, (P,p), described above. For example, in the illustrative embodiment, the asymmetric cryptographic key pair, (C,c), is generated based on elliptical curve cryptography (ECC) based on the EC P256 curve. In other embodiments, the asymmetric cryptographic key pair may be associated with another suitable ECC curve. Further, in other embodiments, the asymmetric cryptographic key pair, (C,c), may be associated with another cryptographic algorithm such as, for example, Digital Signature Standard (DSS), Digital Signature Algorithm (DSA), Rivest-Shamir-Adleman (RSA), ElGamal, and/or another asymmetric cryptographic algorithm. Similarly, the public/private key sizes may vary depending, for example, on the particular algorithm employed. In some embodiments, the asymmetric cryptographic key pair, (C,c), may be generated and stored on the mobile device 114 in advance of the execution of the method 2400 of FIG. 24. Further, it should be appreciated that the mobile device 114 may generate the asymmetric cryptographic key pair, (C,c), in a trusted execution environment (TEE) or secure enclave in some embodiments.

In flow 2404, the mobile device 114 (e.g., using the mobile application) builds a credential request including the public key, C, of the cryptographic key pair (C,c) retrieved from a memory of the mobile device 114. Further, in some embodiments, the credential request may identify the payload as a credential request (e.g., via a corresponding flag, CRED_REQ). As such, in some embodiments, the credential request may be represented as CRED_REQ||C. In flow 2406, the mobile device 114 cryptographically signs the credential request using the private key, c, of the cryptographic key pair, (C,c), retrieved from a memory of the mobile device 114. In other words, the mobile device 114 generates a cryptographic signature of the credential request. In flow 2408, the mobile device 114 transmits the signed credential request to the mobile access hub 112 (e.g., via a TLS connection). As such, in the illustrative embodiment, the mobile device 114 transmits the credential request and the signature thereof to the mobile access hub 112. In turn, in flow 2410, the mobile access hub 112 forwards the signed credential request (e.g., the credential request and signature thereof) to the credential management system 102.

In flow 2412, the credential management system 102 extracts the public key, C, from the credential request received from the mobile device 114 via the mobile access hub 112 and verifies the credential request signature using that public key. That is, the credential management system 102 verifies that the credential request was signed using the private key that corresponds with the public key, C. It should be appreciated that the credential management system 102 executes the appropriate asymmetric signature verification algorithm based on the type of the cryptographic key pair (e.g., ECC in the illustrative embodiment).

In flow 2414, the credential management system 102 builds a credential request payload including the public key, C, extracted from the credential request received from the mobile device 114 via the mobile access hub 112, a facility code, a credential value of the credential, and a bit format of the credential. It should be appreciated that credential value and the bit format are of the credential requested and assigned to the mobile number of the mobile device 114. Further, in some embodiments, the facility code may be associated with the site and/or organization that owns or administers the edge system 116. In flow 2416, the credential management system 102 transmits the credential request payload to the key management system 108.

In flow 2418 of FIG. 25, the key management system 108 determines the credential to be transmitted to the mobile device 114 and builds a credential blob based on the credential request payload (e.g., based on the facility code, credential value, bit format, etc.). In particular, in the illustrative embodiment, the key management system 108 builds a credential blob including the credential to be transmitted to the mobile device 114 (e.g., the credential assigned to the mobile number and the user) and the public key, C. Further, in some embodiments, the credential blob may further include a nonce value, for example, to reduce the efficacy of replay attacks. As such, in some embodiments, the credential blob may be represented as nonce||C||credential. In flow 2420, the key management system 108 encrypts the credential blob with the symmetric cryptographic key, K, and, in flow 2422, the key management system 108 cryptographically signs the encrypted credential blob using the private key, d, of the cryptographic key pair, (D,d), stored in the memory of the key management system 108. In other words, the key management system 108 generates a cryptographic signature of the encrypted credential blob.

In flow 2424, the key management system 108 transmits the encrypted credential blob ($E_K$(nonce||C||credential)) and the signature thereof to the credential management system 102. In flow 2426, the credential management system 102 records the use of the credential. For example, in some embodiments, the credential management system 102 may reduce the number of credits available to the administrative system 110 for issuance of new credentials. Further, the credential management system 102 may also track the use of the public cryptographic key, C, and/or various credential data (e.g., the credential value used). As indicated above, in some embodiments, one or more of those functions of the credential management system 102 may be performed in conjunction with the credential tracking system 104 and/or the credential ordering system 106.

In flow 2428, the credential management system 102 transmits/forwards the encrypted credential blob ($E_K$(nonce||C||credential)) and the signature thereof to the mobile access hub 112. In flow 2430, the mobile access hub 112 may incorporate one or more types of metadata into the payload prior to transmittal to the mobile device 114. For example, in some embodiments, the metadata may include one or more mobile access instructions, a list of edge devices 118 and/or lock devices 132 that the credential has access to, an expiration date of the payload, and/or other relevant metadata. It should be appreciated that, in some embodiments, the metadata is added to the signed and encrypted credential blob in the clear. Further, in some embodiments, a keyed hash or other integrity-verifying data may be included with the metadata to confirm that the metadata has not been modified.

In flow 2432, the mobile access hub 112 transmits the signed and encrypted credential blob to the mobile device 114 along with any metadata. That is, in the illustrative embodiment, the mobile access hub 112 transmits the encrypted credential blob ($E_K$(nonce||C||credential)) and the signature thereof to the mobile device 114. In flow 2434, the mobile device 1434 further encrypts the encrypted credential blob with the public cryptographic key, P, using a corresponding asymmetric encryption algorithm. It should be appreciated that, in some embodiments, the further encrypted credential blob may be represented as $E_P(E_K$(nonce||C||credential)). In flow 2436, the mobile device 114 stores the further encrypted credential blob ($E_P(E_K$(nonce||C||credential))), the signature of the encrypted credential blob ($E_K$(nonce||C||credential)), and the metadata (if any) to the memory of the mobile device 114. In other embodiments, it should be appreciated that the signature of the encrypted credential blob may be combined (e.g., concatenated) with the encrypted credential blob prior to asymmetric encryption by the public cryptographic key, P. In such embodiments, the payload may be represented as $E_P(E_K$(nonce||C||credential)||dSig). As such, in the illustrative embodiment, the credential blob or, more specifically, the encrypted credential blob ($E_K$(nonce||C||credential)) is encrypted with the public cryptographic key, P, when the data is at rest on the mobile device 114. It should be appreciated that, in the illustrative embodiment, the mobile device 114 now has a credential stored thereon that is tied to the mobile device 114, but the mobile device 114 is unable to read the credential data due to the encryption. It should be appreciated that, in some embodiments, the memory of the mobile device 114 to which such data is stored is a secure memory. As indicated above, in some embodiments, the metadata may be transmitted in the clear such that the metadata may be read by the mobile device 114.

Although the flows 2402-2436 are described in a relatively serial manner, it should be appreciated that various flows of the method 2400 may be performed in parallel in some embodiments.

Figure 26:
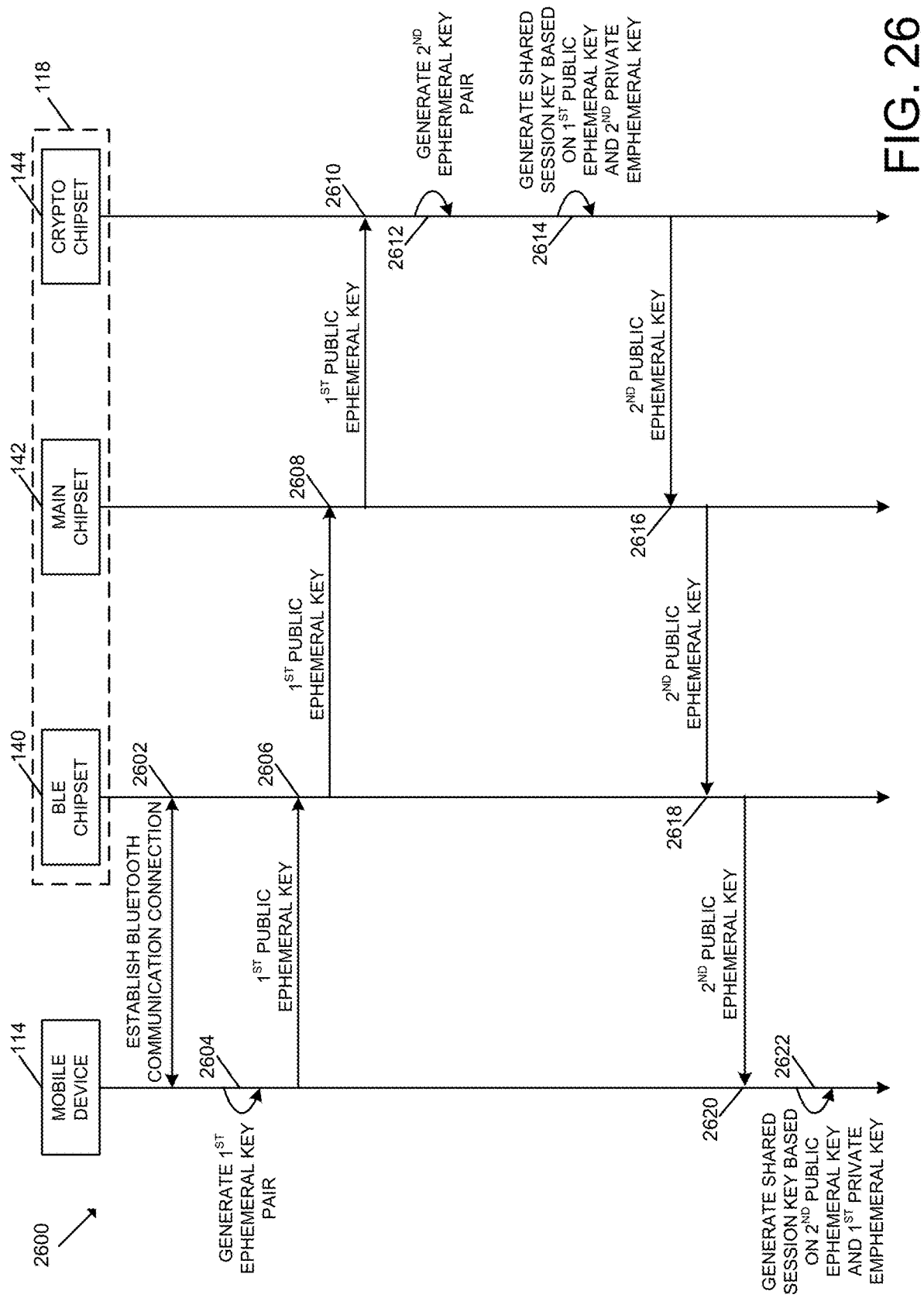
FIG. 26 is a simplified flow diagram of at least one embodiment of a method of performing a key exchange between the mobile device and an access control edge device of FIG. 1.

Referring now to FIG. 26, in use, the access control system 100 may execute a method 2600 for performing a key exchange between the mobile device 114 and an edge control device 118 of the access control system 100. It should be appreciated that the particular flows of the method 2600 are illustrated by way of example, and such flows may be combined or divided, added or removed, and/or reordered in whole or in part depending on the particular embodiment, unless stated to the contrary. Additionally, it should be appreciated that, in some embodiments, the method 2600 may be executed in conjunction with the method 2400 of FIGS. 24-25 and/or the method 2700 of FIGS. 27-29. For example, in some embodiments, the method 2600 may be executed subsequent to the method 2400 and prior to the method 2700. In the illustrative method 2600, a session key, s, is generated based on Elliptical Curve Diffie-Hellman (ECDH). In other embodiments, however, it should be appreciated that the session key, s, may be generated based on a different key derivation function and/or other suitable algorithm in other embodiments.

The illustrative method 2600 begins with flow 2602 of FIG. 26 in which the mobile device 114 and the edge device 118 or, more specifically, the BLE chipset 140 of the edge device 118 establish a Bluetooth communication session/connection with one another (e.g., a BLE 4.2 or newer connection). In doing so, the mobile device 114 and/or the BLE chipset 140 of the edge device 118 may execute various Bluetooth-defined functions including, for example, getDevice( ), tryConnecting( ), onSuccess, tryDiscovering( ), and/or onServicesDiscovered( ) functions.

In flow 2604, the mobile device 114 generates an ephemeral key pair, $(C_1, c_1)$, including a public ephemeral key, $C_1$, and a private ephemeral key, $c_1$. In the illustrative embodiment, the public and private ephemeral keys are ECDH ephemeral keys. However, in embodiments in which other secure key exchange and/or shared key derivation algorithms are employed, the keys may be formed accordingly. In flow 2606, the mobile device 114 transmits the public ephemeral key, $C_1$, to the BLE chipset 140 of the edge device 118. Further, in flow 2608, the BLE chipset 140 forwards the public ephemeral key, $C_1$, to the main chipset 142 of the edge device 118, which in flow 2610 forwards the public ephemeral key, $C_1$, to the cryptography chipset 144 of the edge device 118.

In flow 2612, the cryptography chipset 144 generates another ephemeral key pair (R,r) including a public ephemeral key, R, and a private ephemeral key, r. It should be appreciated that the ephemeral keys of the ephemeral key pair, (R,r), may be of the same type as the ephemeral key pair, $(C_1, c_1)$. As such, in the illustrative embodiment, the public and private ephemeral keys, R and r, are ECDH ephemeral keys. In flow 2614, the cryptography chipset 144 generates a shared cryptographic session key, s, based on the public ephemeral key, $C_1$, received from the mobile device 114 (e.g., via the BLE chipset 140 and the main chipset 142 of the edge device 118) and the private ephemeral key, r, newly generated by the cryptography chipset 144 of the edge device 118. For example, the shared cryptographic session key, s, may be generated based on generation of the corresponding portion of the ECDH algorithm.

In flow 2616, the cryptography chipset 144 of the edge device 118 transmits the public ephemeral key, R, to the main chipset 142 of the edge device 118, which in flow 2618 forwards the public ephemeral key, R, to the BLE chipset 140 of the edge device 118. In flow 2620, the BLE chipset 140 further transmits the public ephemeral key, R, to the mobile device 114. In flow 2622, the mobile device 114 generates the shared cryptographic session key, s, based on the public ephemeral key, R, received from the edge device 118 (e.g., generated by the cryptography chipset 144 and transmitted via the BLE chipset 140) and the private ephemeral key, $c_1$, generated by the mobile device 114.

It should be appreciated that the mobile device 114 and the edge device 118 are able to generate the same shared cryptographic session key, s, based on the corresponding public/private ephemeral keys described above (e.g., $(C_1, r)$ and $(R, c_1)$). It should be further appreciated that the public cryptographic key, C, described herein may be used as the public ephemeral key, $C_1$, for the generation of the shared cryptographic session key, s, in some embodiments.

Although the flows 2602-2622 are described in a relatively serial manner, it should be appreciated that various flows of the method 2600 may be performed in parallel in some embodiments.

Figure 27:
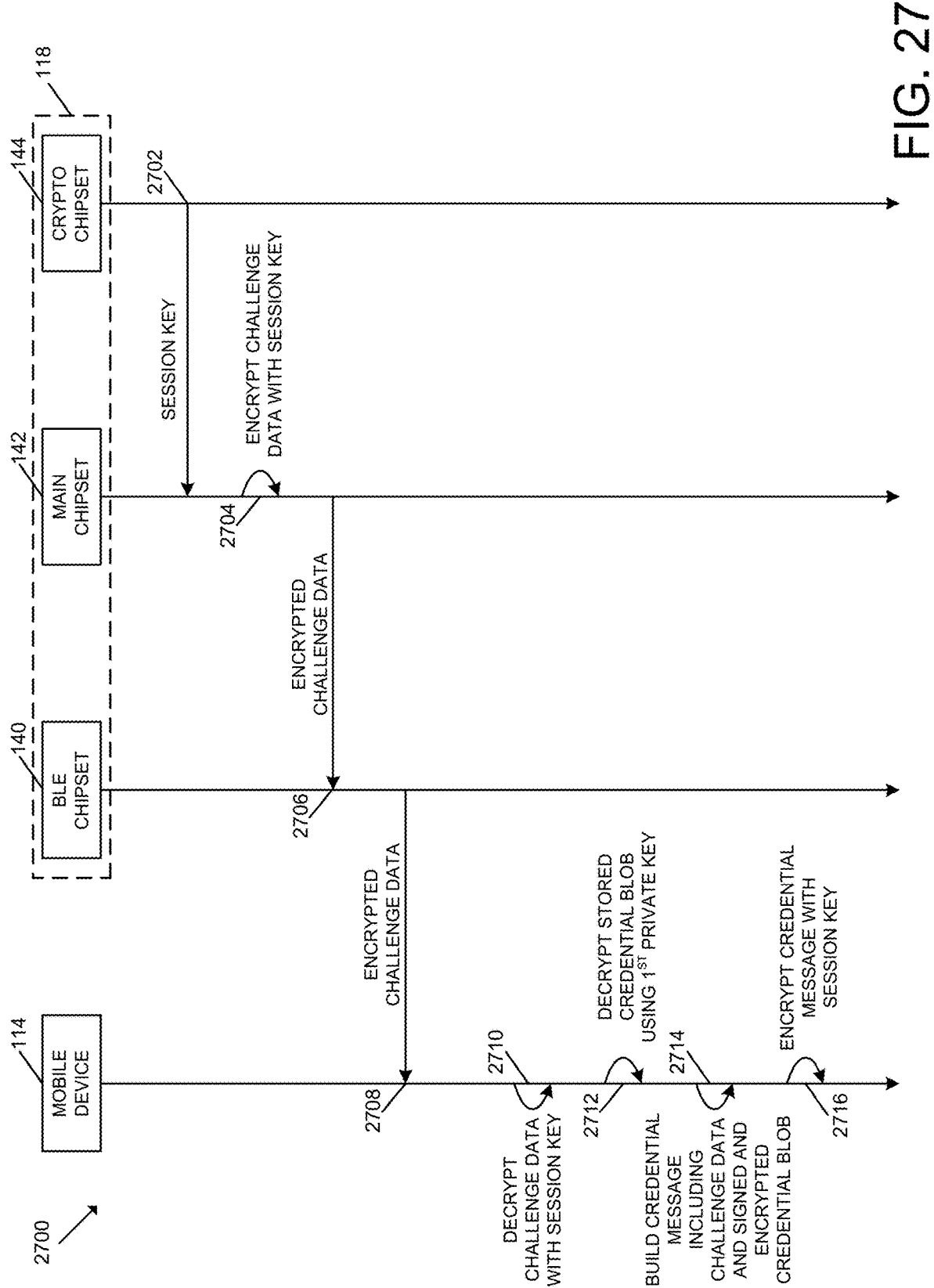
FIGS. 27-29 are a simplified flow diagram of at least one embodiment of a method of using the wireless access credential of FIGS. 24-25.
Figure 28:
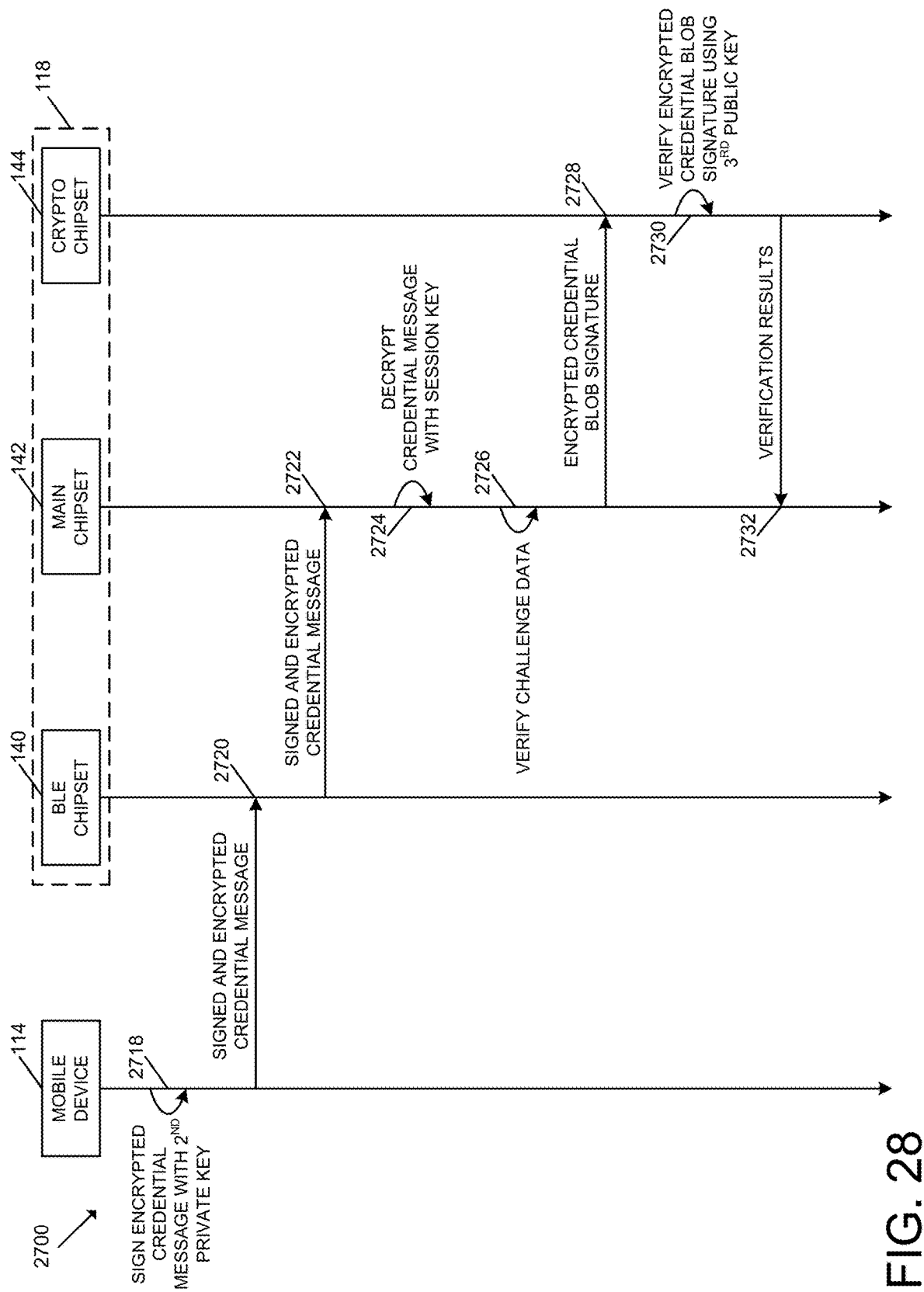
Figure 29:
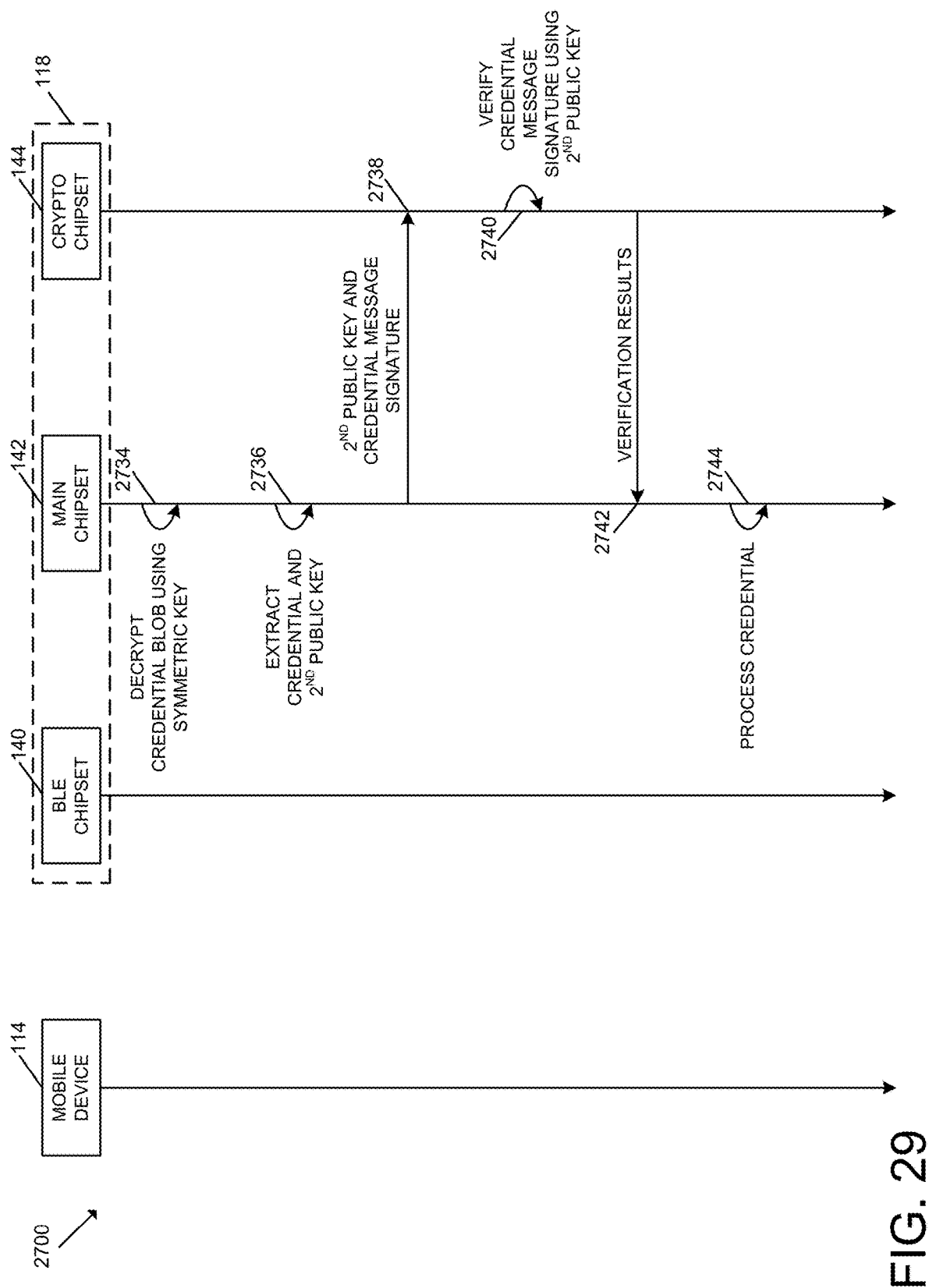

Referring now to FIGS. 27-29, in use, the access control system 100 may execute a method 2700 for using a wireless access credential (e.g., a wireless access credential stored to the mobile device 114 according to the method 2400 of FIGS. 24-25). It should be appreciated that the particular flows of the method 2700 are illustrated by way of example, and such flows may be combined or divided, added or removed, and/or reordered in whole or in part depending on the particular embodiment, unless stated to the contrary. In some embodiments, the method 2700 of FIGS. 27-29 may be executed in conjunction with and subsequent to the method 2400 of FIGS. 24-25 and/or the method 2600 of FIG. 26.

As shown, the illustrative method 2700 involves the mobile device 114 and an edge device 118 or, more specifically, the BLE chipset 140, the main chipset 142, and the cryptography chipset 144 of the edge device 118. Also, as described above in reference to FIGS. 22-26, the illustrative method 2700 assumes that a cryptographic key exchange has occurred such that the key management system 108 and the edge device 118 or, more specifically, the main chipset 142 of the edge device 118 share a symmetric cryptographic key, K. It should also be appreciated that the illustrative method 2700 further assumes that an asymmetric cryptographic key pair, (D,d), including a private cryptographic key, d, and a public cryptographic key, D, has been generated and stored to the key management system 108, and that the public cryptographic key, D, has been stored to the edge device 118 or, more specifically, to the cryptography chipset 144 of the edge device 118 for use as described herein. Additionally, the mobile device 114 has stored thereon the asymmetric cryptographic key pair, (C,c), including a private cryptographic key, c, and a public cryptographic key, C, and the asymmetric cryptographic key pair, (P,p), including the private cryptographic key, p, and the public cryptographic key, P, described above. The method 2700 further assumes that a secure key exchange has been performed (e.g., ECDH) such that each of the mobile device 114 and the edge device 118 (or, more specifically, the cryptography chipset 144) has the shared cryptographic session key, s, as described above. For example, in some embodiments, the mobile device 114 and the edge device 118 may execute a method similar to the method 2600 of FIG. 26 to perform the secure key exchange.

Further, in embodiments involving the method 2400 of FIGS. 24-25 in conjunction with the method 2700 of FIGS. 27-29, the mobile device 114 also has stored thereon the double-encrypted credential blob ($E_P(E_K(nonce\|C\|credential))$), the signature of the encrypted credential blob ($E_K(nonce\|C\|credential)$), and metadata (if any) after the execution of the method 2400 of FIGS. 24-25 as described above.

If not already established, in the illustrative embodiment, the mobile device 114 and the edge device 118 or, more specifically, the BLE chipset 140 of the edge device 118 establish a Bluetooth communication session/connection with one another (e.g., a BLE 4.2 or newer connection). In doing so, the mobile device 114 and/or the BLE chipset 140 of the edge device 118 may execute various Bluetooth-defined functions including, for example, getDevice( ), tryConnecting( ), onSuccess, tryDiscovering( ), and/or onServicesDiscovered( ) functions.

The illustrative method 2700 begins with flow 2702 of FIG. 27 in which the cryptography chipset 144 of the edge device 118 transmits the shared cryptographic session key, s, generated in by the secure key exchange to the main chipset 142 of the edge device 118. In flow 2704, the main chipset 142 of the edge device 118 encrypts challenge data with the shared cryptographic session key, s. In some embodiments, it should be appreciated that the challenge data may be embodied as, or otherwise include, a nonce value, for example, to reduce the efficacy of replay attacks. As such, in some embodiments, the encrypted challenge data may be represented as $E_s(challenge)$. In flow 2706, the main chipset 142 of the edge device 118 forwards the encrypted challenge data, $E_s(challenge)$, to the BLE chipset 140 of the edge device 118 and, in flow 2708, the BLE chipset 140 transmits the encrypted challenge data, $E_s(challenge)$, to the mobile device 114 via the established Bluetooth communication connection.

In flow 2710, the mobile device 114 decrypts the encrypted challenge data using the shared cryptographic session key, s, retrieved from a memory of the mobile device 114 and, in flow 2712, the mobile device 114 decrypts the stored double-encrypted credential blob ($E_P(E_K(nonce\|C\|credential))$) using the private cryptographic key, p, retrieved from the memory of the mobile device 114. In flow 2714, the mobile device 114 (e.g., using the mobile application) builds a credential message including the challenge data received from the edge device 118 via the BLE chipset 140, the encrypted credential blob ($E_K(nonce\|C\|credential)$) retrieved from the memory of the mobile device 114, and the signature of the encrypted credential blob retrieved from the memory of the mobile device 114. In flow 2716, the mobile device 114 encrypts the credential message with the shared cryptographic session key, s, and in flow 2718, the mobile device 114 cryptographically signs the encrypted credential message using the private key, c, of the cryptographic key pair (C,c) retrieved from a memory of the mobile device 114. In other words, the mobile device 114 generates a cryptographic signature of the encrypted credential message.

In flow 2720, the mobile device 114 transmits the signed and encrypted credential message to the edge device 118 or, more specifically, to the BLE chipset 140 of the edge device 118. As such, in the illustrative embodiment, the mobile device 114 transmits the encrypted credential message and the signature thereof to the BLE chipset 140 of the edge device 118. In flow 2722, the BLE chipset 140 forwards the signed and encrypted credential message to the main chipset 142 of the edge device 118. In flow 2724, the main chipset 142 of the edge device 118 decrypts the encrypted credential message using the shared cryptographic session key, s, retrieved from the memory of the edge device 118.

In flow 2726, the main chipset 142 verifies the challenge data. For example, in embodiments in which the challenge data is a nonce, the main chipset 142 may confirm that the nonce is the same as the nonce previously encrypted and transmitted to the mobile device 114 (see, for example, flows 2704-2706 of FIG. 27). In other embodiments, it should be appreciated that the main chipset 142 of the edge device 118 may otherwise verify and/or validate the decrypted challenge data. In flow 2728, the main chipset 142 transmits the signature of the encrypted credential blob to the cryptography chipset 144 and, in flow 2730, the cryptography chipset 144 verifies the signature of the encrypted credential blob using the public cryptographic key, D, retrieved from the memory of the edge device 118. That is, the cryptography chipset 144 verifies that the encrypted credential blob was signed using the private key that corresponds with the public key, D. It should be appreciated that the cryptography chipset 144 of the edge device 118 executes the appropriate asymmetric signature verification algorithm based on the type of the cryptographic key pair (e.g., ECC in the illustrative embodiment). In flow 2732, the cryptography chipset 144 transmits the results of the verification to the main chipset 142.

In flow 2734, the main chipset 142 of the edge device 118 decrypts the encrypted credential blob using the symmetric cryptographic key, K, retrieved from the memory of the edge device 118 and, in block 2736, the edge device 118 extracts the credential and the public cryptographic key, C, from the decrypted credential blob. Further, the main chipset 142 may also extract the signature of the encrypted credential message. It should be appreciated that, in the illustrative embodiment, the edge device 118 and the key management system 108 (and/or other cloud servers 150) are capable of encrypting/decrypting the credential blob including the credential, whereas the mobile device 114 is not. Instead, in such embodiments, the mobile device 114 acts as a conduit for the secure transfer of the credential between the key management system 108 and the edge device 118.

In flow 2738, the main chipset 142 of the edge device 118 transmits the public cryptographic key, C, and the signature of the encrypted credential message extracted from the decrypted credential blob to the cryptography chipset 144 of the edge device 118. In flow 2740, the cryptography chipset 144 of the edge device 118 verifies the signature of the encrypted credential message using the public cryptographic key, C, extracted from the decrypted credential blob. That is, the cryptography chipset 144 verifies that the encrypted credential message was signed using the private key that corresponds with the public key, C. It should be appreciated that the cryptography chipset 144 of the edge device 118 executes the appropriate asymmetric signature verification algorithm based on the type of the cryptographic key pair (e.g., ECC in the illustrative embodiment). It should be further appreciated that the use of the cryptographic key pair (C,c) serves, for example, to prevent the unauthorized copying of a credential to a different mobile device 114 as described above in reference to FIGS. 15-17.

In flow 2742, the cryptography chipset 144 transmits the verification results to the main chipset 142 of the edge device 118. In flow 2744, the main chipset 144 of the edge device 118 processes the credential extracted from the credential blob. It should be appreciated that the credential may be processed in a manner similar to that described in reference to flow 1234 of FIG. 13. As such, in some embodiments, the edge device 118 and/or other device(s) in the edge system 116 may make an access control decision based on the extracted credential and an access control database. Further, the edge device 118 itself or another device (e.g., the administrative system 110, the access controller 134, etc.) may perform the access control decision based on the particular embodiment. Further, in some embodiments, in response to successful authentication of the credential, the lock device 132 may unlock a lock mechanism as described above. In some embodiments, it should be appreciated that further authentication of the user and/or the mobile device 114 may be required in advance of, or in conjunction with, the processing of the credential. For example, in some embodiments, the method 1800 of FIG. 18 may be executed to process a PIN of the user. In other embodiments, the user may be required to comply with a multi-factor authentication protocol requiring, for example, facial identification, thumb print, other biometrics, voice recognition, gestures, and/or additional information. It should be appreciated that, in some embodiments, the credential value and/or other portion of the credential may include an indicator that further authentication is required.

Although the flows 2702-2744 are described in a relatively serial manner, it should be appreciated that various flows of the method 2700 may be performed in parallel in some embodiments. Further, it should be appreciated that, in other embodiments, one or more of the flows 2702-2744 identified as being performed by or associated with the BLE chipset 140, the main chipset 142, and/or the cryptography chipset 144 may be performed by or may be associated with another of the BLE chipset 140, the main chipset 142, and/or the cryptography chipset 144.

Figure 32:
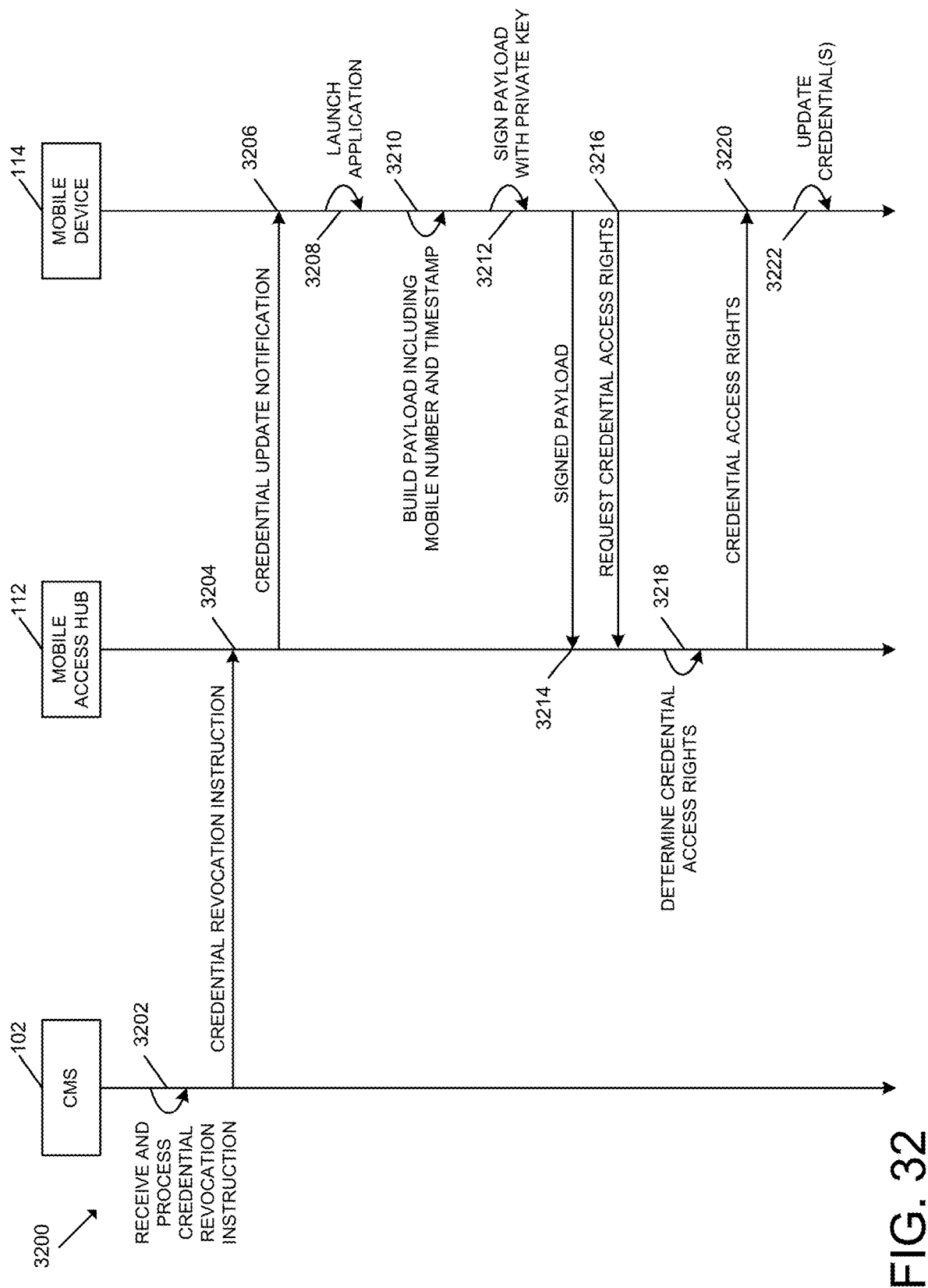
FIG. 32 is a simplified flow diagram of at least one embodiment of a method of revoking a wireless access credential.

Referring now to FIG. 32, in use, the access control system 100 may execute a method 3200 for revoking a wireless access credential. For example, among other reasons, an administrator may determine to revoke a wireless access credential when an employee departs or loses access privileges. It should be appreciated that the particular flows of the method 3200 are illustrated by way of example, and such flows may be combined or divided, added or removed, and/or reordered in whole or in part depending on the particular embodiment, unless stated to the contrary. As shown, the illustrative method 3200 involves a credential management system 102, a mobile access hub 112, and a mobile device 114 (e.g., executing a mobile application as described herein). Additionally, it should be appreciated that, in some embodiments, the method 3200 may be executed in conjunction with and subsequent to the method 2200 of FIGS. 22-23 and the method 2400 of FIGS. 24-25 (e.g., subsequent to assignment, issuance, and storage of the credential to the mobile device 114).

The illustrative method 3200 begins with flow 3202 in which the credential management system 102 receives a credential revocation instruction from an administrator (e.g., via the administrative system 110) to revoke a particular credential, and the credential management system 102 processes that instruction. For example, in some embodiments, the credential management system 102 updates the relevant access control database(s) and/or other databases to reflect that the particular credential has been revoked and therefore is no longer valid. Depending on the particular embodiment, the revoked credential may be deleted, corrupted, tagged, and/or otherwise modified to be identified as a revoked/invalid credential. In other embodiments, it should be appreciated that the access control database(s) and/or other databases may be updated by the mobile access hub 112.

In flow 3204, the credential management system 102 transmits the credential revocation instruction to the mobile access hub 112. It should be appreciated that, in some embodiments, one or more unique identifiers of the credential may be transmitted in the credential revocation instruction payload. In flow 3206, the mobile access hub 112 transmits a notification (e.g., a push notification) to the mobile device 114 indicating that the credential has been revoked and, in flow 3208, the mobile device 114 launches the mobile application (e.g., automatically or in response to the user's input after reviewing the notification).

In flow 3210, the mobile device 114 builds a payload including a timestamp (e.g., generated from a real-time clock of the mobile device 114) and the mobile number of the mobile device 114. In flow 3212, the mobile device 114 cryptographically signs the payloads using the private key, p, of the cryptographic key pair, (P,p), described above and retrieved from the memory of the mobile device 114. In other words, the mobile device 114 generates a cryptographic signature of the payload built in flow 3210. In flow 3214, the mobile device 114 transmits the signed payload to the mobile access hub 112 (e.g., via a TLS connection). In other words, in the illustrative embodiment, the mobile device 114 transmits the payload and the signature thereof to the mobile access hub 112. As indicated above, in some embodiments, the payload may be utilized by the mobile access hub 112 as login credentials for the mobile device 114.

In flow 3216, the mobile device 114 transmits a request to the mobile access hub 112 for the credential access rights of the mobile device 114. In flow 3218, the mobile access hub 112 determines the credential access rights of the mobile device 114. For example, in some embodiments, the mobile access hub 112 may read the data stored in the access control database(s) and/or other relevant databases to determine the current access rights (e.g., as updated following the revocation). Further, in some embodiments, the mobile access hub 112 may communicate with the credential management system 102 to make such a determination. In flow 3220, the mobile access hub 112 transmits a payload identifying the credential access rights of the mobile device 114 to the mobile device and, in flow 3222, the mobile device 114 updates the memory of the mobile device 114 to update the credentials stored thereon. For example, in an embodiment in which the mobile number has two credentials and the first credential is revoked, it should be appreciated that the memory of the mobile device 114 is updated to identify only the second credential, thereby reflecting that the first credential is no longer valid.

Although the flows 3202-3222 are described in a relatively serial manner, it should be appreciated that various flows of the method 3200 may be performed in parallel in some embodiments.

It should be appreciated that, in some embodiments, access credentials may expire after a certain period of time. For example, in some embodiments, the mobile application of the mobile device 114 may be required to check in every 48 hours to ensure the credential is still valid. Further, in some embodiments, the time after which the credential expires on the mobile device 114 may be configuration by the site administrator (e.g., via the administrative system 110). It should be further appreciated that, although omitted in part for brevity of the description, the method 3200 may involve one or more of the cryptographic functions described above.

Figure 34:
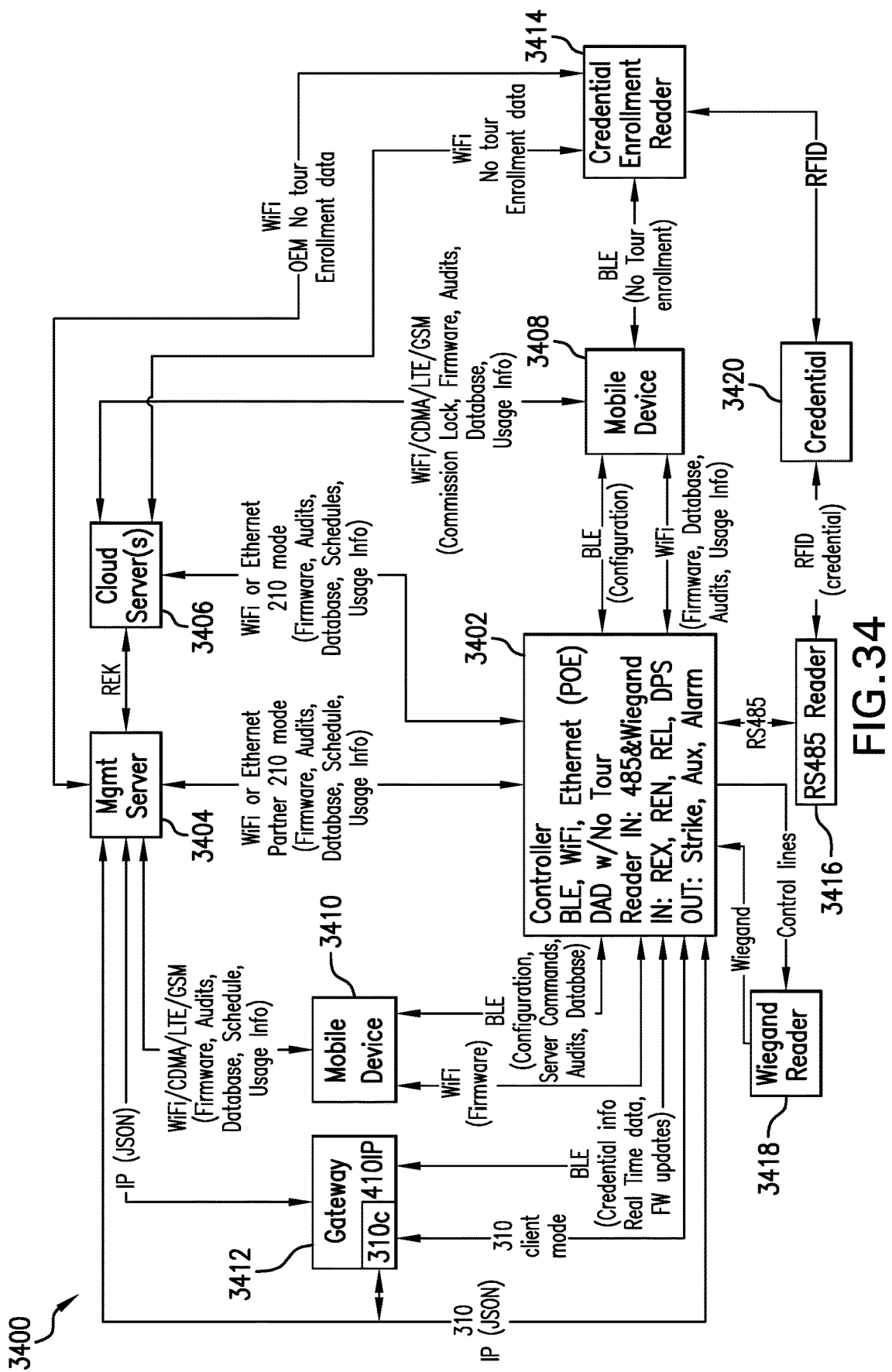
FIG. 34 is a simplified block diagram of at least one embodiment of an access control system including a peripheral controller.

Referring now to FIG. 34, the illustrative access control system 3400 includes a peripheral controller 3402, a management server 3404, one or more cloud servers 3406, a mobile device 3408, a mobile device 3410, a gateway device 3412, a credential enrollment reader 3414, an RS-485 reader 3416, a Wiegand reader 3418, and a credential 3420. It should be appreciated that, in some embodiments, the access control system 3400 may "overlap" with the access control system 100 of FIG. 1. As such, in some embodiments, the access control systems 100, 3400 may share one or more devices/systems such that the access control system 3400 includes one or more of the devices/systems of the access control system 100. Further, as described herein, in some embodiments, the mobile access hub 112 of the access control system 100 may be configured to interface with the access control system 3400 or, more specifically, the management server 3404 and/or the cloud server(s) 3406 of the access control system 3400 (e.g., serving as a virtual router) in order to exchange data (e.g., for the control or management of devices in the access control system 100). In some embodiments, the access control system 3400 and the cloud server(s) 3406 thereof may be embodied as a Schlage® ENGAGE™ system and/or the Schlage® ENGAGE™ cloud, respectively. As such, in some embodiments, the peripheral controller 3402 may be embodied as an ENGAGE™ enabled controller such as, for example, the CTE Single Door Controller with Multi-Technology Reader available from Schlage.

It should be appreciated that the access control system 3400 may control access to a passageway (e.g., through a doorway) to grant or deny user access through the passageway based on the credential 3420 presented by the user. In particular, the peripheral controller 3402 may be electrically and/or communicatively coupled to a credential reader 3416, 3418 and configured to make an access control decision based on credential data received from a credential presented by a user to the credential reader 3416, 3418 (e.g., based on an access control database that defines access permissions for various users/credentials). Further, the peripheral controller 3402 may be electrically and/or communicatively coupled to an electronic lock, door strike, door latch, and/or other suitable lock mechanism configured to lock/unlock the corresponding passageway barrier (e.g., door/gate) such that the peripheral controller 3402 may instruct or signal (e.g., via a relay) the lock mechanism to permit/deny access through the barrier based on the access control decision. It should be appreciated that the peripheral controller 3402 is "peripheral" in the sense that it is not integrated with an electronic lock. That is, in the illustrative embodiment, the peripheral controller 3402 is not mounted on the door/barrier.

The peripheral controller 3402 may be configured to communicate with the management server 3404, the cloud server(s) 3406, the mobile device 3408, the mobile device 3410, the gateway device 3412, the RS-485 reader 3416, and/or the Wiegand reader 3418 using various communication connections. In particular, in some embodiments, the peripheral controller 3402 may communicate with the management server 3404 and/or the cloud server(s) 3406 over a Wi-Fi connection or via an Ethernet connection to exchange firmware updates, audits, an access control database or updates thereto, an access control schedule, usage information, and/or other suitable data. In some embodiments, the peripheral controller 3402 may communicate with the mobile device 3408 (e.g., via a mobile application) over a Bluetooth connection (e.g., BLE) and/or Wi-Fi connection. For example, the peripheral controller 3402 may communicate with the mobile device 3408 over a BLE connection to exchange data with a relatively small file size (e.g., configuration data) and over a Wi-Fi connection to exchange data with a relatively large file size (e.g., firmware updates, an access control database or updates thereto, audits, and/or usage information). Similarly, in some embodiments, the peripheral controller 3402 may communicate with the mobile device 3410 (e.g., via a mobile application of an OEM) over a Bluetooth connection (e.g., BLE) and/or Wi-Fi connection. For example, the peripheral controller 3402 may communicate with the mobile device 3410 over a Wi-Fi connection to exchange firmware data and/or over a BLE connection to exchange configuration data, server commands (e.g., from the management server 3404), audits, and/or an access control database or updates thereto. In some embodiments, the peripheral controller 3402 may communicate with the gateway device 3412 over a Bluetooth (e.g., BLE) connection to exchange credential information, real-time data, and/or firmware updates. Further, the peripheral controller 3402 may communicate with the gateway device 3412 over an Ethernet connection between the peripheral controller 3402 and the gateway device 3412. Additionally, in some embodiments, the peripheral controller 3402 may communicate directly with the management server 3404 via IP (e.g., using JSON), thereby enabling a direct to host communication connection.

Further, it should be appreciated that the peripheral controller 3402 may be communicatively coupled to one or more readers. More specifically, in some embodiments, the peripheral controller 3402 may be communicatively coupled to an RS-485 reader 3416 via an RS-485 link (e.g., a serial communication link) and/or a Wiegand reader 3418 via corresponding Wiegand and control lines. Although the peripheral controller 3402 is described herein as only being communicatively coupled to the readers 3416, 3418, it should be appreciated that the peripheral controller 3402 may, additionally or alternatively, be structured and configured to be communicatively coupled to one or more other types of credential readers in other embodiments.

As described above, the management server 3404 may be configured to communicate directly with the peripheral controller 3402 (e.g., via a Wi-Fi or Ethernet connection). Further, in some embodiments, the management server 3404 may be configured to communicate with the gateway device 3412 (e.g., via IP using JSON) and with the mobile device 3410 (e.g., via Wi-Fi, CDMA, LTE, and/or GSM) to exchange firmware/updates, audits, an access control database or updates thereto, an access control schedule, and or usage information. In other words, in such embodiments, the peripheral controller 3402 may communicate with the management server 3404 via the mobile device 3410 and/or the gateway device 3412. For example, the peripheral controller 3402 may communicate with the gateway device 3412 via a BLE or Ethernet connection, and the gateway device 3412 may, in turn, forward the communicated data to the management server 3404 via IP. Similarly, the management server 3404 may communicate data to the gateway device 3412 and/or mobile device 3410, which is forwarded to the peripheral controller 3402 via a suitable communication connection. As such, it should be appreciated that the peripheral controller 3402 may communicate with the management server 3404 via an online mode with a persistent real-time communication connection or via an offline mode (e.g., periodically or in response to an appropriate condition) depending on the particular embodiment. In some embodiments, the gateway device 3412 may be embodied as a hot spot device/reader and/or plug-in device.

In some embodiments, the management server 3404 may be configured to manage credentials of the access control system 3400. For example, the management server 3404 may be responsible for ensuring that the peripheral device 3402 has updated authorized credentials, whitelists, blacklists, device parameters, and/or other suitable data. Similarly, in some embodiments, the management server 3404 may be responsible for registering credentials with the access control system 3400 and/or distributing appropriate credentials for authorized access through the passageway controlled by the peripheral controller 3402. Additionally, as described herein, the management server 3404 may receive security data, audit data, raw sensor data, and/or other suitable data from the peripheral controller 3402 (e.g., directly or indirectly) for management of the access control system 3400. In some embodiments, the management server 3404 may be communicatively coupled with the cloud server(s) 3406 and/or a cloud-based application. In other embodiments, the management server 3404 may be embodied as an online server or a cloud-based server.

Further, in some embodiments, the management server 3404 may communicate with multiple peripheral controllers 3402 at a single site (e.g., a particular building) and/or across multiple sites. That is, in such embodiments, the management server 3404 may be configured to receive data from peripheral controllers 3402 distributed across a single building, multiple buildings on a single campus, or across multiple locations. In some embodiments, the cloud server(s) 3406 may be embodied as a cloud-based device or collection of devices within a cloud environment. In such embodiments, it should be appreciated that the server(s) 3406 may be embodied as a "serverless" or server-ambiguous computing solution, for example, similar to the cloud server(s) 150 of FIG. 1 described above.

The credential enrollment reader 3414 may be embodied as any credential enrollment reader configured to enroll credentials (e.g., no-tour credentials via RFID). For example, in some embodiments, the credential enrollment reader 3414 may be embodied as a multi-technology enrollment reader such as the Schlage® (formerly aptiQ®) MT20W credential enrollment reader available from Schlage. In some embodiments, the credential 3420 may be embodied as a MIFARE® Classic or MIFARE DESFire™ EV1 smart credential. It should be appreciated that the credential enrollment reader 3414 may receive "no tour" credential enrollment data from the management server 3404 directly or indirectly. For example, in some embodiments, the credential enrollment reader 3414 may receive the credential enrollment data directly from the management server 3404 via a Wi-Fi connection or indirectly from the cloud server(s) 3406 via a Wi-Fi connection. In another embodiment, the credential enrollment reader 3414 may receive the credential enrollment data from the mobile device 3408 which, in turn, may have received the credential enrollment data from the cloud server(s) 3406 or the management server 3404. As such, it should be appreciated that the mobile device 3408 may be configured to communicate with the cloud server(s) 3406 via a Wi-Fi, CDMA, LTE, and/or GSM connection to exchange data for commissioning the peripheral controller 3402 or an electronic lock, firmware and/or firmware updates, audits, an access control database or updates thereto, usage information, credential enrollment data, and/or other relevant data. Additionally, the mobile device 3408 may be configured to communicate with the credential enrollment reader 3414 via a Bluetooth connection (e.g., BLE) and/or NFC to exchange the credential enrollment data. In some embodiments, the RS-485 reader 3416 and/or the Weigand reader 3418 may be embodied as a Schlage® (formerly aptiQ®) MT11 multi-technology mullion reader or a Schlage® (formerly aptiQ®) MTK15 multi-technology single-gang keypad reader available from Schlage.

It should be appreciated that, in some embodiments, the credential enrollment reader 3414 may store "no tour" credential enrollment data on the credential 3420 such that the reader 3416, 3418 may read the credential enrollment data when the credential 3420 is presented to the reader 3416, 3418 by the user. Further, the reader 3416, 3418 may forward the credential enrollment data to the peripheral controller 3402, and the peripheral controller 3402 may update the access control database stored thereon to permit access by the credential 3420 through a passageway controlled by the peripheral controller 3402. Further, in some embodiments, the peripheral controller 3402 may simultaneously remove access permissions for another credential 3420 based on the credential enrollment data. As such, upon subsequent presentation of the newly enrolled credential 3420 to the reader 3416, 3418, the peripheral controller 3402 will permit access; however, upon subsequent presentation of the other credential 3420 (e.g., the old credential), the peripheral controller 3402 will deny access. In some embodiments, the peripheral controller 3402 may update a flag, field, bit, byte, or other data structure stored on the "no tour" credential 3420 to indicate that the access control database has been updated. As such, in some embodiments, the peripheral controller 3402 may first analyze that data structure of the "no tour" credential 3420 to determine whether updating the access control database is required. If not, the peripheral controller 3402 may treat the credential 3420 as an ordinary credential and determine whether access is to be granted or denied.

Figure 35:
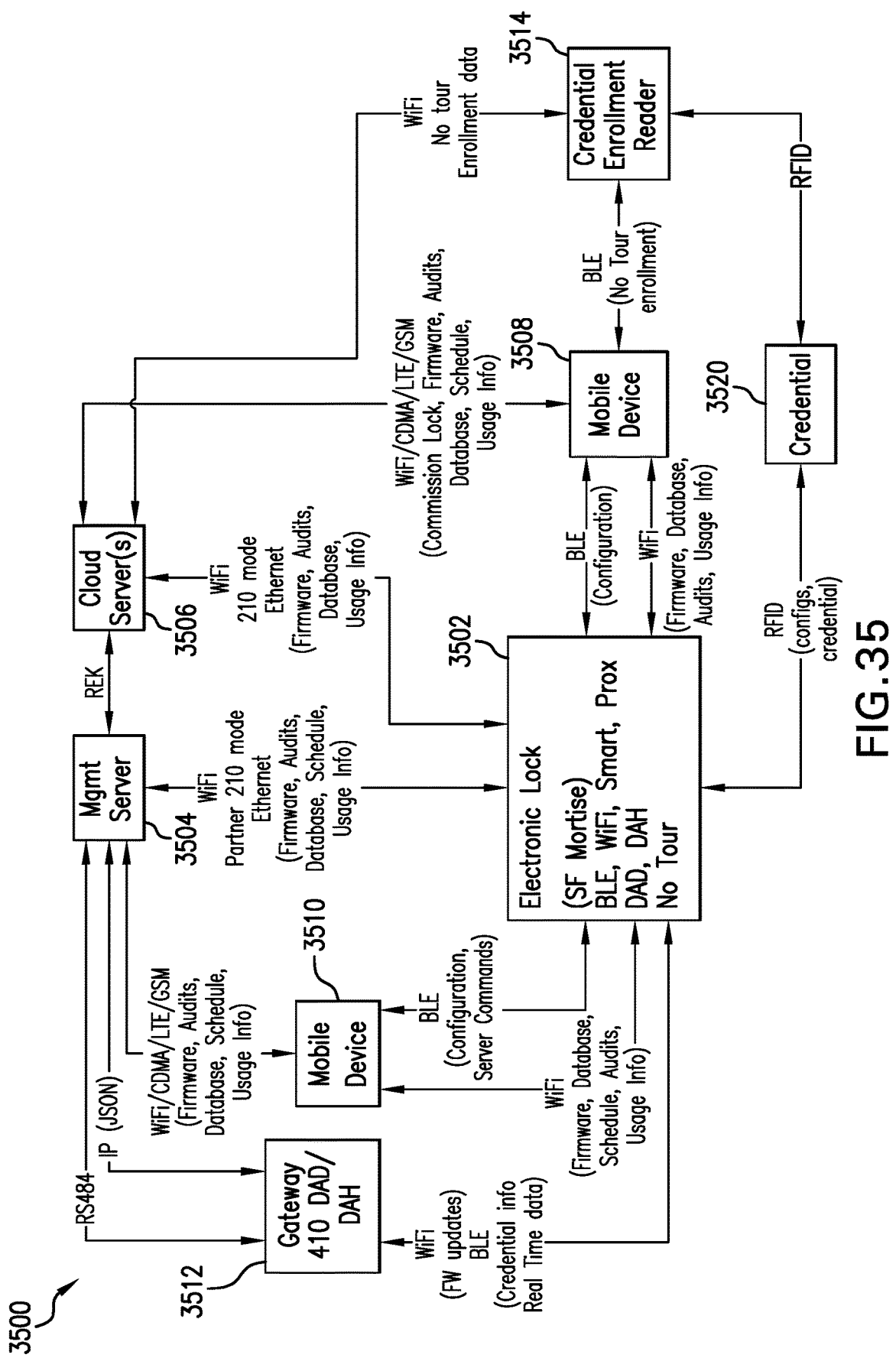
FIG. 35 is a simplified block diagram of at least one embodiment of an access control system including an electronic lock.

Referring now to FIG. 35, the illustrative access control system 3500 includes an electronic lock 3502, a management server 3504, one or more cloud servers 3506, a mobile device 3508, a mobile device 3510, a gateway device 3512, a credential enrollment reader 3514, and a credential 3520. It should be appreciated that, in some embodiments, the management server 3504, the one or more cloud servers 3506, the mobile device 3508, the mobile device 3510, the gateway device 3512, the credential enrollment reader 3514, and/or the credential 3520 may be the same device(s) as, or similar to, the management server 3404, the one or more cloud servers 3406, the mobile device 3408, the mobile device 3410, the gateway device 3412, the credential enrollment reader 3414, and the credential 3420 and, therefore, the descriptions of those devices have not been repeated herein for brevity of the disclosure. The illustrative access control system 3500 is similar in functionality to the access control system 3400, however, the peripheral controller 3402 has been replaced with the electronic lock 3502. Unlike the peripheral controller 3402, the controller of the electronic lock 3502 is integrated with the electronic lock 3502 and, therefore, not "peripheral" in that sense. In some embodiments, the access control system 3500 and the cloud server(s) 3506 thereof may be embodied as a Schlage® ENGAGE™ system and/or the Schlage® ENGAGE™ cloud, respectively. As such, in some embodiments, the electronic lock 3502 may be embodied as an ENGAGE™ enabled lock.

It should be further appreciated that, in some embodiments, the access control system 3500 may "overlap" with the access control system 100 of FIG. 1. As such, in some embodiments, the access control systems 100, 3500 may share one or more devices/systems such that the access control system 3500 includes one or more of the devices/systems of the access control system 100. Further, as described herein, in some embodiments, the mobile access hub 112 of the access control system 100 may be configured to interface with the access control system 3500 or, more specifically, the management server 3504 and/or the cloud server(s) 3506 of the access control system 3500 (e.g., serving as a virtual router) in order to exchange data (e.g., for the control or management of devices in the access control system 100).

It should be appreciated that, depending on the particular embodiment, an offline edge device 118 can update a local access control database on the edge device 118 (or other device of the edge system 116) using various techniques. For example, in some embodiments, the offline edge device 118 may establish a wireless communication connection (e.g., via Wi-Fi) with the cloud server 150 to retrieve access control updates periodically (e.g., daily). In other embodiment, a system administrator may visit or "tour" the edge device 118 to initiate an access control update locally at the edge device 118 (e.g., via a wired or wireless connection between the edge device 118 and the mobile device 114 of the administrator). In yet another embodiment, the system 100 may transmit "no tour" data to the mobile device 114 of a user having access to the edge device 118 for transmission to that edge device 118. It should be appreciated that such a technique typically eliminates any need for a system administrator to visit the edge device 118 to make updates and also allows for updates to edge devices 118 that have no connectivity (e.g., no Wi-Fi connections or long-range wireless connections available). Such no tour implementations are described herein in reference to at least FIGS. 36-40.

Figure 36:
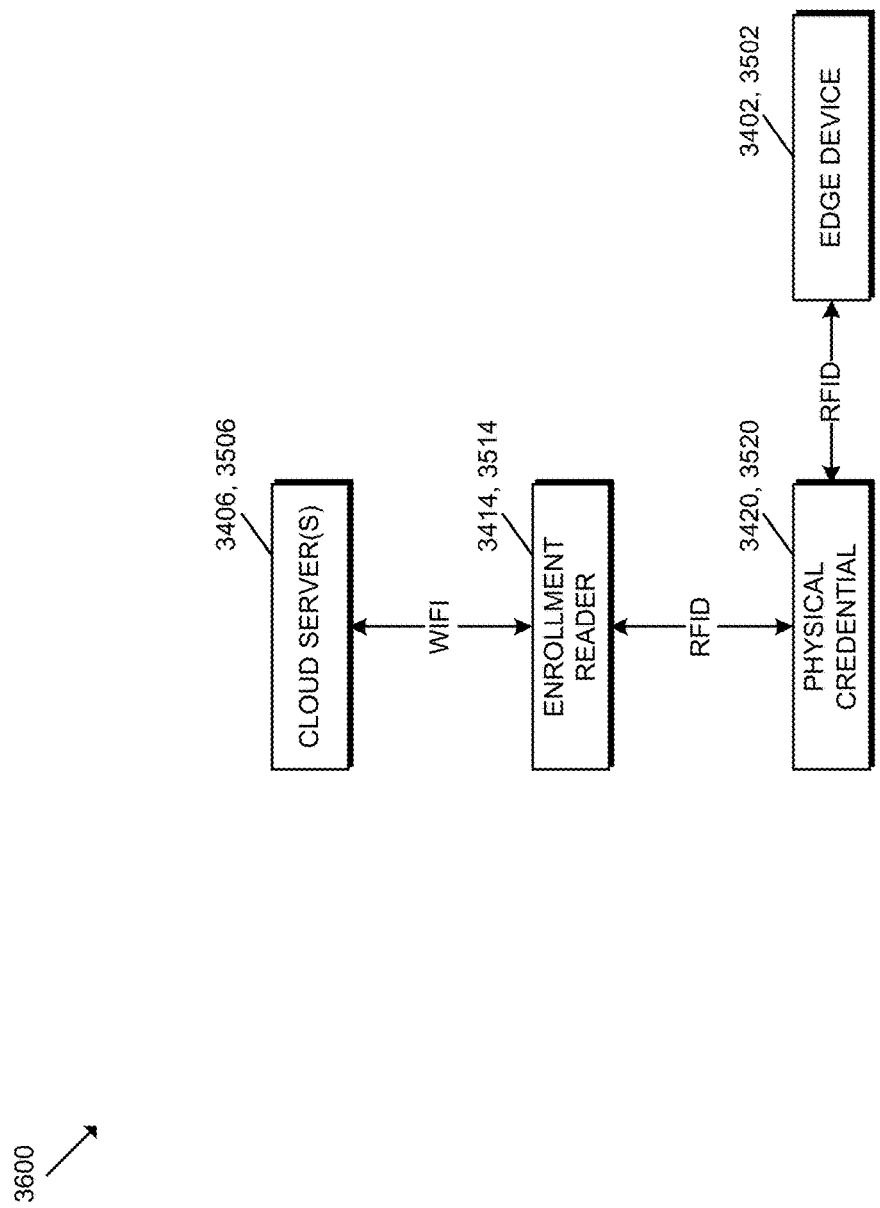
FIGS. 36-37 are simplified block diagrams illustrating various embodiments of no tour implementations in access control systems.
Figure 37:
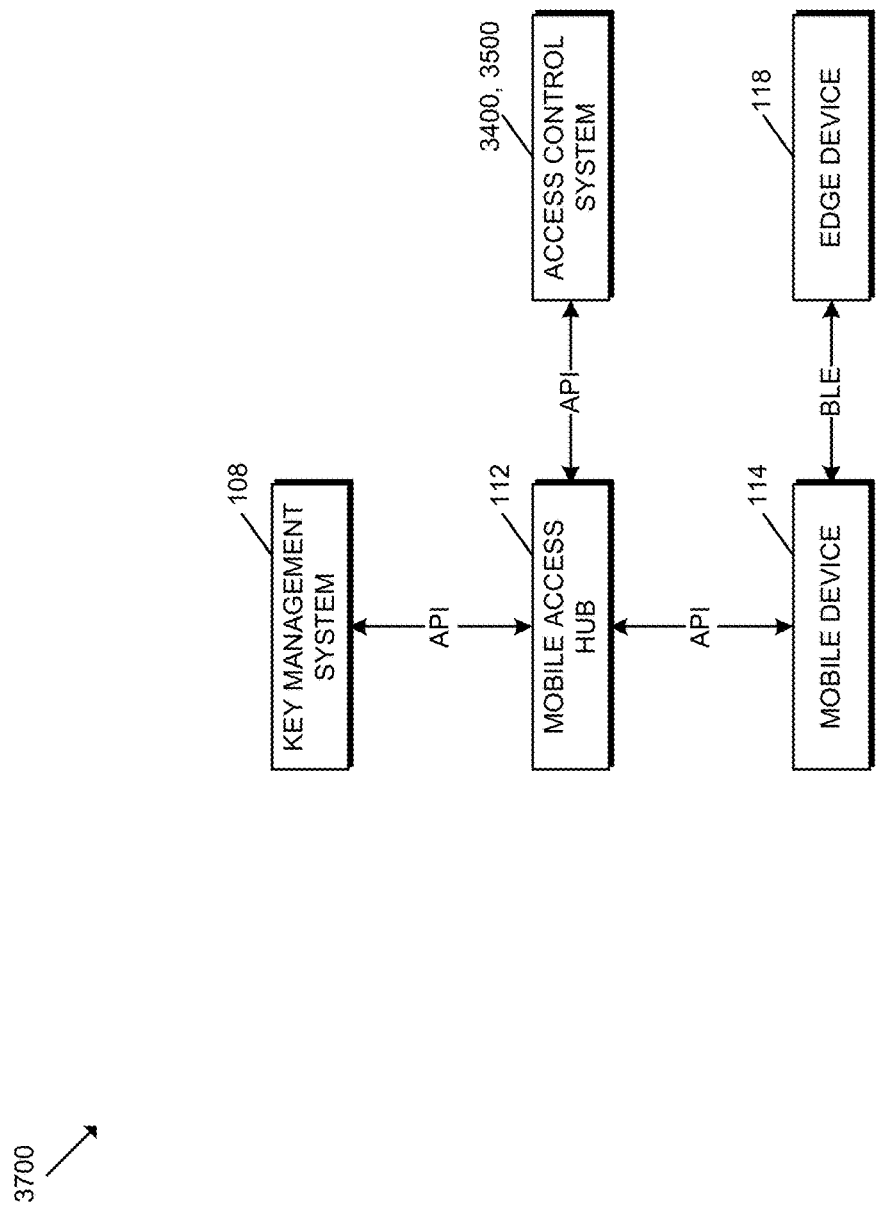

Referring now to FIGS. 36-37, simplified block diagrams illustrating various embodiments of no tour implementations of an access control system are shown. More specifically, FIGS. 36-37 illustrate communications between subsets of the various devices/systems of an access control device. In other words, communication capabilities and use cases of subsystems 3600, 3700 are shown.

For example, referring now specifically to FIG. 36, the subsystem 3600 includes one or more cloud servers 3406, 3506, an enrollment reader 3414, 3514, a physical credential 3420, 3520, and an edge device 3402, 3502. In the illustrative embodiment of FIG. 36, the cloud servers 3406, 3506 are configured to transmit data (e.g., access control data) to the enrollment reader 3414, 3514 via a Wi-Fi communication connection, and the enrollment reader 3414, 3514 is configured to write that data to a physical credential 3420, 3520. When the physical credential 3420, 3520 is presented to the edge device 3402, 3502, it should be appreciated that the edge device 3402, 3502 receives the data (e.g., access control data) via RFID and/or NFC. For example, in some embodiments, presentation of the physical credential 3420, 3520 to the edge device 3402, 3502 may cause the transfer of access control data to a local database of the edge device 3402, 3502 and/or other configuration data (e.g., in addition to the transmittal of the access credential of the physical credential 3420, 3520 itself). In some embodiments, the no tour data of the subsystem 3600 may be encrypted by a site key and further encrypted by a "smart key." As such, the payload may be represented as $E_{smartkey}(E_{sitekey}(\text{no\_tour\_data}))$. It should be appreciated that, in some embodiments, the site key is a symmetric cryptographic key for encrypting the no tour data (e.g., used by the ENGAGE™ system), and the smart key may be embodied as a key configured to encrypt sectors of the physical credential 3420.

Referring now to FIG. 37, the subsystem 3700 includes a key management system 108, a mobile access hub 112, a mobile device 114, an edge device 118, and an access control system 3400, 3500. It should be appreciated that, in the illustrative embodiment of FIG. 37, the mobile access hub 112 serves the role of the enrollment reader 3414, 3514 of FIG. 36 and the mobile device 114 (or, more specifically, the mobile application) serves the role of the physical credential 3420, 3520 of FIG. 36. In the illustrative embodiment, the key management system 108 is configured to provide a signature of the encrypted payload (e.g., the no tour data) to be delivered to the mobile device 114 using one or more of the communication methods described above for transmittal of a credential. In some embodiments, it should be appreciated that the key management system 108 may be embodied as the credential management system 102, or the credential management system 102 may perform one or more functions of the key management system 108. In some embodiments, the no tour data of the subsystem 3500 is secured by a credential key and signed by the cloud server 150 (as described above), so the edge device 118 is able to trust the data source. Further, the public key of the mobile device 114 ensures that data cannot be copied/moved to another device as described above, and the salt/nonce further randomizes the data. Sector data may also be transmitted to represent the data that would be provided by the reader with no tour data being in different sectors of the credential 3420, 3520. As such, in some embodiments, the payload may be represented as $E_{credkey}(E_{sitekey}(\text{no\_tour\_data})\|\text{sector}\|MD_{public}\|\text{SALT})\text{cloudSig}$, or using the keys described above, may be represented as $E_K(E_{sitekey}(\text{no\_tour\_data})\|\text{sector}\|C\|\text{nonce})\text{dSig}$.

Figure 38:
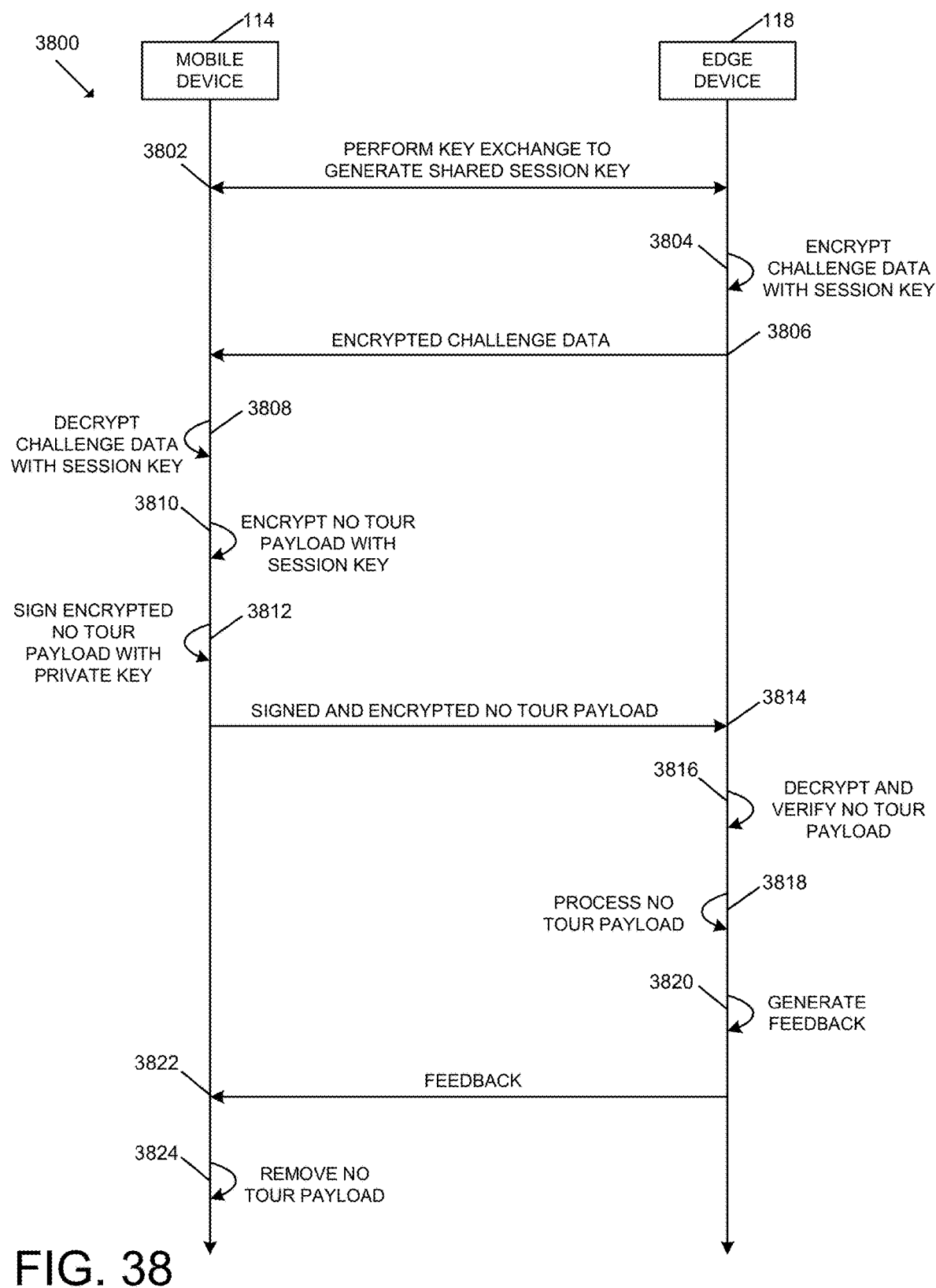
FIGS. 38-40 are simplified flow diagrams of embodiments of at least one method of delivering no tour data.

Referring now to FIG. 38, in use, the access control system 100 may execute a method 3800 for delivering no tour data and/or other access control data. It should be appreciated that the particular flows of the method 3800 are illustrated by way of example, and such flows may be combined or divided, added or removed, and/or reordered in whole or in part depending on the particular embodiment, unless stated to the contrary. As shown, the illustrative method 3800 involves a mobile device 114 and an edge device 118. In some embodiments, the method 3800 may be executed in conjunction with one or more of the various methods described above. As such, various details may be omitted herein for brevity of the description. For example, the illustrative method 3800 assumes that the mobile device 114 has stored thereon the asymmetric cryptographic key pair, (C,c), including a private cryptographic key, c, and a public cryptographic key, C, described above.

The illustrative method 3800 begins with flow 3802 in which the mobile device 114 and the edge device 118 establish a Bluetooth communication session/connection with one another (e.g., a BLE 4.2 or newer connection) and perform a secure key exchange to generate a shared cryptographic session key, s, separately at each of the mobile device 114 and the edge device 118. As described above, the session key, s, may generated based on Elliptical Curve Diffie-Hellman (ECDH). More specifically, in some embodiments, the mobile device 114 and the edge device 118 may execute a method similar to the method 2600 of FIG. 26 to perform the secure key exchange. However, it should be appreciated that the session key, s, may be generated based on a different key derivation function and/or other suitable algorithm in other embodiments. Following the execution of the secure key exchange, each of the mobile device 114 and the edge device 118 has the same session key, s, stored thereon.

In flow 3804, the edge device 118 encrypts challenge data with the shared cryptographic session key, s. In some embodiments, it should be appreciated that the challenge data may be embodied as, or otherwise include, a nonce value, for example, to reduce the efficacy of replay attacks. Additionally, in some embodiments, the encrypted data may also include the message size and/or other relevant data. As such, in some embodiments, the encrypted challenge data may be represented as $E_s$(challenge∥size). In flow 3806, the edge device 118 transmits the encrypted challenge data, $E_s$(challenge∥size), to the mobile device 114 via the established Bluetooth communication connection.

In flow 3808, the mobile device 114 decrypts the encrypted challenge data using the shared cryptographic session key, s, retrieved from a memory of the mobile device 114. In flow 3810, the mobile device 114 (e.g., using the mobile application) builds a no tour payload including the no tour data (e.g., which may itself be encrypted), the challenge data received from the edge device 118, and the public cryptographic key, C, and the mobile device 114 encrypts that no tour payload with the shared cryptographic session key, s. In flow 2812, the mobile device 114 cryptographically signs the encrypted no tour payload using the private key, c, of the cryptographic key pair (C,c) retrieved from a memory of the mobile device 114. In other words, the mobile device 114 generates a cryptographic signature of the encrypted no tour payload.

In flow 3814, the mobile device 114 transmits the signed and encrypted no tour payload to the edge device 118. As such, in the illustrative embodiment, the mobile device 114 transmits the encrypted no tour payload and the signature thereof to the edge device 118. In flow 3816, the edge device 118 decrypts the encrypted no tour message using the shared cryptographic session key, s, retrieved from the memory of the edge device 118 and verifies the cryptographic signature using the public cryptographic key, C, extracted from the payload in a manner similar to that described above.

In flow 3818, the edge device 118 processes the no tour payload. For example, as described above, the edge device 118 (e.g., an offline access control device) may update its local access control database and/or perform other updates to the edge device 118 or data stored thereon based on the corresponding content of the no tour data. For example, in some embodiments, the no tour data may include access control updates for mobile devices and/or physical credentials different from the mobile device 114 that transmitted the no tour data. In flow 3820, the edge device 118 generates feedback data based on the processing of the no tour payload and, in flow 3822, the edge device 118 transmits the feedback data to the mobile device 114. In flow 3824, the mobile device 114 processes the feedback data and, if successful, the mobile device 114 removes the no tour payload stored thereon. In some embodiments, it should be appreciated that the edge device 118 only transmits feedback data if the processing of the no tour data was successful.

Although the flows 3802-3824 are described in a relatively serial manner, it should be appreciated that various flows of the method 3800 may be performed in parallel in some embodiments.

Figure 39:
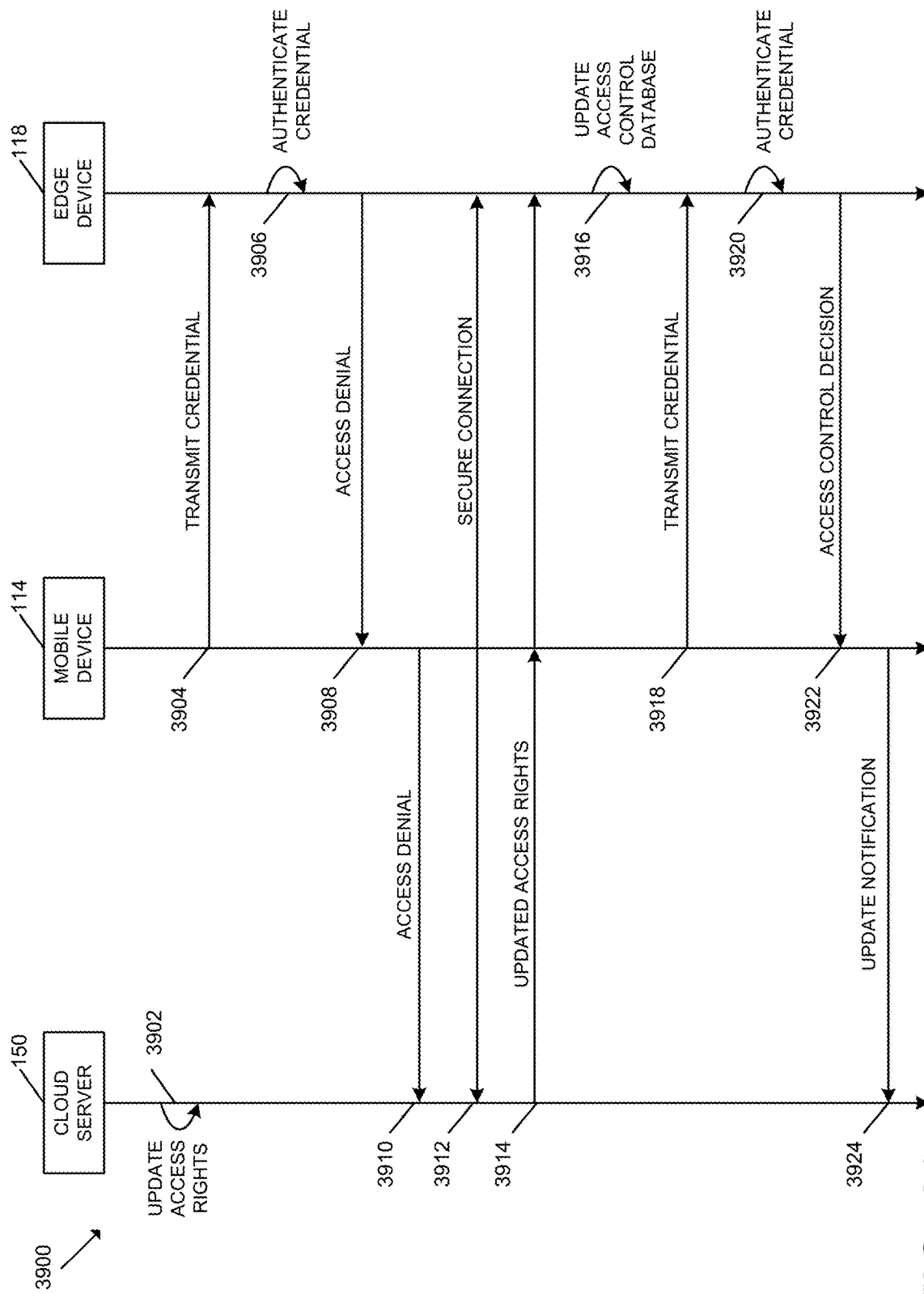

Referring now to FIG. 39, in use, the access control system 100 may execute a method 3900 for delivering no tour data and/or other access control data. It should be appreciated that the particular flows of the method 3900 are illustrated by way of example, and such flows may be combined or divided, added or removed, and/or reordered in whole or in part depending on the particular embodiment, unless stated to the contrary. As shown, the illustrative method 3900 involves a cloud server 150, a mobile device 114, and an edge device 118. In some embodiments, the method 3900 may be executed in conjunction with one or more of the various methods described above. As such, various details may be omitted herein for brevity of the description. For example, in some embodiments, the illustrative method 3900 assumes that the mobile device 114 has stored thereon the asymmetric cryptographic key pair, (C,c), including a private cryptographic key, c, and a public cryptographic key, C, described above. Additionally, as described above, although the cloud server 150 is referenced herein as a cloud-based device, it should be appreciated that the cloud server 150 may be embodied as one or more computing devices situated outside of a cloud computing environment in some embodiments. In some embodiments, the cloud server 150 of FIG. 39 may be embodied as a system that includes one or more of the credential management system 102, the credential tracking system 104, the credential ordering system 106, the key management system 108, the administrative system 110, and/or the mobile access hub 112 described in reference to FIG. 1.

The illustrative method 3900 begins with flow 3902 in which the cloud server 150 updates access control data associated with one or more edge devices 118. For example, the access control data may be updated in response to the addition, deletion, and/or modification of access permissions for a particular user and/or mobile device 114 of the system 100 (e.g., by a system administrator or other suitable input/stimulus). In particular, in some embodiments, the access control data update may update the access permissions associated with a particular user and/or credential including, for example, the edge devices 118 to which the user and/or credential has access (e.g., among other edge devices 118), an access authorization schedule identifying the time(s) at which such access is permission, an access initiation time indicating a first time at which access is authorized, an expiration time indicating a time after which access is unauthorized, and/or other access-related information depending on the particular embodiment. Further, in some embodiments, the access control data may include configuration data for one or more devices of the edge system 116, firmware/software updates for one or more devices of the edge system 116, audit data, usage information, and/or other relevant access control data.

In flow 3904, the mobile device 114 transmits (e.g., securely) its credential to the edge device 118. For example, in some embodiments, the mobile device 114 and the edge device 118 may establish a Bluetooth communication session/connection (e.g., a BLE 4.2 or new connection) consistent with the techniques described above. In flow 3906, the edge device 118 processes the credential in an attempt to authenticate the credential. For example, in some embodiments, the edge device 118 and/or other device(s) in the edge system 116 may make an access control decision based on the extracted credential and an access control database (e.g., stored locally) to determine whether the credential authorizes the user/bearer to perform a requested action (e.g., gain access). Further, in some embodiments, in response to successful authentication of the credential, the edge device 118 may unlock a lock mechanism as described above. In some embodiments, it should be appreciated that further authentication of the user and/or the mobile device 114 may be required in advance of, or in conjunction with, the processing of the credential. For example, in some embodiments, the user may be required to comply with a multifactor authentication protocol requiring, for example, facial identification, thumb print, other biometrics, voice recognition, gestures, PIN entry, and/or additional information.

If the authentication of the credential is unsuccessful (e.g., in response to a determination that the credential/user is not authorized to gain access), in flow 3908, the edge device 118 generates and transmits a message to the mobile device 114 indicating that access has been denied, which the mobile device 114 transmits to the cloud server 150 in flow 3910. Depending on the particular embodiment, the mobile device 114 may simply forward the access denied message received from the edge device 118 and/or generate a new message that is indicative of the access denial for transmission to the cloud server 150. In some embodiments, it should be appreciated that the mobile device 114 may establish a wireless communication connection (e.g., a Wi-Fi communication connection, cellular communication connection, telecommunication connection, and/or other suitable long range wireless communication connection) with the cloud server 114 in order to transmit the access denial message.

In flow 3912 (e.g., in response to the access denial), the cloud server 150 and the edge device 118 establish a secure communication connection/channel via the mobile device 114. For example, in some embodiments, the mobile device 114 serves as a secure tunnel and intermediary node between the cloud server 150 and the edge device 118. In some embodiments, it should be appreciated that the establishment of the secure communication channel between the cloud server 150 and the edge device 118 via the mobile device 114 may be done in conjunction with the transmittal of the access denial message from the mobile device 114 to the cloud server 150.

In flow 3914, the cloud server 150 transmits one or more of the updates to the access control data associated with the edge device 118 to the edge device 118 via the secure communication channel between the cloud server 150 and the edge device 118 (i.e., via the mobile device 114). It should be appreciated that the particular access control data transmitted from the cloud server 150 to the edge device 118 may vary depending on the particular embodiment. For example, in some embodiments, the cloud server 150 may transmit all of the updated access rights associated with the edge device 118, whereas in other embodiments, the cloud server 150 may transmit only those updated access rights associated with specific users/credentials (e.g., of the mobile device 114) to the edge device 118. In yet other embodiments, the cloud server 150 may securely transmit some other subset of updated access rights to the edge device 118. Further, it should be appreciated that the cloud server 150 may also transmit configuration data, firmware/software updates, and/or other relevant access control data to the edge device 118. In some embodiments, it should be appreciated that the access control data transmitted from the cloud server 150 to the edge device 118 via the secure communication channel is in an encrypted format and/or otherwise inaccessible to the intermediary mobile device 114.

In flow 3916, the edge device 118 updates the access control database of the edge system 116 based on the updates received from the cloud server 150. Further, in some embodiments, the edge system 116 may perform (or schedule to perform) a firmware/software update, re-configuration, and/or other action dictated by a relevant update.

In flow 3918, the mobile device 114 re-transmits (e.g., securely) its credential to the edge device 118. Depending on the particular embodiment, the mobile device 114 may leverage an existing communication connection (e.g., a Bluetooth communication connection) with the edge device 118 or establish a new communication connection/session with the edge device 118 to do so. In flow 3920, the edge device 118 again processes the credential in an attempt to authenticate the credential. In some embodiments, rather than processing the credential of the mobile device 114 having been re-transmitted to the edge device 118, it should be appreciated that the edge device 118 may temporarily store the denied credential for the subsequent authentication attempt following the update to the access control database.

In flow 3922, the edge device 118 generates and transmits an access control decision message to the mobile device 114 indicating whether the credential was successfully authenticated (e.g., and access was gained). Specifically, in some embodiments, the message may indicate whether access was granted or denied. Further, in response to successful authentication of the credential, it should be appreciated that the edge device 116 may unlock a lock mechanism as described above. Further, as described above, in some embodiments, it should be appreciated that further authentication of the user and/or the mobile device 114 may be required in advance of, or in conjunction with, the processing of the credential.

Additionally, in some embodiments, the edge device 118 may transmit an update confirmation message to the mobile device 114 indicative of whether the update to the access control database of the edge system 116 was successful and/or unsuccessful, which may be transmitted/forwarded to the cloud server 150 in flow 3924. In other embodiments, the edge device 118 may only transmit the update confirmation message to the mobile device 114 (and/or the mobile device 114 may only transmit/forward the update confirmation message to the cloud server 150) if the update to the access control database of the edge system 116 was successful. In yet other embodiments, the edge device 118 may only transmit the update confirmation message to the mobile device 114 (and/or the mobile device 114 may only transmit/forward the update confirmation message to the cloud server 150) if the update to the access control database of the edge system 116 was unsuccessful. In other embodiments, it should be appreciated that the edge device 118 provides no indication of the success of the update to the access control database of the edge system 116 to the mobile device 114 (and/or the mobile device 114 does not transmit/forward such indication to the cloud server 150) and, instead, the cloud server 150 assumes that the transmittal of the updated access control data via the secure communication channel between the cloud server 150 and the edge device 118 via the mobile device 114 (in flow 3914) has resulted in a successful update to the access control database of the edge system 116.

Although the flows 3902-3924 are described in a relatively serial manner, it should be appreciated that various flows of the method 3900 may be performed in parallel in some embodiments.

Figure 40:
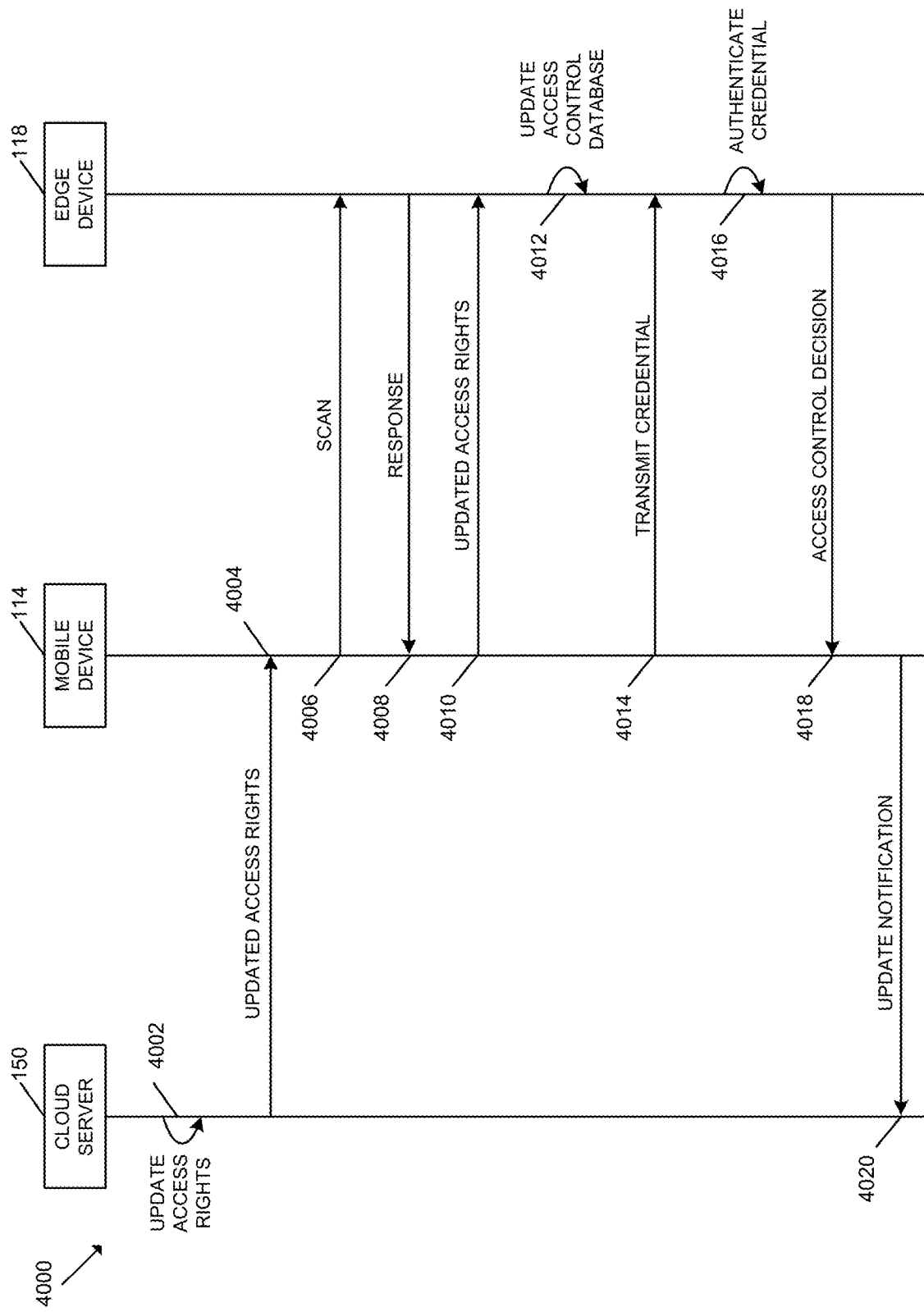

Referring now to FIG. 40, in use, the access control system 100 may execute a method 4000 for delivering no tour data and/or other access control data. It should be appreciated that the particular flows of the method 4000 are illustrated by way of example, and such flows may be combined or divided, added or removed, and/or reordered in whole or in part depending on the particular embodiment, unless stated to the contrary. As shown, the illustrative method 4000 involves a cloud server 150, a mobile device 114, and an edge device 118. In some embodiments, the method 4000 may be executed in conjunction with one or more of the various methods described above. As such, various details may be omitted herein for brevity of the description. For example, in some embodiments, the illustrative method 4000 assumes that the mobile device 114 has stored thereon the asymmetric cryptographic key pair, (C,c), including a private cryptographic key, c, and a public cryptographic key, C, described above. Additionally, as described above, although the cloud server 150 is referenced herein as a cloud-based device, it should be appreciated that the cloud server 150 may be embodied as one or more computing devices situated outside of a cloud computing environment in some embodiments. In some embodiments, the cloud server 150 of FIG. 40 may be embodied as a system that includes one or more of the credential management system 102, the credential tracking system 104, the credential ordering system 106, the key management system 108, the administrative system 110, and/or the mobile access hub 112 described in reference to FIG. 1.

The illustrative method 4000 begins with flow 4002 in which the cloud server 150 updates access control data associated with one or more edge devices 118. For example, similar to the method 3900 of FIG. 39, the access control data may be updated in response to the addition, deletion, and/or modification of access permissions for a particular user and/or mobile device 114 of the system 100 (e.g., by a system administrator or other suitable input/stimulus). In particular, in some embodiments, the access control data update may update the access permissions associated with a particular user and/or credential including, for example, the edge devices 118 to which the user and/or credential has access (e.g., among other edge devices 118), an access authorization schedule identifying the time(s) at which such access is permission, an access initiation time indicating a first time at which access is authorized, an expiration time indicating a time after which access is unauthorized, and/or other access-related information depending on the particular embodiment. Further, in some embodiments, the access control data may include configuration data for one or more devices of the edge system 116, firmware/software updates for one or more devices of the edge system 116, audit data, usage information, and/or other relevant access control data.

In flow 4004, the mobile device 114 establishes a wireless communication connection (e.g., a Wi-Fi communication connection, cellular communication connection, telecommunication connection, and/or other suitable long range wireless communication connection) with the cloud server 114 (e.g., via the Internet) and receives one or more of the updates to the access control data from the cloud server 150. For example, in some embodiments, the cloud server 150 may determine (e.g., based on an access control database and/or relevant updates thereto) which edge devices 118 to which the user/credential and, therefore, the mobile device 114 is authorized to access, and the cloud server 150 may transmit the updated access control data associated with those edge devices 118 to the mobile device 114. In some embodiments, the cloud server 150 may determine (e.g., based on historical data) which edge devices 118 with which the mobile device has previously interacted and transmit the updated access control data associated with each of those edge devices 118 (e.g., on the premise that the mobile device 114 is likely to again interact with such edge devices 118). It should be appreciated that the device 114, 150 initiating the establishment of the wireless communication connection between the mobile device 114 and the cloud server 150 may vary depending on the particular embodiment.

It should be appreciated that the particular access control data transmitted from the cloud server 150 to the mobile device 114 may vary depending on the particular embodiment. For example, in some embodiments, the cloud server 150 may transmit all of the updated access rights associated with each edge device 118, whereas in other embodiments, the cloud server 150 may transmit only those updated access rights associated with specific users/credentials (e.g., of the mobile device 114) for each edge device 118. In yet other embodiments, the cloud server 150 may securely transmit some other subset of updated access rights to the mobile device 114. Further, it should be appreciated that the cloud server 150 may also transmit configuration data, firmware/software updates, and/or other relevant access control data to the mobile device 114. In some embodiments, it should be appreciated that the access control data transmitted from the cloud server 150 to the mobile device 114 is in an encrypted format and/or otherwise stored in memory of the mobile device 114 in a format inaccessible to the mobile device 114.

In flow 4006, the mobile device 114 scans (e.g., via Bluetooth) for edge devices 118 within communication range of the mobile device 114 to determine whether the mobile device 114 is within communication range of an edge device 118 for which the mobile device 114 has received updated access control data. When the mobile device 114 is within the relevant communication range (e.g., Bluetooth communication range) of such an edge device 118, in flow 4008, the edge device 118 transmits a response message to the Bluetooth scan message (e.g., beacon). Further, in some embodiments, the mobile device 114 and the edge device 118 may establish a Bluetooth communication session/connection (e.g., a BLE 4.2 or new connection) consistent with the techniques described above.

In flow 4010, the mobile device 114 transmits one or more of the updates to the access control data associated with the edge device 118 to the edge device 118 via the secure communication connection between the mobile device 114 and the edge device 118. It should be appreciated that the particular access control data transmitted from the mobile device 114 to the edge device 118 may vary depending on the particular embodiment. For example, in the illustrative embodiment, the mobile device 114 may transmit all of the updated access rights associated with the edge device 118 stored on the mobile device 114, whereas in other embodiments, the mobile device 114 may transmit only those updated access rights associated with specific users/credentials (e.g., of the mobile device 114) to the edge device 118. In yet other embodiments, the mobile device 114 may securely transmit some other subset of updated access rights to the edge device 118. Further, as indicated above, it should be appreciated that the mobile device 114 may also transmit configuration data, firmware/software updates, and/or other relevant access control data to the edge device 118.

In flow 4012, the edge device 118 updates the access control database of the edge system 116 based on the updates received from the mobile device 114. Further, in some embodiments, the edge system 116 may perform (or schedule to perform) a firmware/software update, re-configuration, and/or other action dictated by a relevant update.

In flow 4014, the mobile device 114 transmits (e.g., securely) its credential to the edge device 118. Depending on the particular embodiment, the mobile device 114 may leverage an existing communication connection (e.g., a Bluetooth communication connection) with the edge device 118 or establish a new communication connection/session with the edge device 118 to do so. Further, it should be appreciated that, in some embodiments, the mobile device 114 may transmit the updated access control data to the edge device 118 when the mobile device 114 is a first distance from the edge device 118 and subsequently (e.g., after the edge device 118 has updated the access control database) transmit the credential to the edge device 118 when the mobile device is a second (nearer) distance from the edge device 118. Accordingly, it should be appreciated that, in some embodiments, the method 4000 may be performed in conjunction with one or more of the user intent techniques described herein.

In flow 4016, the edge device 118 processes the credential in an attempt to authenticate the credential. For example, in some embodiments, the edge device 118 and/or other device (s) in the edge system 116 may make an access control decision based on the extracted credential and an access control database (e.g., stored locally) to determine whether the credential authorizes the user/bearer to perform a requested action (e.g., gain access). Further, in some embodiments, in response to successful authentication of the credential, the edge device 118 may unlock a lock mechanism as described above. In some embodiments, it should be appreciated that further authentication of the user and/or the mobile device 114 may be required in advance of, or in conjunction with, the processing of the credential. For example, in some embodiments, the user may be required to comply with a multi-factor authentication protocol requiring, for example, facial identification, thumb print, other biometrics, voice recognition, gestures, PIN entry, and/or additional information.

In flow 4018, the edge device 118 generates and transmits an access control decision message to the mobile device 114 indicating whether the credential was successfully authenticated (e.g., and access was gained). Specifically, in some embodiments, the message may indicate whether access was granted or denied. Additionally, in some embodiments, the edge device 118 may transmit an update confirmation message to the mobile device 114 indicative of whether the update to the access control database of the edge system 116 was successful and/or unsuccessful, which may be transmitted/forwarded to the cloud server 150 in flow 4020. In other embodiments, the edge device 118 may only transmit the update confirmation message to the mobile device 114 (and/or the mobile device 114 may only transmit/forward the update confirmation message to the cloud server 150) if the update to the access control database of the edge system 116 was successful. In yet other embodiments, the edge device 118 may only transmit the update confirmation message to the mobile device 114 (and/or the mobile device 114 may only transmit/forward the update confirmation message to the cloud server 150) if the update to the access control database of the edge system 116 was unsuccessful. In other embodiments, it should be appreciated that the edge device 118 provides no indication of the success of the update to the access control database of the edge system 116 to the mobile device 114 (and/or the mobile device 114 does not transmit/forward such indication to the cloud server 150) and, instead, the cloud server 150 assumes that the transmittal of the updated access control data to the mobile device 114 (in flow 4004) has resulted in a successful update to the access control database of the edge system 116. Further, in some embodiments, the edge device 118 may not generate or transmit any access control decision message to the mobile device 114.

Although the flows 4002-4020 are described in a relatively serial manner, it should be appreciated that various flows of the method 4000 may be performed in parallel in some embodiments.

Figure 41:
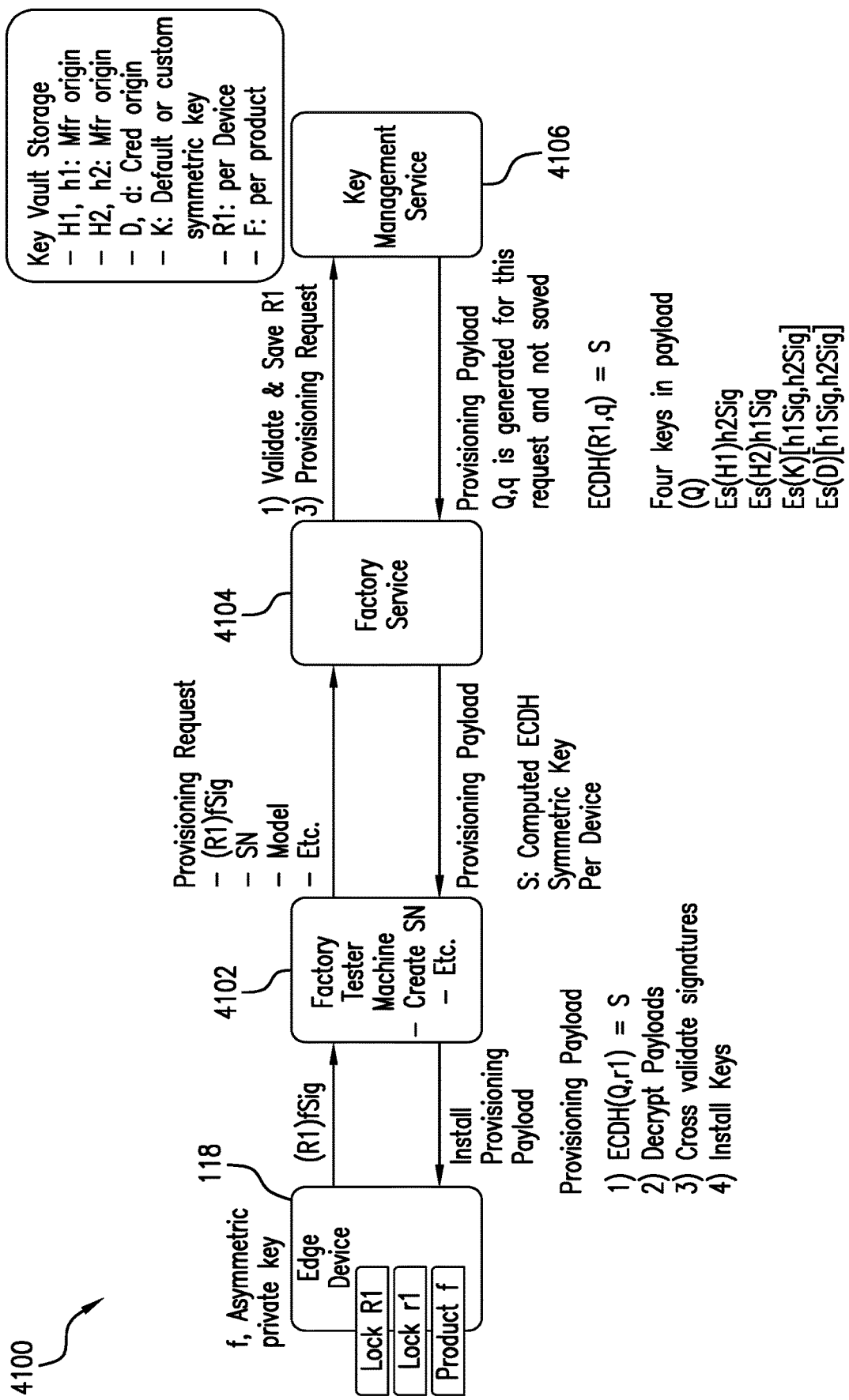
FIG. 41 is a simplified block diagram illustrating cryptographic key provisioning during factor setup of an edge device.

Referring now to FIG. 41, a simplified block diagram of a provisioning system 4100 for cryptographic key provisioning during the factory setup of an edge device 118 is shown. More specifically, in some embodiments, the provisioning system 4100 may involve the provisioning and/or association of various cryptographic keys of the cryptography chipset 144 of the edge device 118. As shown in FIG. 41, the provisioning system 4100 includes the edge device 118, a factory tester machine 4102, a factory service 4104, and a key management service 4106. In some embodiments, the factory tester machine 4102, the factory service 4104, and/or the key management service 4104 may be embodied as a device similar to the computing device 200 described in reference to FIG. 2. Additionally, in some embodiments, the key management service 4104 may be embodied as, or form a portion of, the key management system 108 of FIG. 1. As shown in FIG. 33, the chart 3300 describes various cryptographic keys that are involved in the provisioning depicted in FIG. 41.

In the illustrative embodiment, when provisioning keys in the factory, the edge device 118 generates a unique asymmetric cryptographic key pair (R1, r1) including the public cryptographic key, R1, and the private cryptographic key, r1. The public cryptographic key, R1, may be shared and stored in the key management service 3906 (e.g., the key management system 108) and may be used to generate a shared cryptographic session key, s or S, (e.g., via ECDH) which may be used to encrypt one or more cryptographic keys downloaded in the factory. Further, during the key download in the factor, the manufacturer origin public cryptographic keys, H1 and H2, may be downloaded to the edge device 118.

More specifically, in some embodiments, an asymmetric cryptographic key pair (F,f) including the public cryptographic key, F, and the private cryptographic key,f is associated with each product line (e.g., each type of edge device 118) such that the private key,f is stored to the edge device 118 and the public key, F, is stored to the key management service 4106. As shown in FIG. 41, the edge device 118 cryptographically signs the public cryptographic key, R1, using the private cryptographic key, f, and transmits both the public key, R1, and its signature (fSig) to the factory tester machine 4102. The factory tester machine 4102 generates a serial number associated with the edge device 118, generates a provisioning request (e.g., including R1, fSig, the serial number, the model number of the edge device 118, and/or other relevant data), and transmits the provisioning request to the factory service 4104, which in turn transmits the provisioning request to the key management service 4106. The key management service 4106 may validate/verify the signature (fSig) of the public key (R1) based on the public key stored by the key management service 4106, save the validated public key (R1) and process the provisioning request.

It should be appreciated that the key management service 4106 may include a secure key vault having stored thereon various cryptographic keys including, for example, the cryptographic key pair (H1, h1), the cryptographic key pair (H2, h2), the cryptographic key pair (D,d), the symmetric cryptographic key (K), the public cryptographic key (R1) after receiving the provisioning request, and/or the public cryptographic key (F), the significance and properties of each of which is described in the chart 3300 of FIG. 33.

The key management service 4106 generates an ephemeral cryptographic key pair (Q,q), which is generated on a per-provisioning-request basis and not saved, and generates a provisioning payload. Further, the shared cryptographic session key, S, may be generated based on the private ephemeral key (q) and the public key (R1). More specifically, in some embodiments, the shared cryptographic session key, S, may be generated according to ECDH (R1, q)=S. In some embodiments, the provisioning payload includes the public ephemeral key (Q) and other cryptographic keys including, for example, H1, H2, K, and D. In particular, in the illustrative embodiment, those cryptographic keys may be encrypted and signed according to $E_S$(H1)h2Sig, $E_S$(H2)h1Sig, $E_S$(K)[h1Sig,h2Sig], and $E_S$(D)[h1Sig,h2Sig].

The provisioning payload including such cryptographic keys is transmitted by the key management service 4106 to the factory service 4104, which forwards the provisioning payload to the factory tester machine 4102, which in turn forwards the provisioning payload to the edge device 118 for provisioning thereon. Upon receipt of the provisioning payload, the edge device 118 generates the shared cryptographic session key, S, based on the public ephemeral key (Q) received with the provisioning payload and the private key (r1) retrieved from the memory of the edge device 118. More specifically, in some embodiments, the shared cryptographic session key, S, may be generated according to ECDH (Q,r1)=S. The edge device 118 decrypts the various keys included in the provisioning payload using the shared cryptographic session key, S, cross validates/verifies the various signatures using the corresponding decrypted public cryptographic keys, H1 and H2, and then installs the cryptographic keys from the provisioning payload into the memory of the edge device 118 or, more specifically, into the cryptography chipset 144 in some embodiments.

Figure 42:
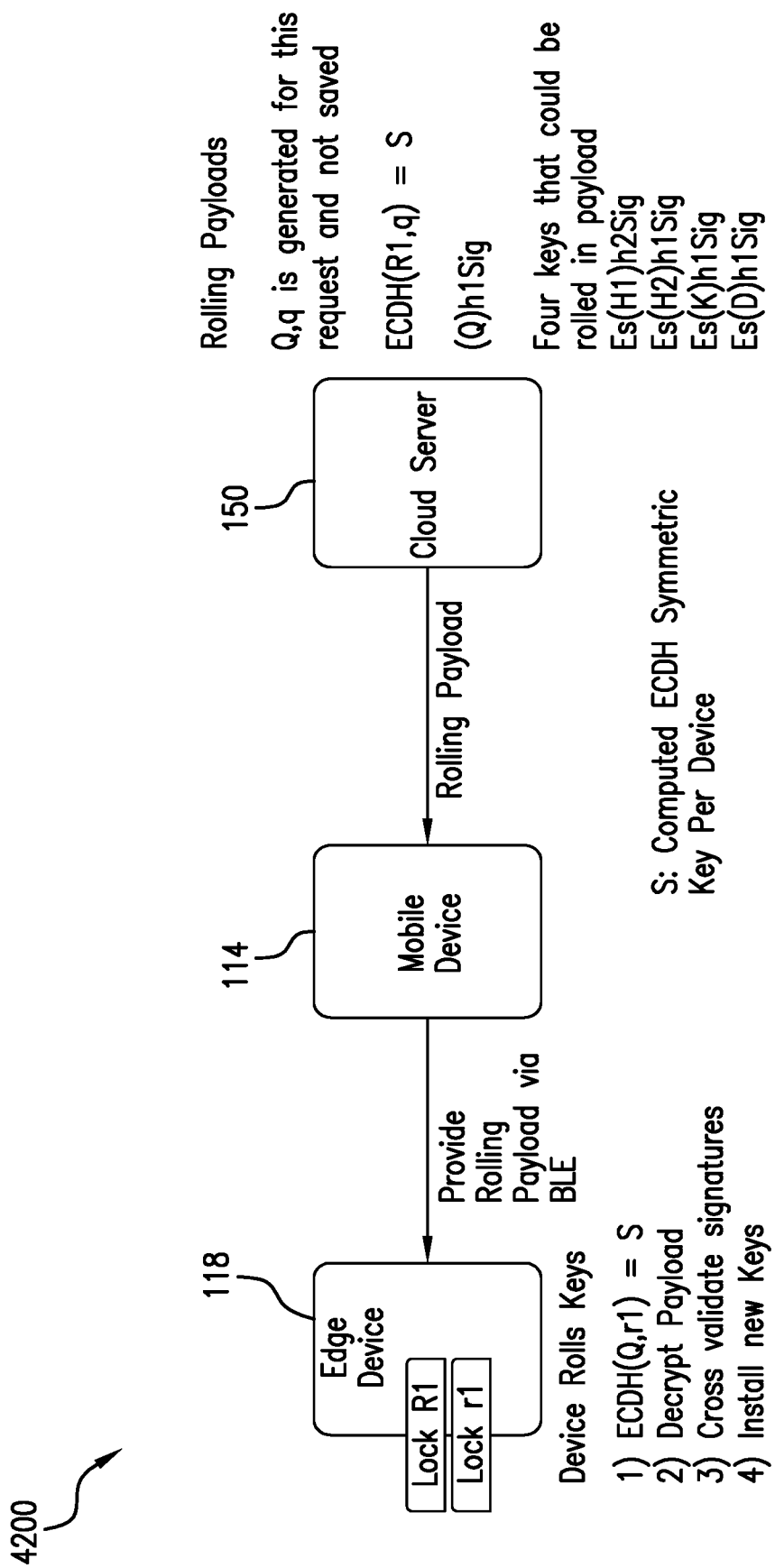
FIG. 42 is a simplified bloc diagram illustrating rolling cryptographic keys when an edge device is in the field.

Referring now to FIG. 42, a simplified bloc diagram of a system 4200 for rolling cryptographic keys when the edge device 118 is in the field. As shown in FIG. 42, the system 4200 includes the edge device 118, the mobile device 114, and the cloud server 150 of FIG. 1. As described above (e.g., in reference to FIG. 30), during the factory provisioning of cryptographic keys, the public key (R1) are provided to the key management service 4106 (e.g., the key management system 108) and the manufacturer origin keys (H1 and H2) are stored to the edge device 118. As such, the cloud server 150 is able to generate a new set of cryptographic keys that can be downloaded to the edge device 118, which may involve an ECDH session key unique to the edge device 118 and a signature by the cloud 150 using a manufacturer origin private key (h1 or h2) to verify that the key originated from the cloud server 150. Because the keys used to roll are different from the keys used for rolling, there is an opportunity to recover the keys if a failure occurs.

It should be appreciated from FIG. 42 that the transmission of the rolling payload from the cloud server 150 to the edge device 118 is similar to the transmission of the provisioning payload to the edge device 118 as described in reference to FIG. 41. In particular, the cloud server 150 generates an ephemeral cryptographic key pair (Q,q), which is generated on a per-request basis and not saved, and generates a rolling payload. Further, the shared cryptographic session key, S, may be generated based on the private ephemeral key (q) and the public key (R1). More specifically, in some embodiments, the shared cryptographic session key, S, may be generated according to ECDH (R1, q)=S. In some embodiments, the rolling payload includes the public ephemeral key (Q), which is cryptographically signed by the origin key (h1). Further, the rolling payload may include the cryptographic keys, H1, H2, K, and/or D. In particular, in the illustrative embodiment, those cryptographic keys may be encrypted and signed according to $E_S$(H1)h2Sig, $E_S$(H2)h1Sig, $E_S$(K)(h1Sig), and/or $E_S$(D) h1Sig.

The rolling payload including such cryptographic keys is transmitted by the cloud server 150 to the mobile device 114. The mobile device 114 then, in turn, transmits the rolling payload (e.g., via BLE) to the edge device 118. Upon receipt of the rolling payload, the edge device 118 generates the shared cryptographic session key, S, based on the public ephemeral key (Q) received with the provisioning payload and the private key (r1) retrieved from the memory of the edge device 118. More specifically, in some embodiments, the shared cryptographic session key, S, may be generated according to ECDH(Q, r1)=S. The edge device 118 decrypts the various keys included in the rolling payload using the shared cryptographic session key, S, cross validates/verifies the various signatures using the corresponding decrypted public cryptographic keys, H1 and H2, and then installs the new cryptographic key(s) from the rolling payload into the memory of the edge device 118 or, more specifically, into the cryptography chipset 144 in some embodiments.

What is claimed is:

1. A method of using a wireless access credential in an access control system including at least a server system, a mobile device, and an access control edge device, the method comprising:

encrypting, by the server system and using a symmetric cryptographic key stored by the server system and the access control edge device, a credential blob including the wireless access credential and a first public cryptographic key provided by the mobile device, wherein the first public cryptographic key and a first private cryptographic key are a first asymmetric cryptographic key pair stored by the mobile device;

transmitting, by the server system, the encrypted credential blob to the mobile device for storage by the mobile device;

establishing a secure wireless communication connection between the mobile device and the access control edge device including generating a shared cryptographic key;

encrypting, by the mobile device and using the shared cryptographic key, a credential message including the encrypted credential blob;

cryptographically signing, by the mobile device and using the first private cryptographic key, the encrypted credential message;

transmitting, by the mobile device, the encrypted and signed credential message to the access control edge device;

decrypting, by the access control edge device and using the shared cryptographic key, the encrypted and signed credential message to extract the encrypted credential blob;

decrypting, by the access control edge device and using the symmetric cryptographic key, the encrypted credential blob to extract the wireless access credential; and unlocking a lock mechanism of an electronic lock associated with the access control edge device in response to successful authentication of the wireless access credential.

2. The method of claim 1, further comprising:

cryptographically signing, by the mobile device and using the first private cryptographic key, a credential request including the first public cryptographic key;

transmitting, by the mobile device, the signed credential request to the server system; and verifying, by the server system, the credential request signature based on the first public cryptographic key retrieved from the signed credential request;

wherein encrypting the credential blob comprises encrypting the credential blob in response to successful verification of the credential request signature.

3. The method of claim 2, further comprising:
generating, by the server system, a keyed hash of the encrypted credential blob using the symmetric cryptographic key;
wherein transmitting the encrypted credential blob further comprises transmitting the keyed hash to the mobile device for storage by the mobile device; and
wherein the credential message further includes the keyed hash.

4. The method of claim 3, wherein the keyed hash comprises a keyed-hash message authentication code (HMAC).

5. The method of claim 3, further comprising:
verifying, by the access control edge device and using the symmetric cryptographic key, the keyed hash in the credential message in response to decrypting the encrypted and signed credential message; and
verifying, by the access control edge device, the credential message signature based on the first public cryptographic key extracted from the decrypted credential blob.

6. The method of claim 2, further comprising:
encrypting, by the access control edge device and using the shared cryptographic key, challenge data;
transmitting, by the access control edge device, the encrypted challenge data to the mobile device; and
decrypting, by the mobile device and using the shared cryptographic key, the encrypted challenge data;
wherein the credential message further includes the challenge data.

7. The method of claim 6, further comprising:
verifying, by the access control edge device, the challenge data in response to decrypting the encrypted and signed credential message.

8. The method of claim 2, further comprising:
cryptographically signing, by the server system, the encrypted credential blob using a second private cryptographic key, wherein the second private cryptographic key and a second public cryptographic key are a second asymmetric cryptographic key pair stored by the server system, and wherein the second public cryptographic key is stored by the access control edge device;
wherein transmitting the encrypted credential blob comprises transmitting the signed and encrypted credential blob to the mobile device for storage by the mobile device; and
wherein the credential message includes the signed and encrypted credential blob.

9. The method of claim 8, further comprising:
verifying, by the access control edge device, the encrypted credential blob signature based on the second public cryptographic key retrieved from a memory of the access control edge device; and
verifying, by the access control edge device, the credential message signature based on the first public cryptographic key extracted from the decrypted credential blob.

10. The method of claim 1, further comprising: encrypting, by the access control edge device and using the shared cryptographic key, pin request data; transmitting, by the access control edge device, the encrypted pin request data to the mobile device; and decrypting, by the mobile device and using the shared cryptographic key, the pin request data.

11. The method of claim 10, further comprising: receiving, by the mobile device, a pin value entered by a user of the mobile device; encrypting, by the mobile device and using the shared cryptographic key, a pin response including the pin value and the pin request data; and transmitting, by the mobile device, the encrypted pin response to the access control edge device.

12. The method of claim 11, further comprising:
decrypting, by the access control edge device and using the shared cryptographic key, the pin response;
verifying, by the access control edge device, the pin request data in response to decrypting the pin response; and
authenticating the pin value in response to successful verification of the pin request data.

13. The method of claim 12, wherein unlocking the lock mechanism comprises unlocking the lock mechanism in response to successful authentication of the wireless access credential and successful authentication of the pin value.

14. The method of claim 1, wherein the first asymmetric cryptographic key pair comprises an elliptical curve cryptography key pair.

15. The method of claim 1, wherein generating the shared cryptographic key comprises performing an Elliptical Curve Diffie-Hellman key exchange.

16. The method of claim 1, further comprising:
encrypting, by the mobile device and using a third public cryptographic key, the encrypted credential blob received from the server system prior to storage of the encrypted credential blob, wherein the third public cryptographic key and a second private cryptographic key are a third asymmetric cryptographic key pair stored by the mobile device; and
decrypting, by the mobile device and using the third private cryptographic key, the stored encrypted credential blob prior to building the credential message.

17. An access control system, comprising:
an access control edge system comprising a lock mechanism;
a mobile device; and
a server system to (i) encrypt, using a symmetric cryptographic key stored by the server system and the access control edge system, a credential blob including a wireless access credential and a first public cryptographic key provided by the mobile device, wherein the first public cryptographic key and a first private cryptographic key are an asymmetric cryptographic key pair stored by the mobile device and (ii) transmit the encrypted credential blob to the mobile device for storage by the mobile device;
wherein the mobile device is to (i) establish a secure wireless communication connection between the mobile device and the access control edge system including generating a shared cryptographic key, (ii) encrypt, using the shared cryptographic key, a credential message including the encrypted credential blob, (iii) cryptographically sign the encrypted credential message using the first private cryptographic key, and (iv) transmit the encrypted and signed credential message to the access control edge system; and
wherein the access control edge system is to (i) decrypt, using the shared cryptographic key, the encrypted and signed credential message to extract the encrypted credential blob, (ii) decrypt, using the symmetric cryptographic key, the encrypted credential blob to extract the wireless access credential, and (iii) unlock the lock mechanism in response to successful authentication of the wireless access credential.

18. The access control system of claim 17, wherein the server system comprises at least one cloud-based server.

19. The access control system of claim 17, wherein the server system comprises a credential management system, a key management system, and a mobile access hub.

20. The access control system of claim 17, wherein the access control edge system comprises a Bluetooth chipset, a main chipset, and a cryptography chipset.

\* \* \* \* \*